(12) United States Patent
Kikuchi et al.

(10) Patent No.: US 6,342,973 B1
(45) Date of Patent: Jan. 29, 2002

(54) ZOOM LENS

(75) Inventors: Syuichi Kikuchi, Kanagawa; Yuichi Nakano, Chiba; Atsuo Minato, Kanagawa; Shinichi Arita, Tokyo; Yusuke Nanjo, Kanagawa, all of (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/557,293

(22) Filed: Apr. 25, 2000

(30) Foreign Application Priority Data

Apr. 30, 1999 (JP) .......................................... 11-124276
May 17, 1999 (JP) .......................................... 11-136207

(51) Int. Cl.$^7$ ............................................. G02B 15/14
(52) U.S. Cl. ....................................... 359/687; 359/684
(58) Field of Search .................................. 359/684, 687

(56) References Cited

U.S. PATENT DOCUMENTS

| | | | | |
|---|---|---|---|---|
| 5,221,994 A | * | 6/1993 | Nishio | 359/684 |
| 5,414,562 A | * | 5/1995 | Ueda | 359/683 |
| 5,933,283 A | * | 8/1999 | Hamano | 359/687 |
| 5,969,879 A | * | 10/1999 | Park | 359/687 |

* cited by examiner

Primary Examiner—Georgia Epps
Assistant Examiner—David N. Spector
(74) Attorney, Agent, or Firm—Rader, Fishman & Grauer PLLC; Ronald P. Kananen, Esq.

(57) ABSTRACT

A zoom lens comprising a first lens group having a positive refracting power and its position fixed, a second lens group having a negative refracting power and displacable mainly for magnification, a third lens group having a positive refracting power and its position fixed, and a fourth lens group having a positive refracting power and displacable mainly for correction of the focal position for magnification and focusing. The first lens group includes, viewed from an object, a cemented lens consisting of a first lens which is a concave meniscus lens having a convex surface facing the object side and a second lens which is a convex lens, and a third lens which is a convex meniscus lens having a convex surface facing the object side; the second lens group, viewed from an object, includes a fourth lens which is a concave meniscus lens having a convex surface facing the object side, and a cemented lens consisting of a fifth lens which is a both-side-concave lens, and a sixth lens which is a convex lens; the third lens group includes a seventh lens which is a convex lens; and the fourth lens group, viewed from an object, includes a cemented lens consisting of an eighth lens which is a convex lens having a convex surface facing the object side, a ninth lens which is a concave lens, and a tenth lens which is a convex lens, and wherein the third lens group includes at least one surface constituted by an aspherical surface and in the fourth lens group, at least the surface which is at the object side is constituted by an aspherical surface.

6 Claims, 37 Drawing Sheets ic 
ZOOM LENS

BACKGROUND OF THE INVENTION

1. Field of the Invention

The present invention relates to a technique to provide a small-size high-magnification and high-quality lens configuration as a zoom lens for a video camera for civil use.

2. Description of the Prior Art

As a conventional four-group inner focus zoom lens for civil video camera use having a comparatively high magnification of 6 times or above and including a minimum number of lenses in practice, there is a 9-lens zoom lens. That is, as shown in FIG. 1, the 9-lens zoom lens "a" includes: a first lens group GR1 having a cemented lens consisting of a first lens L1 which is a concave meniscus lens and a second lens L2 which is a convex lens, and a third lens L3 which is a convex meniscus lens; a second lens group GR2 having a fourth lens L4 which is a concave meniscus lens, and a cemented lens consisting of a fifth lens L5 which is a concave lens and a sixth lens L6 which is a convex lens; a third lens group GR3 having a seventh lens L7 which is a single convex lens; and a fourth lens group GR4 having a cemented lens consisting of an eighth lens L8 which is a concave lens and a ninth lens L9 which is a convex lens.

In the aforementioned conventional zoom lens "a", the third lens group GR3 is not a so-called achromatic lens and a chromatic aberration generated in the third lens group GR3 has been compensated by excessively performing correction of chromatic aberration in the fourth lens group GR4.

However, there is a problem that aberration fluctuation such as a chromatic aberration and a spherical aberration of the first lens group GR1 generated at magnification can be canceled by the reverse aberration generated in the second lens group GR2, but bending by the chromatic aberration and spherical aberration generated by displacement of the fourth lens group GR4 cannot be canceled.

The lenses of the fourth group GR4 should be made from such a material that the a difference between an Abbe's number of the eighth lens L8 which is concave lens and an Abbe's number of the ninth length L9 which is a convex lens is as large as possible. Moreover, the junction surface curvature between the eighth lens L8 and the ninth lens L9 is also limited because the chromatic aberration is corrected into a range allowable for a wide angle end and the refracting power distribution between the eighth lens L8 and the ninth lens L9 is determined dependently from the chromatic aberration.

Accordingly, the bending by the color of the spherical aberration generated by the displacement of the fourth lens group GR4 is determined by the material of the eighth lens L8 and the ninth lens L9, the refracting power distribution, and the junction surface curvature. Thus, there has been almost no degree of freedom in correction.

The conventional zoom lens "a", a lens system consisting of nine lenses can be used in practice when the magnification is low, the size need not be small, and the F number may be dark, but cannot be used when a high magnification is required, the size should be small, and a high image quality is required.

For increasing the magnification of the zoom lens "a", when the entire refracting power distribution is performed so that the position of the fourth lens group GR4 is almost identical at the wider angle end and the telephoto end for an infinite point, then the displacement amount of the fourth lens group GR4 at the intermediate focal position becomes too great and the chromatic aberration fluctuation becomes remarkable and this chromatic aberration cannot be corrected because of the design limitation of the fourth lens group GR4 as has been described above.

Moreover, in order to make smaller the size of the zoom lens "a", it is advantageous each of the lenses has a strong refracting power and displacement of the displacable lens groups is small. However, when the second lens group GR2 has a strong refracting power, mainly the Petzval's sum is a negative great value, causing excessive correction, which makes difficult correction of the image surface bending. When each of the lens groups has a strong refracting power, aberration such as spherical aberration, especially aberration generated by cancellation between the first lens group GR1 and the second lens group GR2 becomes strong and it becomes difficult to obtain a preferable performance in the entire zoom region.

To cope with this, conventionally, in order to reduce the spherical aberration generated in the first lens group, the refractive index of the third lens L3 which is a convex lens has been increased. However, in case of the refractive index of the third lens L3 which is a convex lens of the first group GR1, this makes the entire Petzval's sum negative. That is, it is impossible to simultaneously obtain suppression of generation of aberration inherent to the first lens group GR1 and making the refracting power of each lens stronger to minimize the lens size.

Moreover, in the fourth lens group GR4 of the zoom lens "a", when an aspherical surface is to be realized by glass mold, it cab be formed only on the ninth lens which is a convex lens because of the molding easiness. For example, when forming a composite spherical surface using an ultraviolet ray hardening resin, it can be formed only on the surface of the ninth lens L9 because material used for the eighth lens L8 which is a concave lens does not pass ultraviolet rays. This limits the design and it has been impossible to increase the number of surfaces constituted by an aspherical surface which is effective for improving the image quality.

SUMMARY OF THE INVENTION

It is therefore an object of the present invention to provide a high-magnification, small-size, and high image quality lens configuration for the zoom lens used in a video camera of civil use.

In order to achieve the aforementioned object, the present invention provides a zoom lens comprising a first lens group having a positive refracting power and its position fixed, a second lens group having a negative refracting power and displacable mainly for magnification, a third lens group having a positive refracting power and its position fixed, and a fourth lens group having a positive refracting power and displacable mainly for correction of the focal position for magnification and focusing, wherein the first lens group includes, viewed from an object, a cemented lens consisting of a first lens which is a concave meniscus lens having a convex surface facing the object side and a second lens which is a convex lens, and a third lens which is a convex meniscus lens having a convex surface facing the object side; the second lens group, viewed from an object, includes a fourth lens which is a concave meniscus lens having a convex surface facing the object side, and a cemented lens consisting of a fifth lens which is a both-side-concave lens and a sixth lens which is a convex lens; the third lens group includes a seventh lens which is a convex lens; and the fourth lens group, viewed from an object, includes a cemented lens consisting of an eighth lens which is a convex lens having a convex surface facing the object side, a ninth lens which is a concave lens, and a tenth lens which is a convex lens, and wherein the third lens group includes at least one surface constituted by an aspherical surface and in the fourth lens group, at least the surface which is at the object side is constituted by an aspherical surface.

Accordingly, in the present invention, the refracting power of the ninth lens serving for achromatization in the third lens group and the fourth lens group is determined by the achromatic condition and has a characteristic similar to the ninth lens in the aforementioned conventional example. However, in the present invention, the ninth lens is sandwiched by convex lenses, which enables to obtain a significantly greater degree of freedom of the curvature of the ninth lens. In spite of that the tenth lens which is a convex lens has a convex surface facing the object side in the same way as in the conventional example, but its curvature can be designed more gentle than in the conventional example. This remarkably improves bending due to color of the spherical aberration generated from this surface.

DESCRIPTION OF PREFERRED EMBODIMENTS

Figure 1:
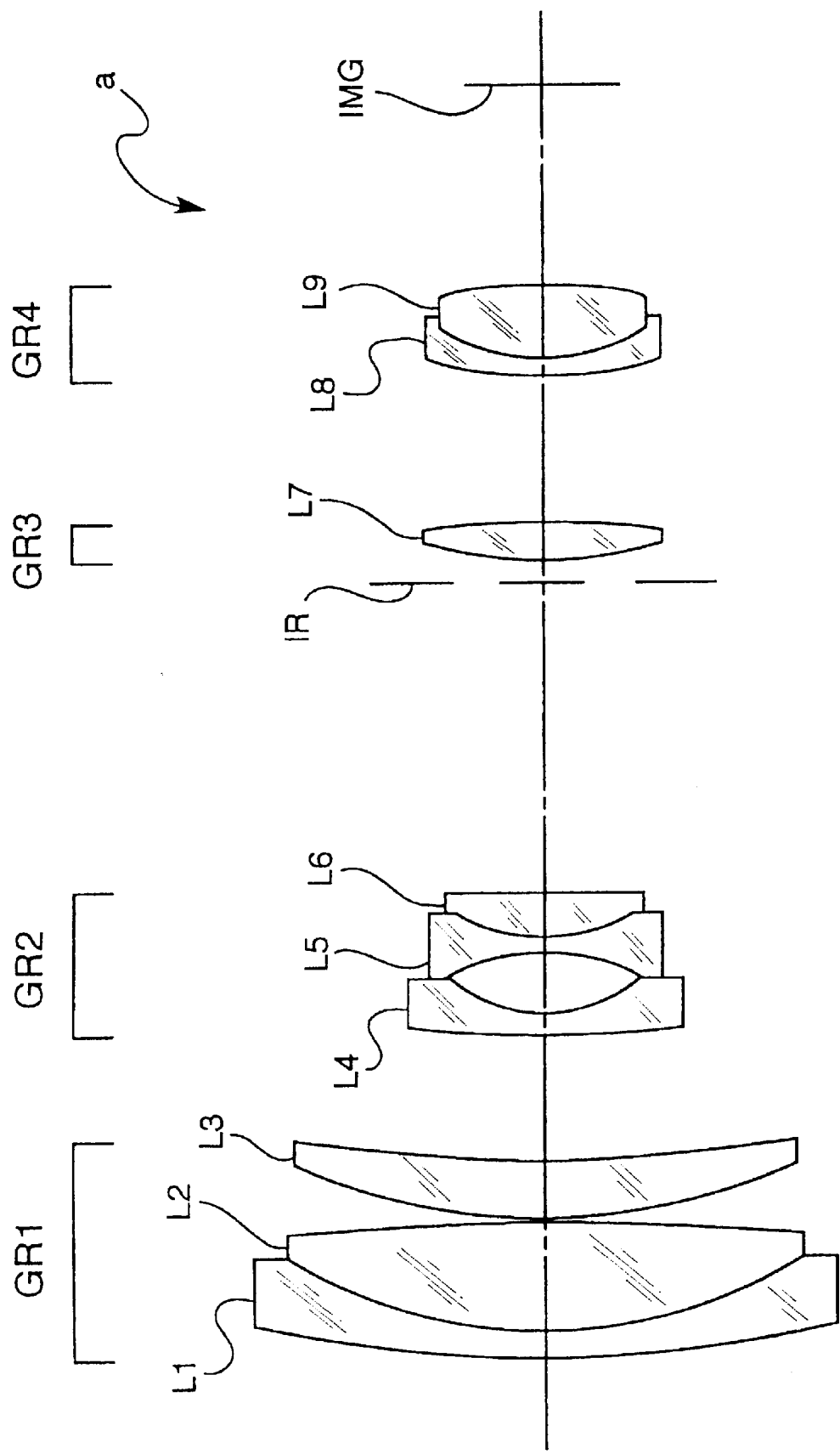
FIG. 1 shows an example of a lens configuration of a conventional zoom lens.

The zoom lens according to the present invention, viewed from an object, includes a fist lens group GR1, a second lens group GR2, a third lens group GR3, and a fourth lens group GR4. The first lens group GR1 has a positive refracting power and its position is fixed. The second lens group GR2 has a negative refracting power and is displacable for magnification. The third lens group GR3 has a positive refracting power and its position is fixed. The fourth lens group GR4 has a positive refracting power and is displacable for correction of a focal point and focusing.

Moreover, in the zoom lens according to the present invention, viewed from an object, the first lens group GR1 has a cemented lens consisting of a first lens L1 which is a concave meniscus lens with its convex surface facing the object and a second lens L2 which is a convex lens, and a third lens L3 which is a convex meniscus lens with its convex surface facing the object; the second lens group GR2, viewed from an object, has a fourth lens L4 which is a concave meniscus lens with its convex surface facing the object and a cemented lens consisting of a fifth lens L5 which is concave at both sides and a sixth lens L6 which is a convex lens; the third lens group GR3 has a seventh lens L7 which is a convex lens; and the fourth lens group GR4, viewed from an object, has a cemented lens consisting of an eighth lens L8 which is a convex lens with its convex surface facing the object, a ninth lens L9 which is a concave lens, and a tenth lens L10 which is a convex lens. The third lens group GR3 includes at least one aspherical surface and the fourth lens group GR4 includes an aspherical surface at the side of the object.

The zoom lens according to the present invention preferably satisfies 1.8<n9 (Condition Equation 1)

where n9 is a refractive index at line d of the ninth lens.

The condition equation 1 defines the material of the ninth lens L9 which is a concave lens. That is, by increasing the refractive index of the ninth lens, so as to reduce the curvature of the eighth length L8 and the tenth lens L10 which are convex lenses, it becomes possible to suppress the chromatic aberration caused by displacement of the fourth lens group GR4 and fluctuation of the bending caused by spherical aberration color as well as correct the Petzval's sum to the plus side. This is advantageous for correction of the image surface warp.

In a case of a zoom lens with magnification of 10 times and intended for smaller size and higher image quality, a diaphragm IR is arranged between the third lens group GR3 and the fourth lens group GR4, the surface of the fourth lens group GR4 which is nearest to an image is constituted by an aspherical surface, and it is preferable to satisfy the following conditions:

1.1<f3/f4<1.4 (Condition Equation 2)

1.0<|f2/fw|<1.3 (Condition Equation 3)

where f2 is a focal distance of the second lens group GR2; f3 is a focal distance of the third lens group GR3; f4 is a focal distance of the fourth lens group GR4; and fw is a focal distance of the entire lens system at a wide angle end.

The condition equation 2 defines the relationship between the focal points of the third lens group GR3 and the fourth group GR4.

That is, when the value of f3/f4 becomes equal to or below 1.1 which is the lower limit, it becomes difficult to suppress the fluctuation of the spherical aberration and the displacement of the fourth lens group GR4 becomes large, increasing the length of the entire lens system (zoom lens). On the contrary, in case of the value of f3/f4 becomes equal to or above 1.4 which is the upper limit, the aberration deterioration due to a production error of the fourth lens group GR4 becomes remarkable, which is not preferable.

The condition equation 3 defines the relationship between the focal distance of the second lens group GR2 and the focal distance of the entire lens system at the wide angle end.

That is, when the value of |f2/fw1 becomes equal to or below 1.0 which is the lower limit, aberration deterioration due to irregularities during production of the second lens group GR2 becomes remarkable. On the contrary, in case of the value of |f2/fw1 becomes equal to or above 1.3 which is the upper limit, the displacement of the second lens group GR2 for magnification becomes large, which is not preferable for reducing the zoom lens size.

Moreover, by arranging the diaphragm IR between the third lens group GR3 and the fourth lens group GR4, it becomes possible to reduce the interval between the second lens group GR2 and the third lens group GR3 at the telephoto end and a marginal light emitted from the second lens group GR2 can be incident into the third lens group GR3 while its height is low, contributing to reduction of the entire zoom lens length.

In a case of a high magnification zoom lens of 25 times with its entire length to be reduced to a value smaller than a focal distance at the telephoto end, the third lens group GR3 is constituted by a seventh lens L7 which is a convex lens with its convex surface facing an object and it is preferable to satisfy conditions as follows:

8.5<dz/fw<10 (Condition Equation 4)

1.0<f3/f4<1.45 (Condition Equation 5)

where fw is a focal distance of the lens system at the wide angle end; dz is a displacement amount of the second lens group GR2 for magnification; f3 is a focal distance of the third lens group GR3; and f4 is a focal distance of the fourth lens group GR4.

The condition equation 4 defines the relationship between a displacement amount of the second lens group GR2 from the wide angle end to the telephoto end and a focal point of the entire lens system at the wide angle end.

That is, when the value of dz/fw becomes equal to or smaller than 8.5 which is the lower limit, in order to obtain a high magnification of 25 times or above, the second lens group GR2 should have a strong refracting power, which results in an excessive correction of the Petzval's sum to a negative side, and it becomes impossible to correct an image warp of the entire lens system only by selecting the lens material. On the contrary, in case of the dz/fw value becomes equal to or greater than 10 which is the upper limit, the entire length of the zoom lens becomes long and it becomes difficult to move the second lens group GR2 without causing eccentricity and not practical.

The condition equation 5 shows an optimal range when the aforementioned condition equation 2 defining the relationship between the focal distances of the third lens group GR3 and the fourth lens group GR4 is applied to a zoom lens having a zoom ratio of 25 times or so.

That is, when the f3/f4 value becomes equal to below 1.2 which is lower limit, the refracting power of the third lens group GR3 becomes too strong and the refracting power of the fourth lens group GR4 becomes too weak. When the refracting power of the third lens group GR3 becomes too strong, correction of the spherical aberration at the wide angle end becomes insufficient and it becomes difficult to correct the spherical aberration fluctuation at focusing in an intermediate focal region. Moreover, when the refracting power of the fourth lens group GR4 becomes too weak, the displacement amount of the fourth lens group GR4 at focusing becomes too great, increasing the aberration fluctuation, and the back focus becomes longer than necessary, which is not appropriate for zoom lens size reduction. On the contrary, in case of the f3/f4 value becomes equal to or greater than 1.45 which is the upper limit, the refracting power of the third lens group GR3 becomes to weak and the refracting power of the fourth lens group GR4 becomes too strong. When the refracting power of the third lens group GR3 becomes too weak, correction of the spherical aberration at the wide angle end becomes excessive and not preferable. Moreover, when the refracting power of the fourth lens group GR4 becomes too strong, correction of the spherical aberration at the wide angle end becomes insufficient and not preferable.

In a case of a high magnification zoom lens of 25 times with a small pickup element resulting in that the entire length is longer than the focal distance of the telephoto end, the third lens group GR3 is constituted by a seventh lens L7 which is a convex lens with its convex surface facing an object and it is preferable to satisfy conditions as follows:

8.5<dz/fw<11 (Condition Equation 6)

1.8<Lz/Lf<2.2 (Condition Equation 7)

where fw is a focal distance of the entire lens system at the wide angle end; dz is a displacement amount of the second lens group GR2 at magnification; Lz is a distance from the object side of the entire lens system at the telephoto end to the image side of the second lens group GR2; and Lf is a distance from a surface of the image side of the third lens group GR3 to the image surface of the entire lens system.

The condition equation 6, similarly as the aforementioned condition equation 4, defines the relationship between the displacement amount of the second lens group GR2 from the wide angle end to the telephoto end and the focal distance of the entire lens system at the wide angle end.

That is, when the dz/fw value exceeds the lower limit 8.5 or the upper limit 11, the disadvantages described in the explanation of the condition equation 4 are caused. Even when the pickup element size is reduced, it is impossible to reduce a thickness of a concave lens and an edge thickness of a convex lens in proportion to the pickup size reduction due to production conditions. Accordingly, in order to satisfy the pickup size reduction and the limitation that lens components cannot be made thinner, it is preferable to determine the refracting power arrangement of the second lens groups GR2 according to the condition equation 6 in which the upper limit of the condition equation 4 is increased from 10 to 11.

The condition equation 7 is to reduce an unnecessary space for realizing a small size while maintaining a high magnification of 25 times and defines a condition for a displacement amount of the second lens group GR2 and compensate at magnification and a displacement amount of the fourth lens group GR4 at focusing.

That is, when the Lz/Lf value becomes equal to or smaller than 1.8 which is the lower limit, it is necessary to reduce a displacement amount of the second lens group GR2 with respect to a displacement amount of the fourth lens group GR4 and there arises a necessity to make stronger the refracting power of the second lens group GR2. For this, the Petzval's sum is excessively corrected into a negative value and it becomes impossible to correct the image warp of the entire lens system only by selecting a lens material. On the contrary, in case of the Lz/Lf value becomes equal to or greater than 2.2 which is the upper limit, a displacement amount of the second lens group GR2 becomes large with respect to a displacement amount of the fourth lens group GR4, the entire length of the zoom lens becomes too long and the front lens system becomes too large to be used in practice.

In a case of a zoom lens with magnification ratio of about 10 times in which the entire length and the front lens system are to be reduced in size corresponding to a small-size pickup element: a diaphragm IR is arranged between the third lens group GR3 and the fourth lens group GR4; the third lens group GR3 is constituted by a seventh lens having a convex surface facing to an object; among the surfaces constituting the first lens group GR1, at least one surface has an aspherical plane; and it is preferable to satisfy conditions as follows:

1.58<n3<1.7 (Condition Equation 8)
2.5<dz/fw<5 (Condition Equation 9)
1.2<f3/f4<1.8 (Condition Equation 10)

where n3 is a refractive index at d line of the third lens L3; fw is a focal distance of the entire lens system at the wide angle end; dz is a displacement amount of the second lens group GR2 at magnification; f3 is a focal distance of the third lens group GR3; and f4 is a focal distance of the fourth lens group GR4.

The condition equation 8 defines a condition so as to simultaneously satisfy the two conditions. The first condition is to prevent excessive correction of the Petzval's sum in a negative value due to size reduction. The second is to preferably correct the spherical aberration inherent to the first lens group GR1.

In order to cope with that the respective lens groups have a greater refracting power and the Petzval's sum becomes greater in a negative value, it is effective to reduce the refractive index of the convex lens and increase the refractive index of the concave lens. In the first lens group GR1, it is possible to reduce the refractive index of the second lens L2 which is a convex lens in a cemented lens, without affecting the other aberration corrections. However, in case of the refractive index of the third lens L3 which is a convex lens is reduced, it becomes difficult to correct the spherical aberration generated from the first lens group GR1 and especially difficult to correct the spherical aberration at the telephotographic side.

For this, it is general to increase the refractive index of the third lens L3 so as to prevent deterioration of image quality at the telephotographic side. However, to increase the refractive index of the third lens L3, means to make the Petzval's sum a negative value. In order to prevent this, it becomes necessary to reduce the refracting power of the respective lens groups. That is, it is impossible to simultaneously satisfy the Petzval's sum and the size reduction.

To cope with this, for correction of the Petzval's sum, the refractive index n3 of the third lens L3 was made to equal to or below 1.7 and the accompanying deterioration of the spherical aberration was solved by introducing an aspherical surface in the first lens group GR1. However, in case of the refractive index is below the lower limit such as 1.58 or below, the third lens L3 has too strong curvature of the reference spherical surface and it becomes difficult to correct the spherical aberration even with the aspherical surface.

The condition equation 9 defines a condition similar to the aforementioned condition equations 4 and 6. However, for the purpose of reducing the size with magnification of about 10 times, the lower limit of the dz/fw value is decreased so that the displacement amount of the second lens group GR2 is made smaller. However, in case of the dz/fw value is equal to or below 2.5 which is the lower limit, in the same way as in the condition equation 4, in order to obtain magnification of about 10 times, it becomes necessary to increase the refracting power of the second lens group GR2, which causes an excessive correction of the Petzval's sum in a negative value and it becomes impossible to correct he image surface warp of the entire lens system only by selecting the lens material. On the contrary, in case of the dz/fw value becomes equal to or above 5 which is the upper limit, in the same way as the condition equation 4, the entire length of the zoom lens becomes too long and it becomes difficult to displace the second lens group GR2 without causing eccentricity. This is not practical.

The condition equation 10, like the aforementioned condition equation 5, adjusts the condition defined by the condition equation 2 for balance between the magnification of about 10 times and size reduction. When the f3/f4 value becomes equal to or below 1.2 which is the lower limit, like in the condition equation 5, the third lens group GR3 has a too strong refracting power and the fourth lens group GR4 has a too weak refracting power. When the refracting power of the third lens group GR3 becomes too strong, correction of the spherical aberration at the wide angle end becomes in sufficient, and it becomes difficult to correct the spherical aberration fluctuation at focusing in the intermediate focal region. Moreover, when the fourth lens group GR4 has a too weak refracting power, a displacement amount of the fourth lens group GR4 at focusing becomes too large, the aberration fluctuation also becomes too large. Also, the back focus becomes longer than necessary, which disturbs the size reduction of the zoom lens. On the contrary, in case of the f3/f4 value becomes equal to or above 1.8 which is the upper limit, like in the condition equation 5, the refracting power of the third lens group GR3 becomes too weak and the refracting power of the fourth lens group GR4 becomes too strong. When the refracting power of the third lens group GR3 is too weak, the spherical aberration at the wide angle end is excessively corrected, which is not preferable. Moreover, when the refracting power of the fourth lens group GR4 is too strong, correction of the spherical aberration at the wide angle end becomes insufficient, which is not preferable.

Next, explanation will be given on numerical examples 1 to 9 as specific examples of the zoom lens according to the present invention with reference to the attached drawings.

It should be noted that in the explanation below. "ri" represents an i-th surface counted from an object and its curvature radius; "di" represents an i-th surface counted from an object and an interval (lens thickness or air interval) between the i-th surface and i+1-th surface; "ni" represents a refractive index at d line of an i-th lens; "vi" represents an Abbe's number at the d line of an i-th lens; "f" represents a focal distance of the entire lens system; "FNo." represents an open F value; "ω" represents a half image angle ("nFL" and "vFL" respectively represent a refractive index and Abbe's number of a filter detailed later.).

Among the lenses used in the numerical examples, there are also lenses having a lens surface of aspherical surface. An aspherical surface configuration is assumed to be defined as follows:

$$X = (C \times Y2)/\{1+(1-C2 \times Y2)^{1/2}\} + A4 \times Y4 + A6 \times Y6 + A8 \times Y8 + A10 \times Y10,$$

where "X" represents coordinates of the aspherical surface in the light axis direction, "C" represents a paraxial curvature, and "Y" represents a distance from the light axis. Here, A4, A6, A8, and A10 are aspherical surface coefficients of the respective powers (powers of 4, 6, 8, and 10).

Figure 2:
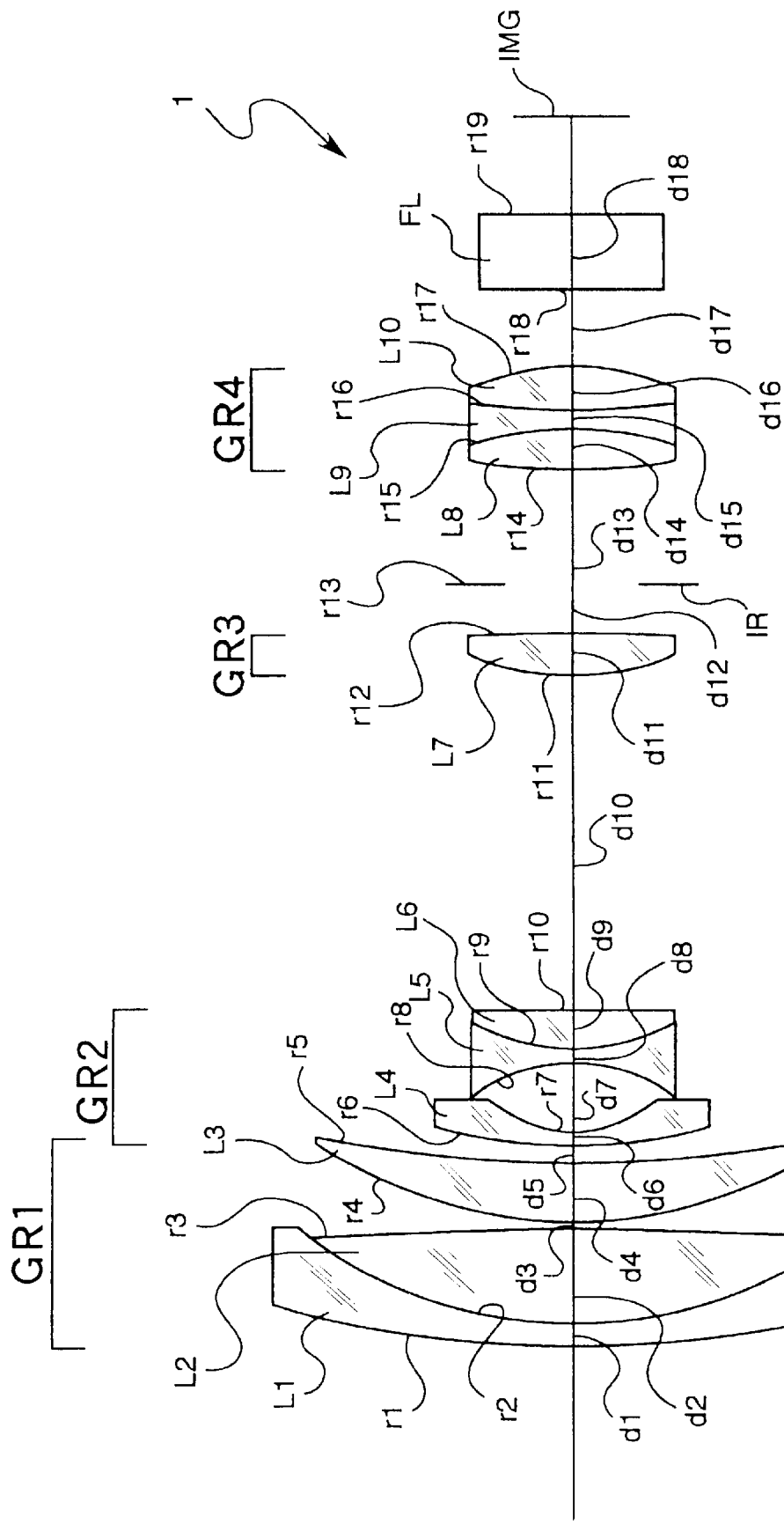
FIG. 2 together with FIG. 3 to FIG. 5 shows a first numerical example of the zoom lens according to the present invention.
Figure 6:
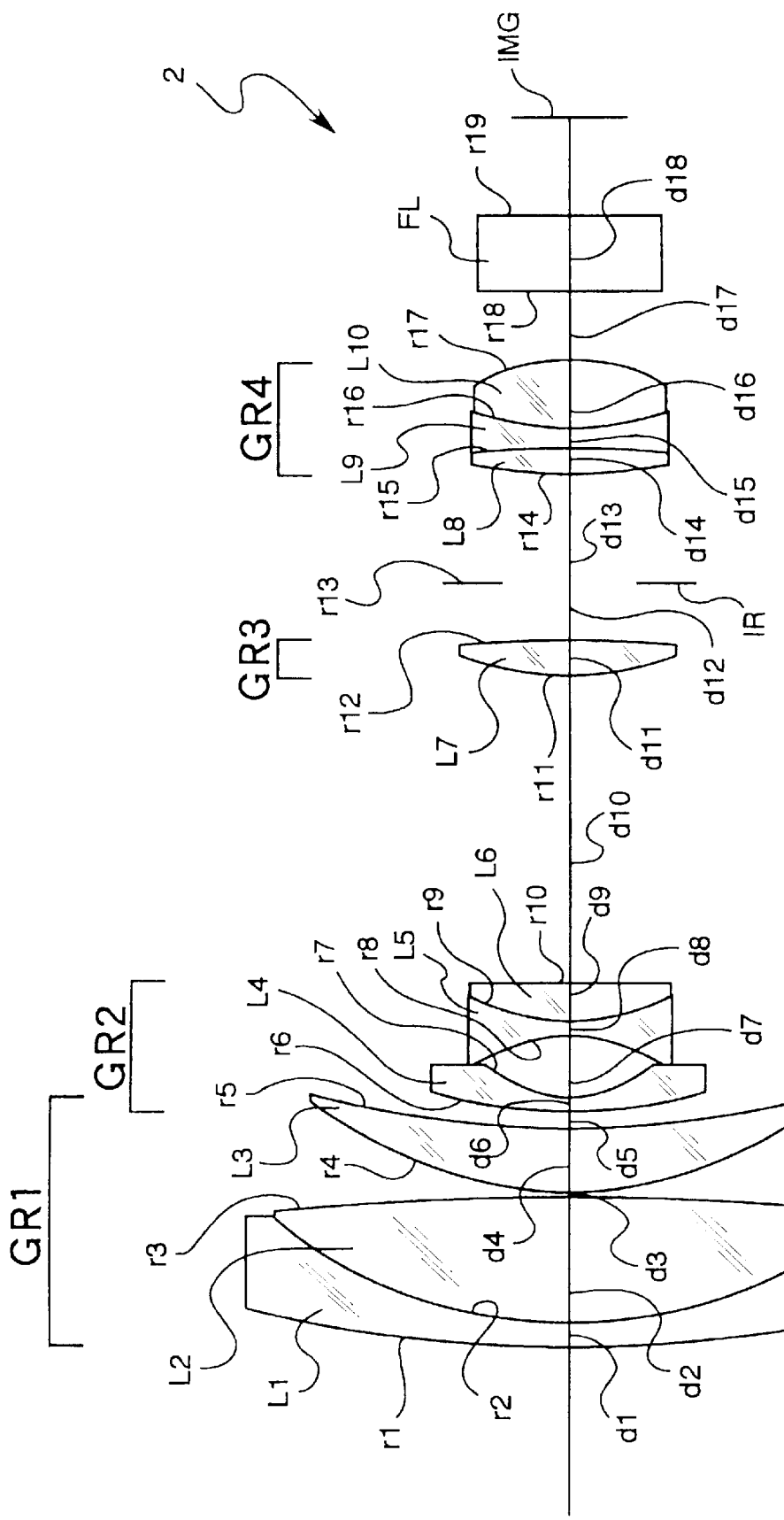
FIG. 6 together with FIG. 7 to FIG. 9 shows a second numerical example of the zoom lens according to the present invention.

The zoom lens 1 and 2 according to the first and the second numerical examples are intended for magnification of about 10 times and size reduction and as shown in FIG. 2 and FIG. 6 includes, as viewed from an object, a first lens group GR1 having a positive refracting power and its position fixed; a second lens group GR2 having a negative refracting power and displacable for magnification; a third lens group GR3 having a positive refracting power and its position fixed; a fourth lens group GR4 displacable for correction of focal point due to magnification and focusing; and a diaphragm IR between the third lens group GR3 and the fourth lens group GR4. It should be noted that there is arranged a filter FL such as a low pass filter between the fourth lens group GR4 and an image surface IMG.

Moreover, in the zoom lens 1 and 2, viewed from an object, the first lens group GR1 includes a cemented lens consisting of a first lens L1 which is a concave meniscus lens having a convex surface facing the object and a second lens L2 which is a convex lens, and a third lens L3 which is a convex meniscus lens having a convex surface facing the object; the second lens group GR2, viewed from an object, includes a fourth lens L4 which is a concave meniscus lens having a convex surface facing the object, and a cemented lens consisting of a fifth lens L5 which is a both-side-concave lens and a sixth lens L6 which is a convex lens; the third lens group GR3 includes a seventh lens L7 which is a convex lens; and the fourth lens group GR4, viewed from an object, includes a cemented lens consisting of an eighth lens L8 which is a convex lens having a convex surface facing the object, a ninth lens L9 which is a concave lens, and a tenth lens L10 which is a convex lens. The surface r11 of the third lens group GR3 at the object side, the surface r14 of the fourth lens group GR4 at the object side, and the surface r17 of the fourth lens group GR4 at the image surface IMG side are constituted by aspherical surfaces.

Furthermore, the zoom lens 1 and 2 are constituted to satisfy the aforementioned condition equations 1, 2, and 3.

Table 1 shows numeric values of the zoom lens 1.

TABLE 1

| ri | di | ni | vi |
|---|---|---|---|
| r1 = 12.559 | d1 = 0.23 | n1 = 1.846663 | v1 = 23.8 |
| r2 = 4.737 | d2 = 0.98 | n2 = 1.696802 | v2 = 55.5 |
| r3 = −65.436 | d3 = 0.04 | | |
| r4 = 4.509 | d4 = 0.62 | n3 = 1.804199 | v3 = 46.5 |
| r5 = 12.823 | d5 = variable | | |
| r6 = 5.405 | d6 = 0.14 | n4 = 1.834999 | v4 = 43.0 |
| r7 = 1.287 | d7 = 0.69 | | |
| r8 = −1.648 | d8 = 0.14 | n5 = 1.622994 | v5 = 58.1 |
| r9 = 1.991 | d9 = 0.40 | n6 = 1.846663 | v6 = 23.8 |
| r10 = ∞ | d10 = variable | | |
| r11 = 2.749 (ASP) | d11 = 0.41 | n7 = 1.583129 | v7 = 59.5 |
| r12 = −23.471 | d12 = 0.53 | | |
| r13 = ∞ (Diaphragm) | d13 = variable | | |
| r14 = 4.444 (ASP) | d14 = 0.40 | n8 = 1.693504 | v8 = 53.3 |
| r15 = −3.063 | d15 = 0.21 | n9 = 1.846663 | v9 = 23.8 |
| r16 = 8.408 | d16 = 0.43 | n10 = 1.583129 | v10 = 59.5 |
| r17 = −2.259 (ASP) | d17 = variable | | |
| r18 = ∞ | d18 = 0.78 | nFL = 1.516798 | vFL = 64.2 |
| r19 = ∞ | | | |

As shown in FIG. 1, in the zoom lens 1, the surface intervals d5, d10, d13, and d17 are variable for zooming and focusing. Accordingly, Table 2 shows plane intervals d5, d10, d14, and d17 at the wide angle end (f=1.00), at the intermediate focal distance position (f=4.72) between the wide angle end and the telephoto end, and at the telephoto end (f=9.73) during zooming, and FNo. and f.

TABLE 2

| f | 1.00 | 4.72 | 9.73 |
|---|---|---|---|
| FNo. | 1.85 | 2.16 | 2.12 |
| d5 | 0.188 | 2.764 | 3.572 |
| d10 | 3.560 | 0.984 | 0.176 |
| d13 | 1.209 | 0.525 | 1.193 |
| d17 | 0.777 | 1.461 | 0.793 |

Moreover, a surface r11 of the seventh lens L7 of the third lens group GR3 at the object side, the surface r17 of the eighth lens of the fourth group GR4 at the object side, the surface r17 of the tenth lens L10 at the image plane IMG side are formed as aspherical surfaces. Table 3 shows aspherical surface coefficients A4, A6, A8, and A10 of the powers 4, 6, 8, 10 of the aforementioned surfaces r11, r14, and r17.

TABLE 3

| Plane | A4 | A6 | A8 | A10 |
|---|---|---|---|---|
| r11 | −0.01122 | 0.00824 | −0.01887 | 0.01090 |
| r14 | −0.03048 | 0.00647 | −0.02870 | 0.01968 |
| r17 | −0.00474 | 0.02092 | −0.05825 | 0.04221 |

Figure 3:
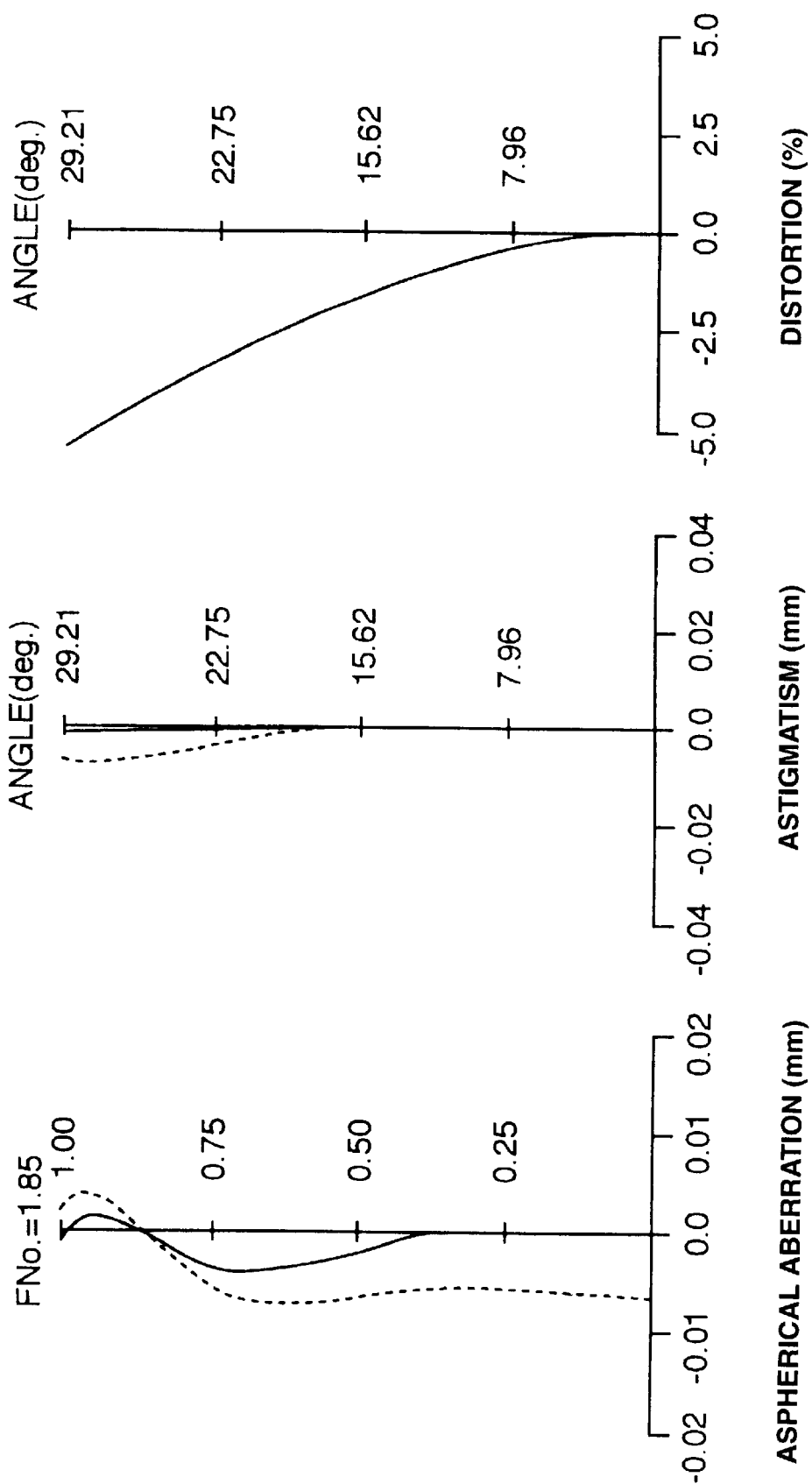
FIG. 3 shows aberrations at the wide angle end.
Figure 4:
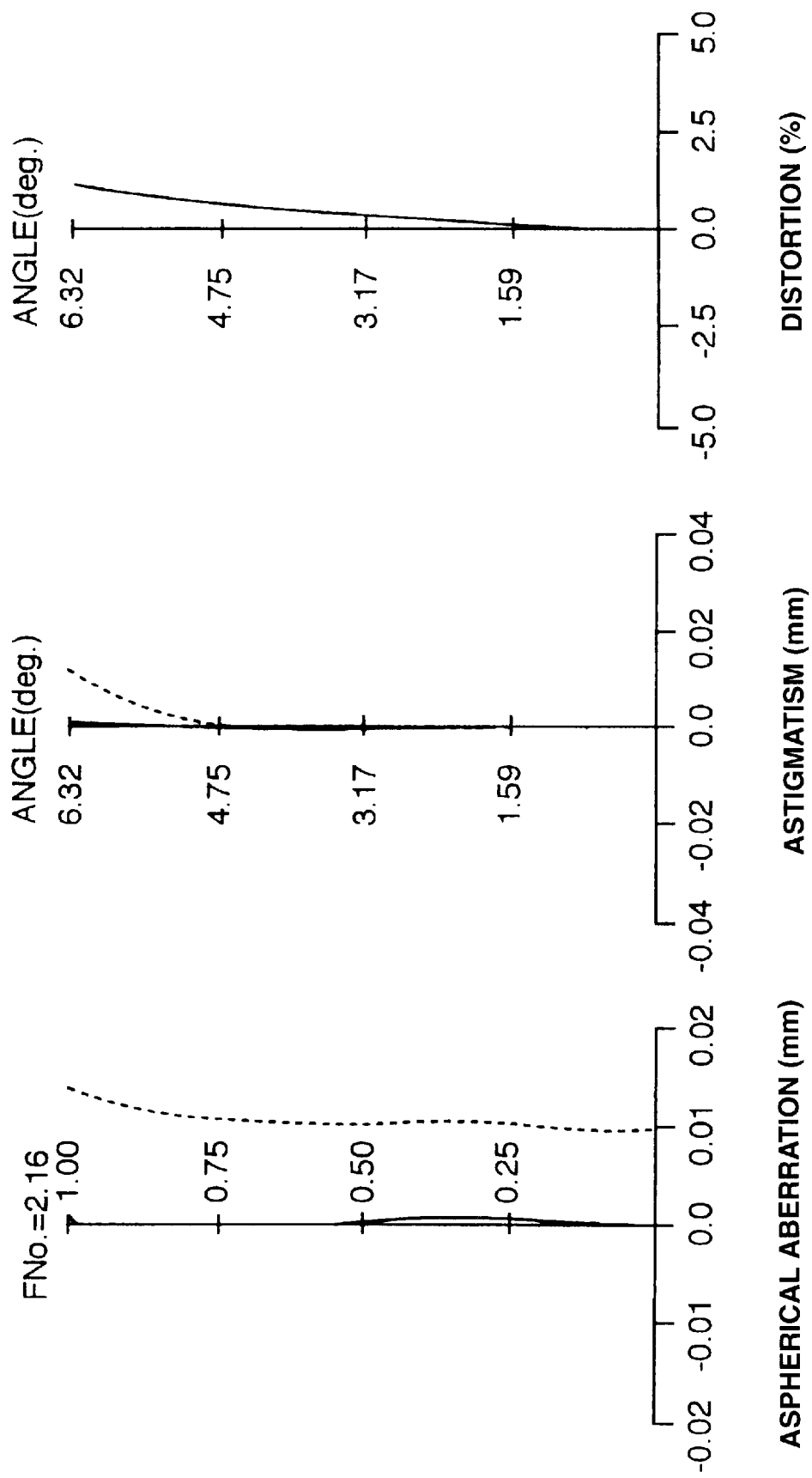
FIG. 4 shows aberrations at an intermediate focal point position between the wide angle end and the telephoto end.
Figure 5:
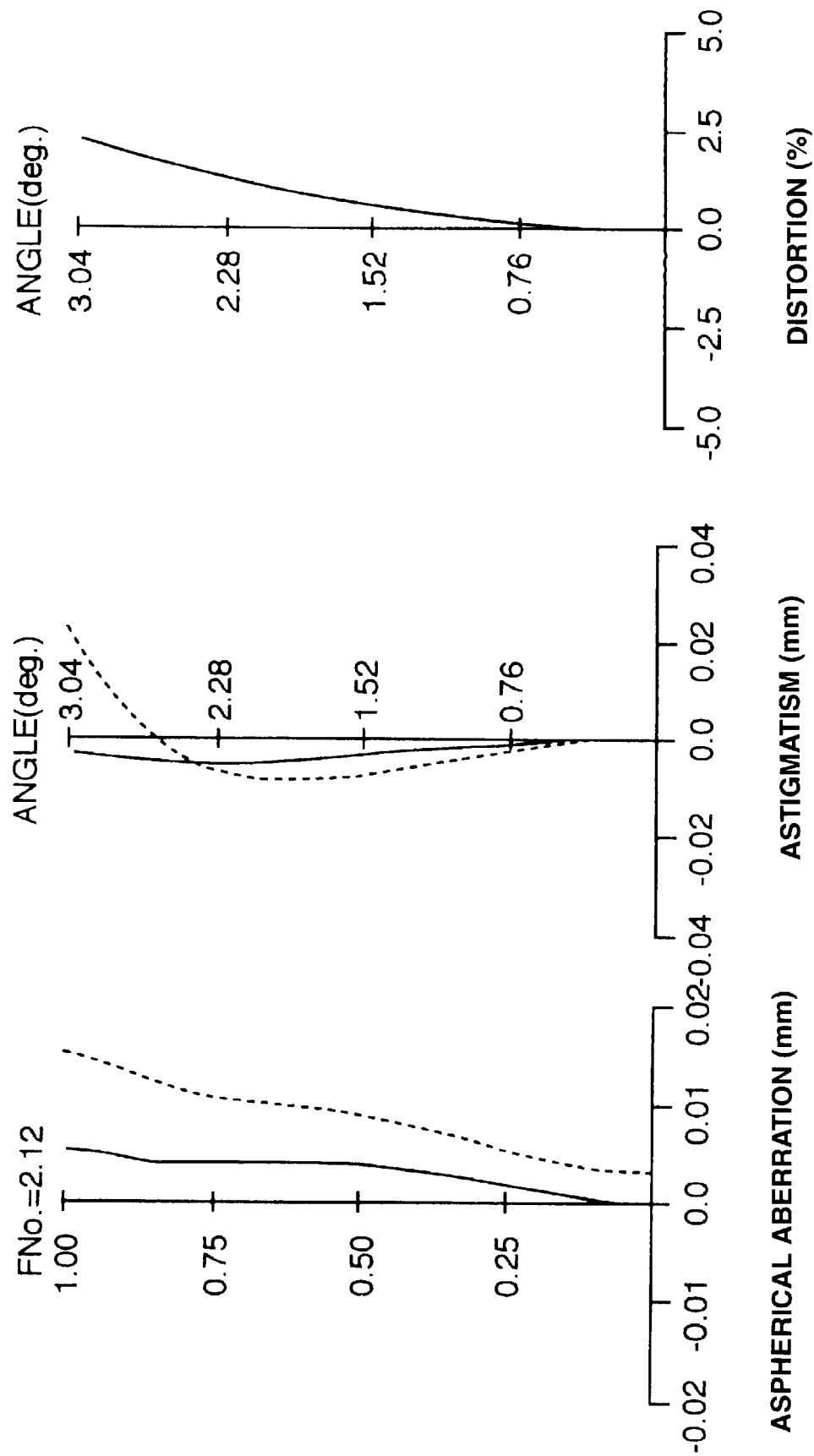
FIG. 5 shows aberrations at the telephoto end.

FIG. 3 to FIG. 5 respectively show spherical aberrations, astigmatism, distortion at the wide angle end, at the intermediate focal distance position between the wide angle end and the telephoto end, and at the telephoto end. It should be noted that in the figures of spherical aberrations, the solid line indicates the d line (wavelength 587.6 nm), the broken line indicates the g line (wavelength 435.8 nm); in the figures of astigmatism, the solid line indicates the sagital image surface and the broken line indicates a value on the meridional image surface (same in FIG. 7 to FIG. 9).

Table 4 shows numeric values of the zoom lens 2.

TABLE 4

| ri | di | ni | vi |
|---|---|---|---|
| r1 = 14.682 | d1 = 0.23 | n1 = 1.846663 | v1 = 23.8 |
| r2 = 4.976 | d2 = 1.29 | n2 = 1.696802 | v2 = 55.5 |
| r3 = −25.128 | d3 = 0.04 | | |
| r4 = 4.163 | d4 = 0.71 | n3 = 1.804199 | v3 = 46.5 |
| r5 = 10.667 | d5 = variable | | |
| r6 = 6.505 | d6 = 0.13 | n4 = 1.834999 | v4 = 43.0 |
| r7 = 1.304 | d7 = 0.67 | | |
| r8 = −1.578 | d8 = 0.13 | n5 = 1.622994 | v5 = 58.1 |
| r9 = 1.977 | d9 = 0.40 | n6 = 1.846663 | v6 = 23.8 |
| r10 = 21.980 | d10 = variable | | |
| r11 = 2.498 (ASP) | d11 = 0.37 | n7 = 1.583129 | v7 = 59.5 |
| r12 = −14.385 | d12 = 0.53 | | |
| r13 = ∞ (Diaphragm) | d13 = variable | | |
| r14 = 3.595 (ASP) | d14 = 0.27 | n8 = 1.693504 | v8 = 53.3 |
| r15 = −10.002 | d15 = 0.20 | n9 = 1.846663 | v9 = 23.8 |
| r16 = 2.856 | d16 = 0.69 | n10 = 1.583129 | v10 = 59.5 |
| r17 = −2.257 (ASP) | d17 = variable | | |
| r18 = ∞ | d18 = 0.78 | nFL = 1.516798 | vFL = 64.2 |
| r19 = ∞ | | | |

As shown in Table 4, in the zoom lens 2, the surface intervals d5, d10, d14, and d17 are variable for zooming, and focusing. Accordingly, Table 5 below shows the surface intervals d5, d10, d13, and d17 at the wide angle end (f=1.00), at the intermediate focal distance position (f=4.07) between the wide angle end and the telephoto end, and at the telephoto end (f=9.56), and FNo. and f.

TABLE 5

| f | 1.00 | 4.07 | 9.56 |
|---|---|---|---|
| FNo. | 1.84 | 2.05 | 1.97 |
| d5 | 0.186 | 2.334 | 3.193 |
| d10 | 3.182 | 1.034 | 0.175 |
| d13 | 1.241 | 0.532 | 1.162 |
| d17 | 0.533 | 1.242 | 0.613 |

Moreover, the surface r11 of the seventh lens L7 of the third lens group GR3 at the object side, the surface r17 of the eight lens and the surface r17 of tenth lens L10 of the fourth lens group GR4 at the image surface IMG side are formed as aspherical surfaces. Table 6 shows aspherical surface coefficients A4, A6, A8, and A10 of the power of 4, 6, 8, and 10 of the aforementioned surfaces r11, r14, and r17.

TABLE 6

| | A4 | A6 | A8 | A10 |
|---|---|---|---|---|
| r11 | −0.00877 | −0.01005 | 0.00958 | −0.00464 |
| r14 | −0.03868 | 0.01767 | −0.04208 | 0.02576 |
| r17 | −0.00030 | −0.01305 | 0.02785 | −0.02738 |

Figure 7:
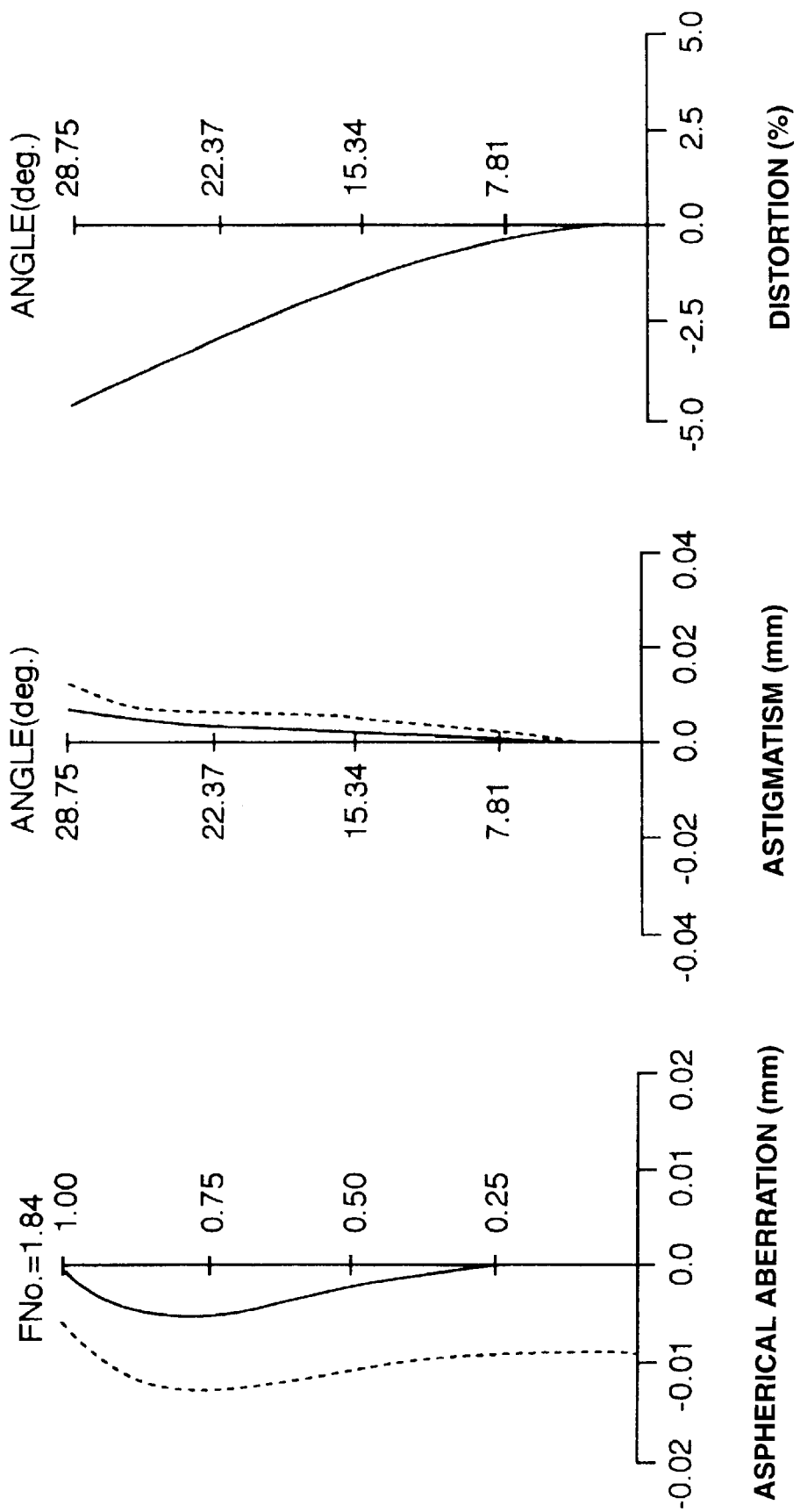
FIG. 7 shows aberrations at the wide angle end.
Figure 8:
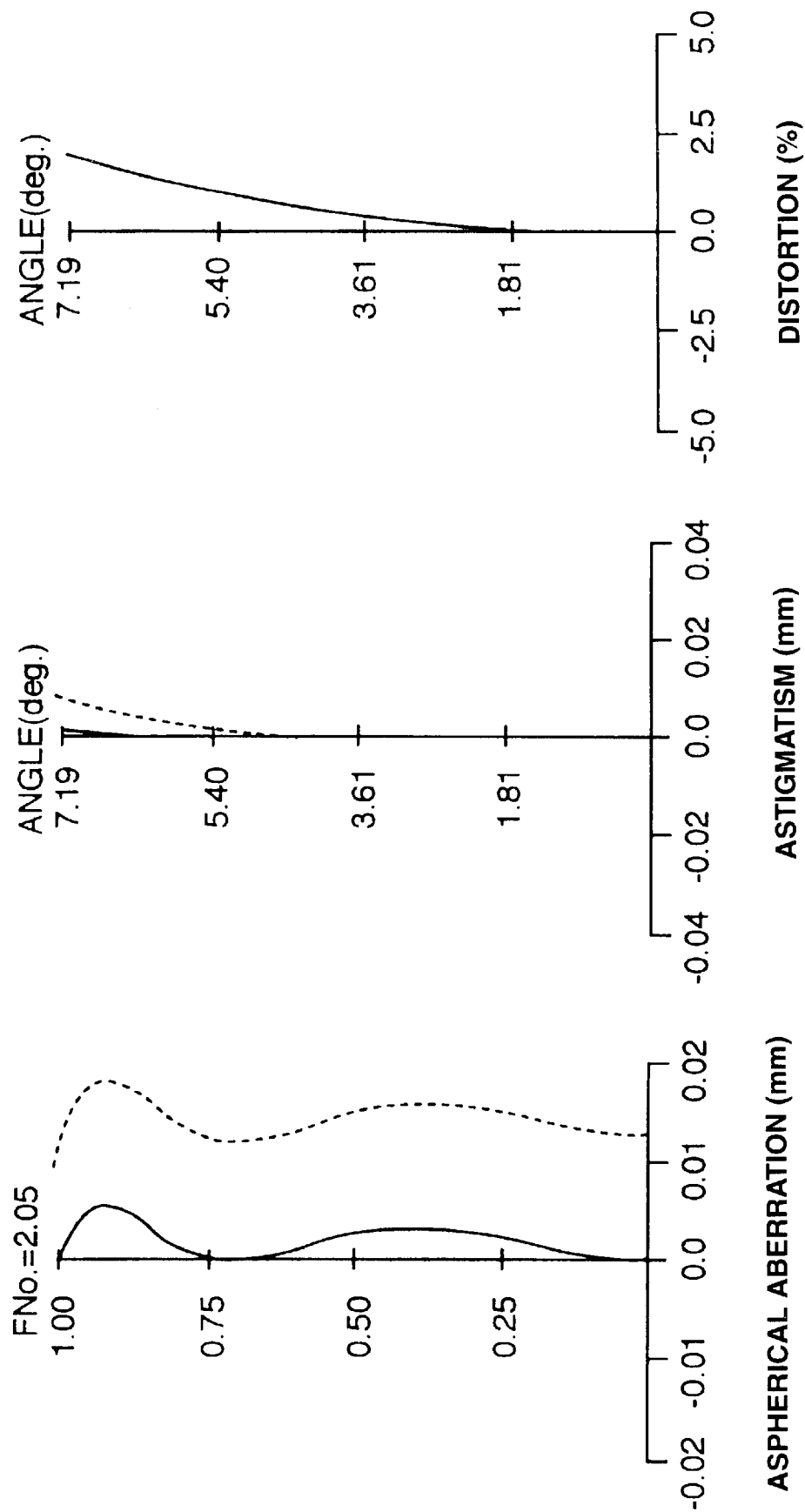
FIG. 8 shows aberrations at an intermediate focal point position between the wide angle end and the telephoto end.
Figure 9:
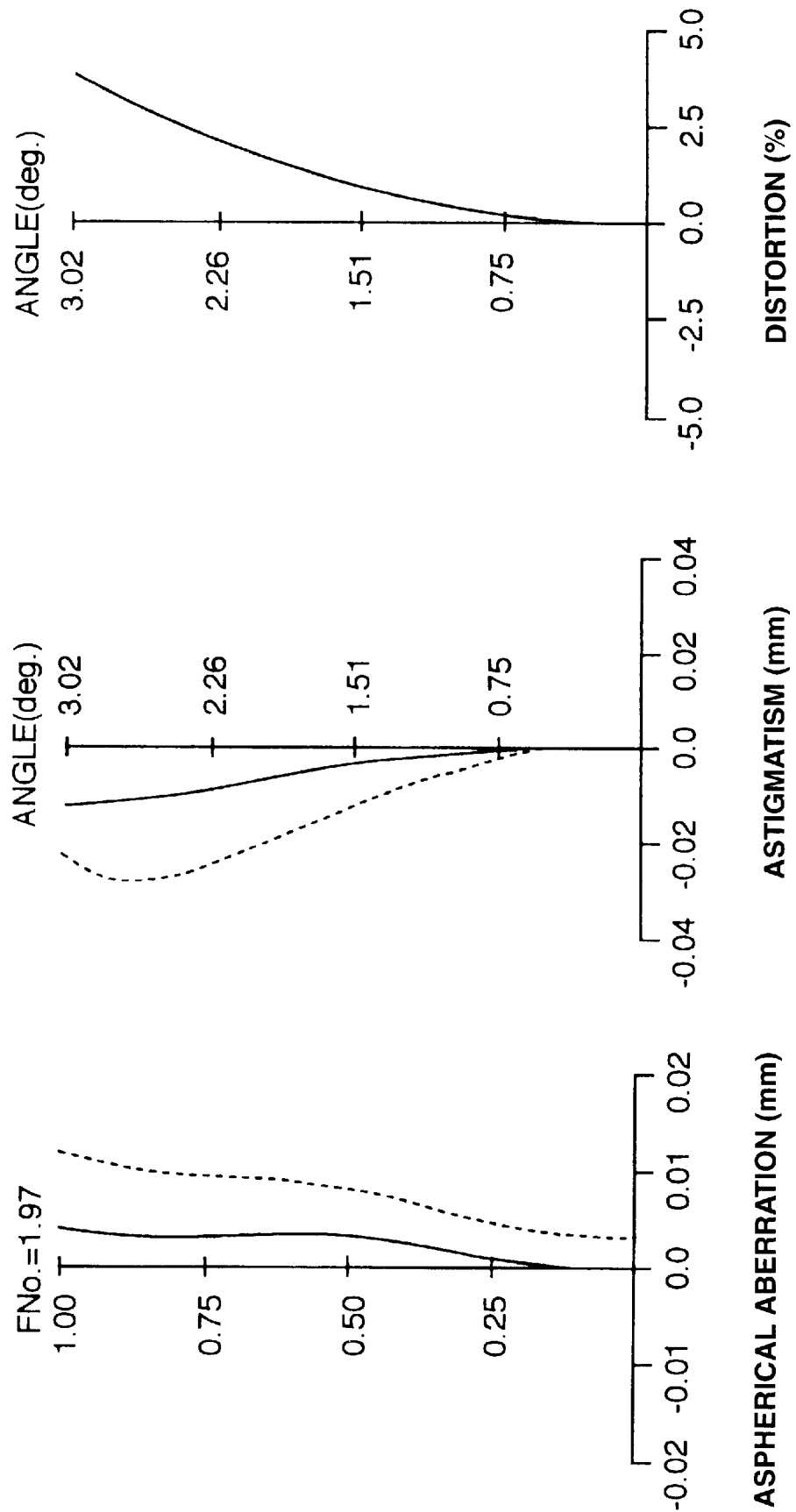
FIG. 9 shows aberrations at the telephoto end.

FIG. 7 to FIG. 9 respectively show spherical aberration, astigmatism, and distortion of the zoom lens 2 at the wide angle end, at the intermediate focal distance position between wide angle end and the telephoto end, and at the telephoto end.

Thus, the zoom lens 1 and 2 have of FNo. of about 1.8 and a high magnification of about 10 times and at the same time, they have aberrations preferably corrected over the entire magnification range. That is, the zoom lens 1 and 2 are small-size small-weight zoom lenses having excellent optical performance appropriate for a still camera and a video camera.

The zoom lens 3 and 4 in the third and the fourth numerical examples are intended for preferably correcting aberrations with a high magnification of 25 times or more a small number of lenses and as shown in FIG. 10 to FIG. 14, includes a first lens group GR1 having a positive refracting power and its position fixed, a second lens group GR2 having a negative refracting power and displacable for magnification, a third lens group GR3 having a positive refracting power and its position fixed, and a fourth lens group GR4 having a positive refracting power and displacable for zooming focal point position correction and focusing. The first lens group GR1 includes, viewed from an object, a cemented lens consisting of a first lens L1 having a convex surface facing an object and a second lens L2 which is a convex lens, and a third lens L3 which is a convex meniscus lens having a convex surface facing the object; the second lens group GR2 includes, viewed from an object, a fourth lens L4 which is a concave meniscus lens having a convex surface facing the object and a cemented lens consisting of a fifth lens L5 which is a both-side-concave lens and a sixth lens L6 which is a convex lens; the third lens group GR3 includes a seventh lens L7 which is a convex lens having a convex surface facing the object; and the fourth lens group GR4 includes, viewed from the object side, a cemented lens consisting of an eighth lens L8 which is a convex lens having a convex surface facing the object, a ninth lens L9 which is a concave lens, and a tenth lens L10 which is a convex lens.

Moreover, in the zoom lens 3 and 4, zooming is performed by displacing the second lens group GR2 and the fourth lens group GR4. When zooming is performed from the width angle end to the telephoto end, the second lens group GR2 is displaced from the object side to the image side and the fourth lens group GR4 is displaced so as to maintain an image position. In the zoom lens 3 and 4, focusing is performed by displacing the fourth lens group GR4.

It should be noted that a diaphragm IR is arranged between the second lens group GR2 and the third lens group GR3, and a filter FL such as a low pass filter is arranged between the fourth lens group GR4 and the image surface IMG.

Furthermore, the zoom lens 3 and 4 are formed so as to satisfy the aforementioned condition equations 1, 4, and 5.

Figure 10:
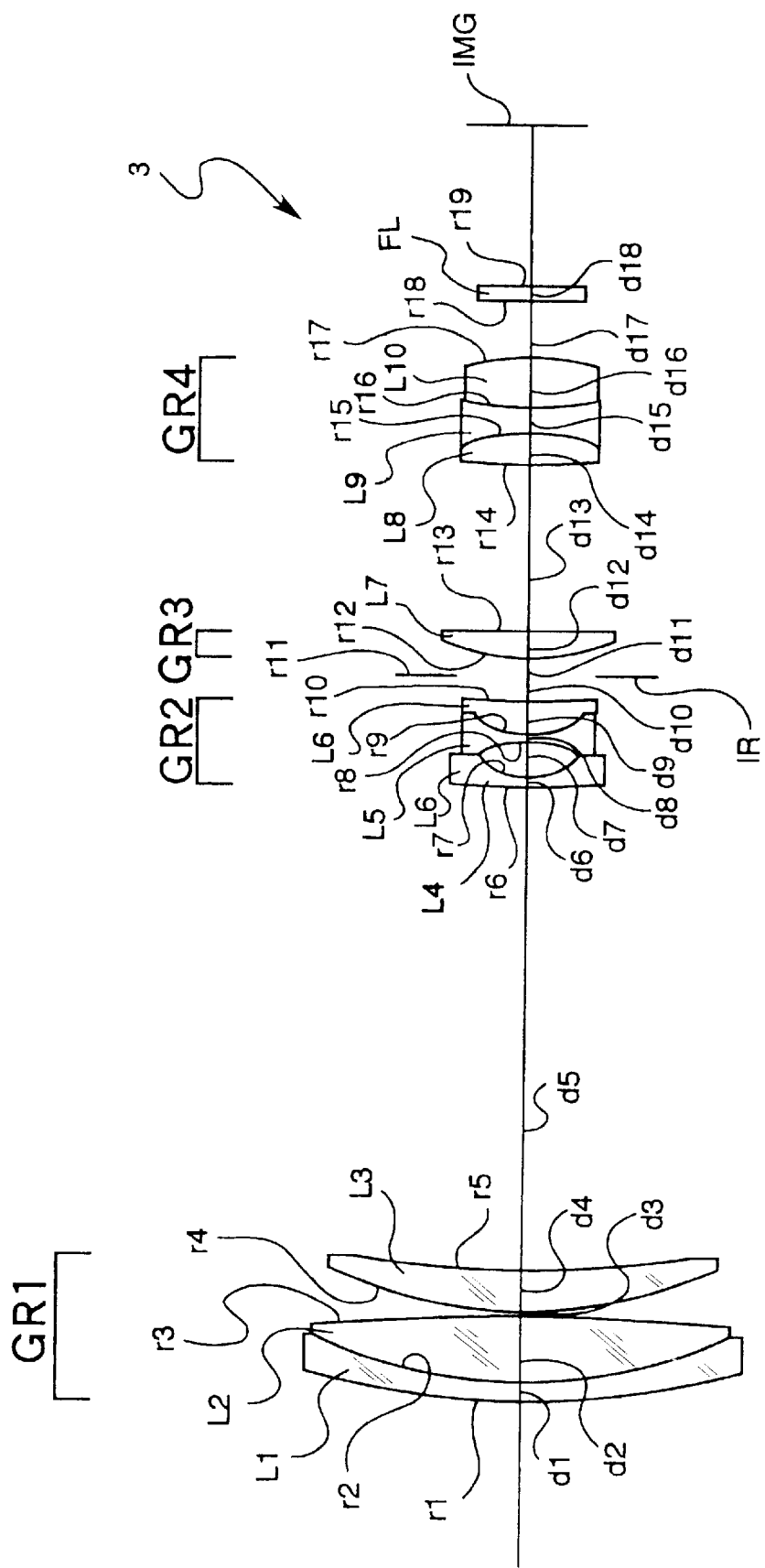
FIG. 10 together with FIG. 11 to FIG. 13 shows a third numerical example of the zoom lens according to the present invention.

FIG. 10 shows the zoom lens 3 according to the third numeric example.

Table 7 below shows numeric values of the zoom lens 3.

TABLE 7

| ri | di | ni | vi |
|---|---|---|---|
| r1 = 65.8500 | d1 = 1.2000 | n1 = 1.84666 | v1 = 23.8 |
| r2 = 36.0000 | d2 = 5.0500 | n2 = 1.48749 | v2 = 70.2 |
| r3 = −167.0000 | d3 = 0.2000 | | |
| r4 = 31.7000 | d4 = 3.2300 | n3 = 1.69680 | v3 = 55.6 |
| r5 = 89.0000 | d5 = variable | | |
| r6 = 103.5500 | d6 = 0.7400 | n4 = 1.83400 | v4 = 37.3 |
| r7 = 6.3000 | d7 = 2.6300 | | |
| r8 = −14.3600 | d8 = 0.7100 | n5 = 1.51742 | v5 = 52.0 |
| r9 = 7.9910 | d9 = 2.5300 | n6 = 1.84666 | v6 = 23.8 |
| r10 = 83.8500 | d10 = variable | | |
| r11 = ∞ (Diaphragm) | d11 = 1.4000 | | |
| r12 = 16.4900 | d12 = 2.2400 | n7 = 1.58547 | v7 = 59.6 |
| r13 = −493.0000 | d13 = variable | | |
| r14 = 28.6500 | d14 = 2.4500 | n8 = 1.58547 | v8 = 59.6 |
| r15 = −13.5000 | d15 = 1.8600 | n9 = 1.84666 | v9 = 23.8 |
| r16 = 30.0000 | d16 = 3.8000 | n10 = 1.72342 | v10 = 38.0 |
| r17 = −13.6900 | d17 = variable | | |
| r18 = ∞ | d18 = 1.2000 | nFL = 1.51680 | vFL = 64.4 |
| r19 = ∞ | | | |

In Table 7 above, the surface intervals d5, d10, d13, and d17 are variable according to zooming and focusing.

Accordingly, Table 8 below shows FNo., d5, d10, d13, and d17 at the wide angle end (f=3.7995), an the intermediate focal distance position (f=34.7895) between the wide angle end and the telephoto end, and at the telephoto end (f=95.6720).

TABLE 8

| f | FNo. | d5 | d10 | d13 | d17 |
|---|---|---|---|---|---|
| 3.7995 | 1.65 | 1.1000 | 37.5453 | 10.8683 | 5.6371 |
| 34.7895 | 2.30 | 30.5066 | 8.1386 | 5.0614 | 11.4439 |
| 95.6720 | 3.43 | 36.6956 | 1.9496 | 12.3798 | 4.1255 |

Moreover, in the third lens group GR3 and the fourth lens group GR4, the surface r12 of the seventh lens L7 at the object side and the surface r14 of the eighth lens L8 at the object side arc formed as asperical surfaces. Table 9 shows aspherical coefficients A4, A6, A8 and A10 of powers 4, 6, 8, 10 of the surfaces r12 and r14.

TABLE 9

| Plane | A4 | A6 | A8 | A10 |
|---|---|---|---|---|
| r12 | −2.237850E−05 | −1.113800E−07 | −2.499280E−09 | 4.197170E−11 |
| r14 | −1.665710E−04 | −6.732920E−07 | 7.016350E−09 | −3.022400E−10 |

It should be noted that "E" in the table 9 above represents an exponential expression with 10 as a base (the same applies to tables below showing aspherical coefficients).

Figure 11:
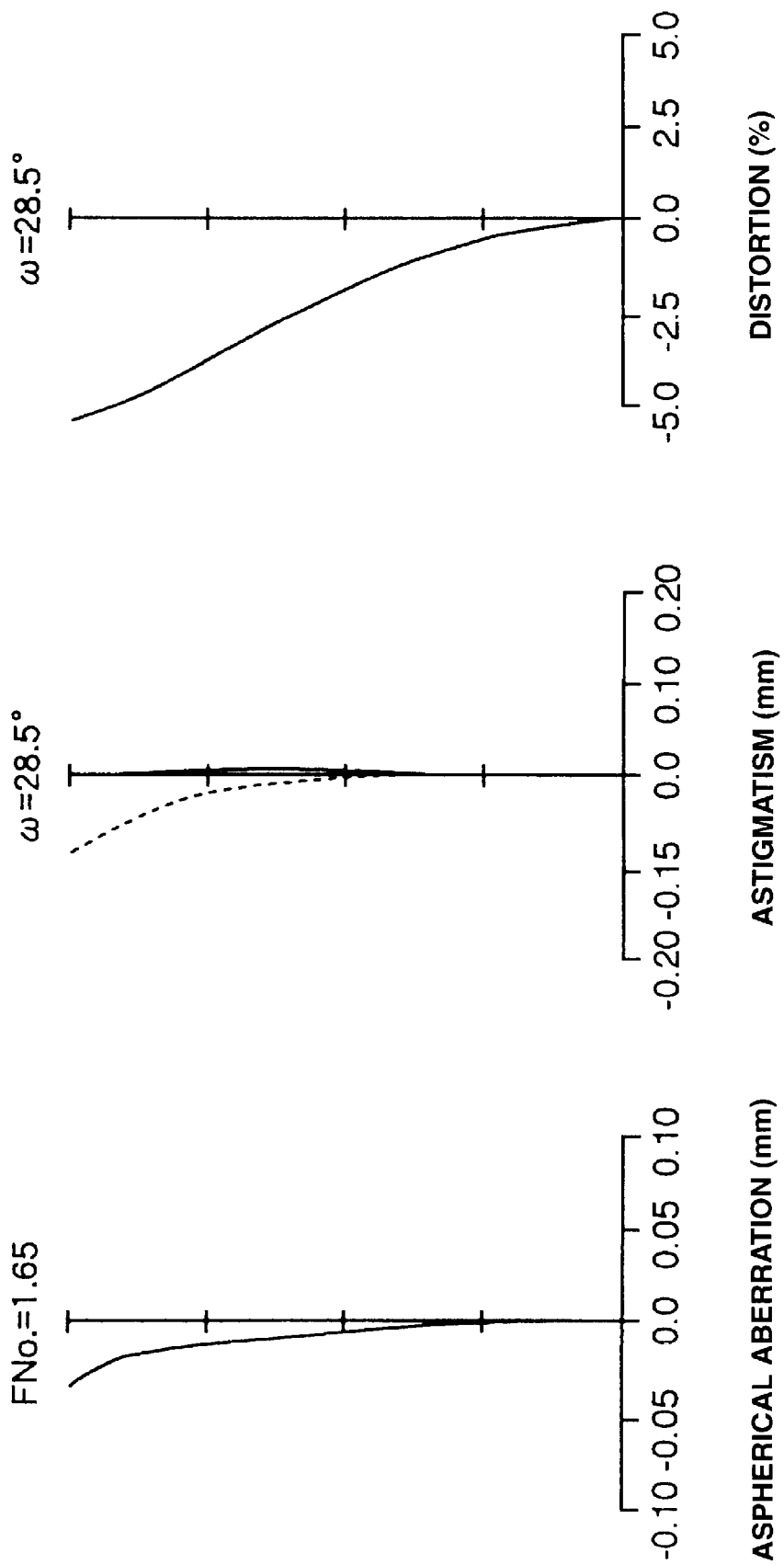
FIG. 11 shows aberrations at the wide angle end.
Figure 12:
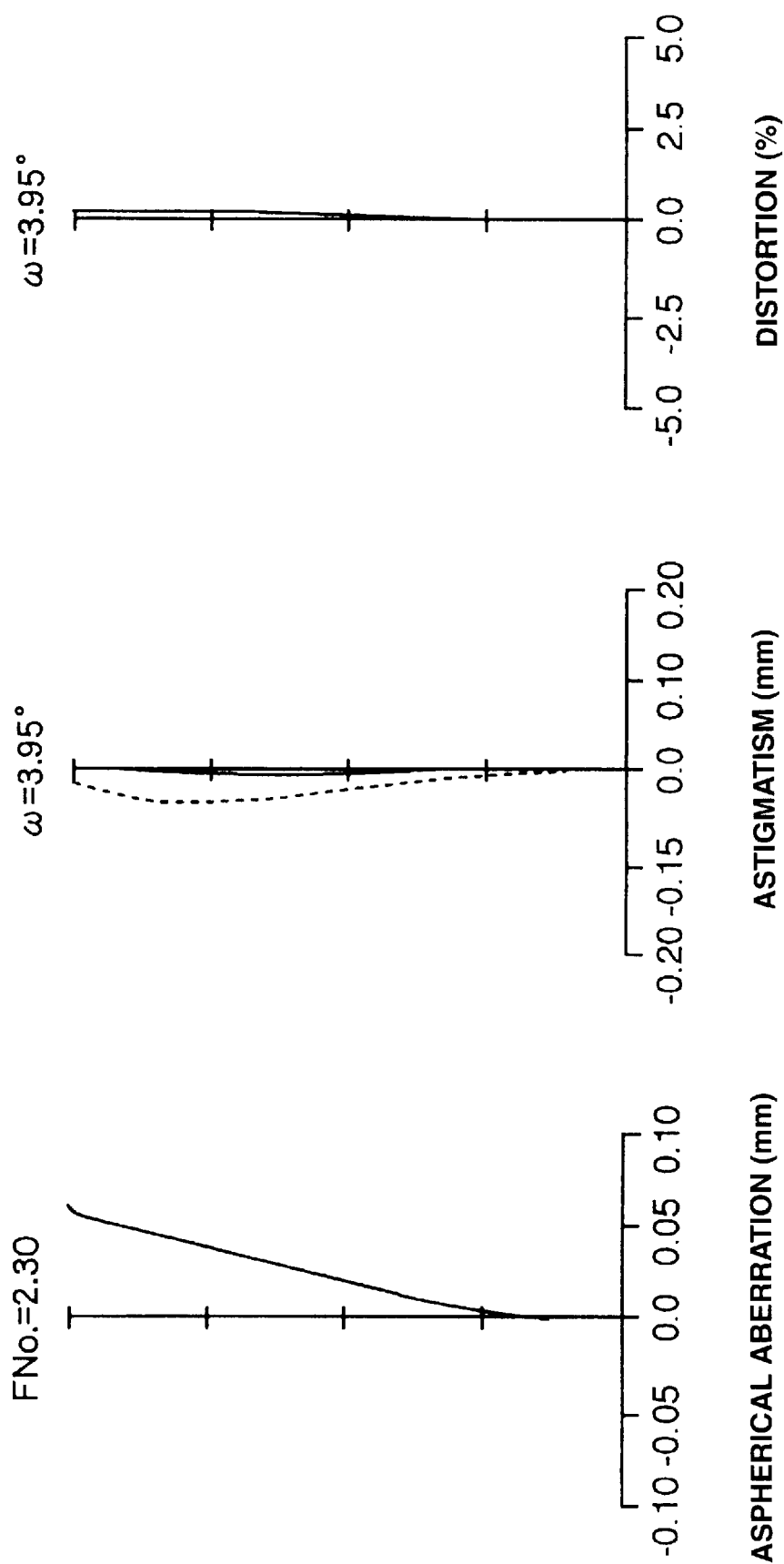
FIG. 12 shows aberrations at an intermediate focal point position between the wide angle end and the telephoto end.
Figure 13:
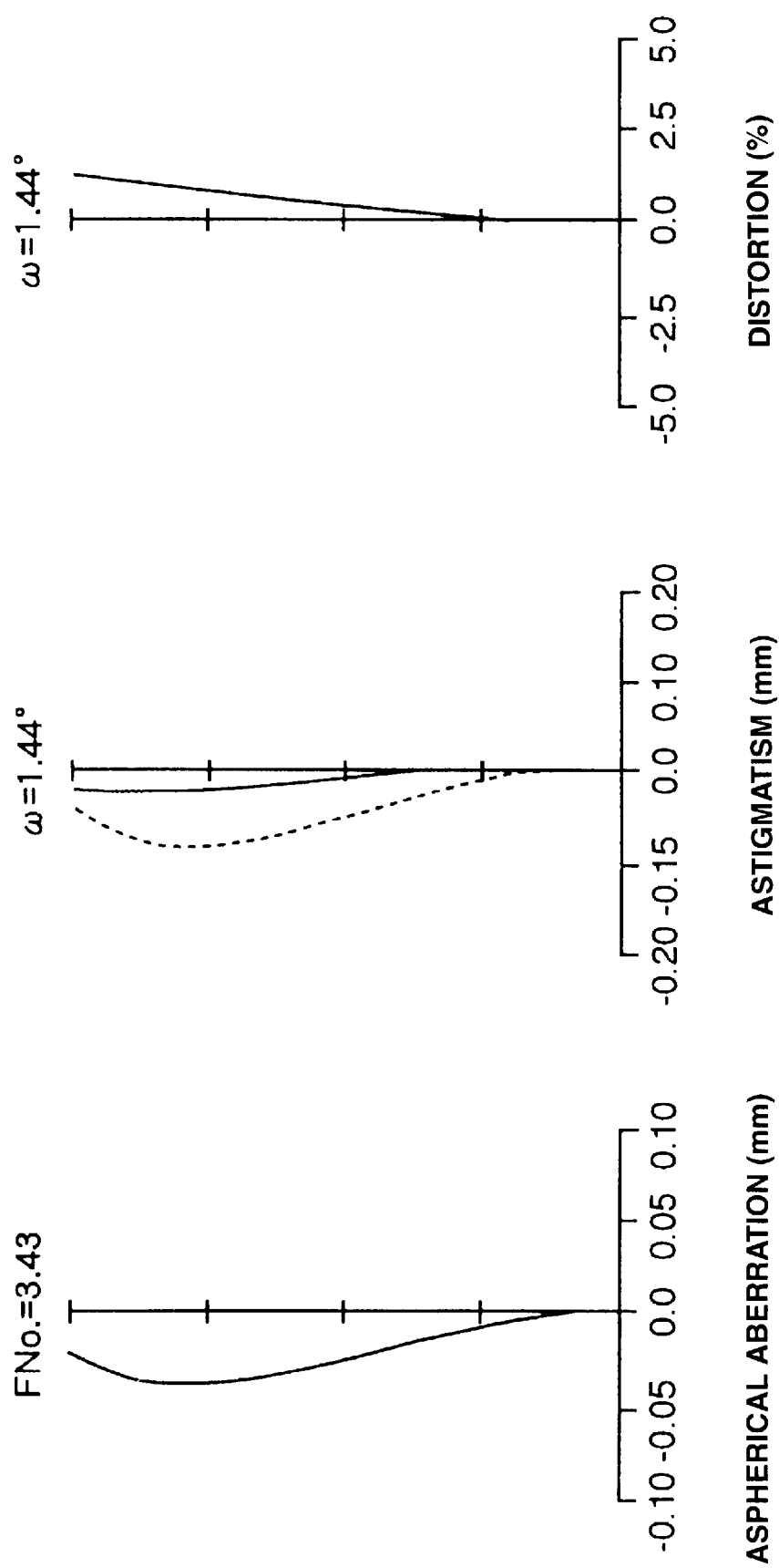
FIG. 13 shows aberrations at the telephoto end.

FIG. 11 to FIG. 13 respectively show aspherical aberration, astigmatism, and distortion of the zoom lens 3 at the wide angle end, at the intermediate focal distance position between the wide angle end and the telephoto end, and at the telephoto end. It should be noted that in the astigmatism, the solid line represents values on a sagital image plane, and the broken line represents values on the meridional image surface (the same applies to FIG. 15 to FIG. 17).

Figure 14:
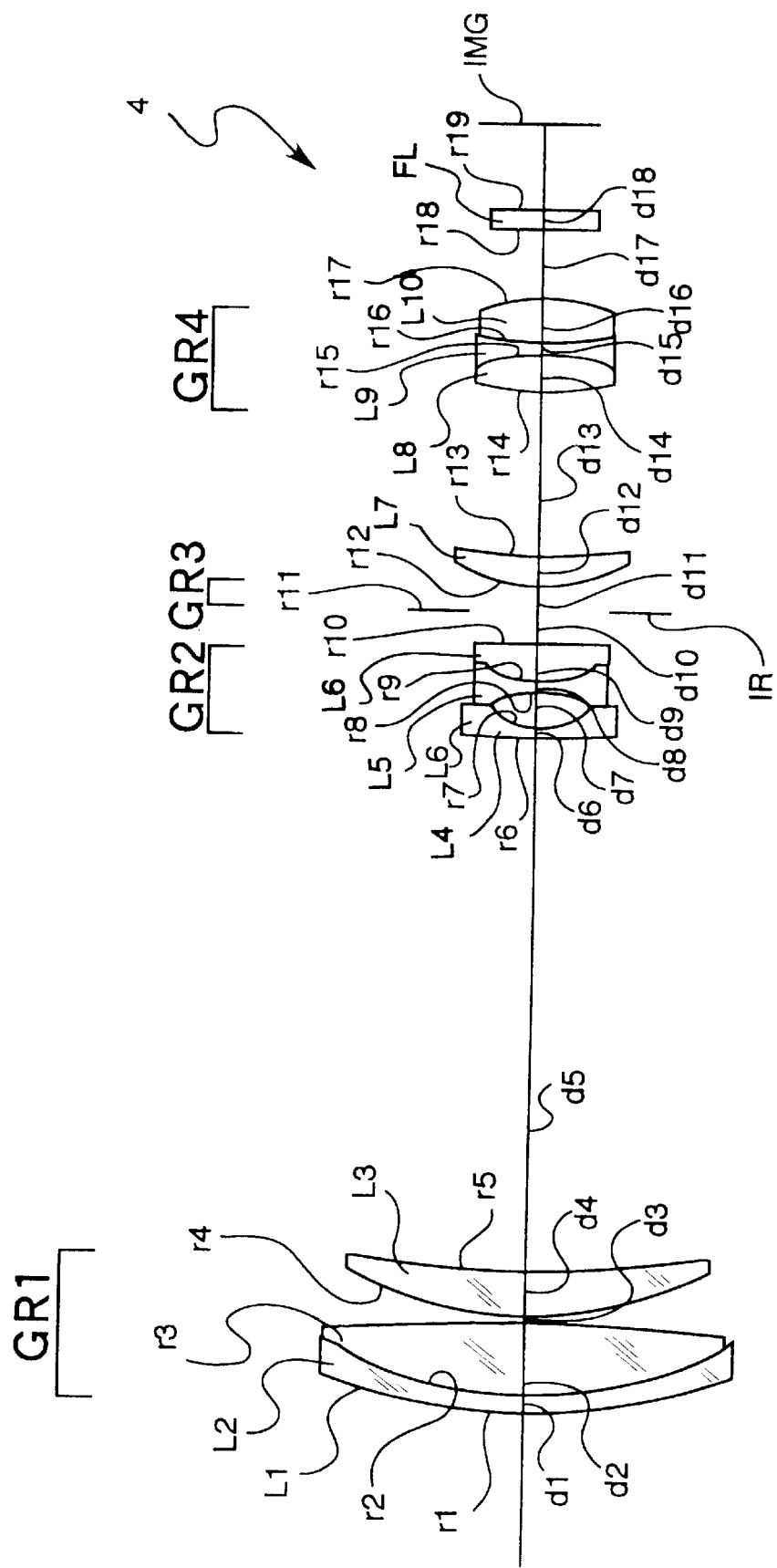
FIG. 14 together with FIG. 15 to FIG. 17 shows a fourth numerical example of the zoom lens according to the present invention.

FIG. 14 shows the zoom lens 4 in the fourth numerical example.

Table 10 below shows numerical values of the zoom lens 4.

TABLE 10

| ri | di | ni | vi |
|---|---|---|---|
| r1 = 64.4000 | d1 = 1.2000 | n1 = 1.84666 | v1 = 23.8 |
| r2 = 36.7500 | d2 = 5.1900 | n2 = 1.58913 | v2 = 61.2 |
| r3 = −123.5000 | d3 = 0.2000 | | |
| r4 = 30.9400 | d4 = 2.9900 | n3 = 1.69680 | v3 = 55.6 |
| r5 = 69.5700 | d5 = variable | | |
| r6 = 315.0000 | d6 = 0.7100 | n4 = 1.83400 | v4 = 37.3 |
| r7 = 6.5500 | d7 = 2.6000 | | |
| r8 = −10.8500 | d8 = 0.7000 | n5 = 1.62299 | v5 = 58.1 |
| r9 = 9.0000 | d9 = 2.7600 | n6 = 1.84666 | v6 = 23.8 |
| r10 = 599.0000 | d10 = variable | | |
| r11 = ∞ (Diaphragm) | d11 = 2.0000 | | |

TABLE 10-continued

| ri | di | ni | vi |
|---|---|---|---|
| r12 = 13.7000 | d12 = 2.1800 | n7 = 1.51680 | v7 = 64.2 |
| r13 = 63.0100 | d13 = variable | | |
| r14 = 25.1100 | d14 = 2.4100 | n8 = 1.74330 | v8 = 49.2 |
| r15 = −16.2700 | d15 = 1.0500 | n9 = 1.84666 | v9 = 23.8 |
| r16 = 27.4600 | d16 = 3.0900 | n10 = 1.58913 | v10 = 61.2 |
| r17 = −15.5300 | d17 = variable | | |
| r18 = ∞ | d18 = 1.2000 | nFL = 1.51680 | vFL = 64.4 |
| r19 = ∞ | | | |

In Table 10 above, the surface interval d5, d10, d13, and d17 are variable according to zooming and focusing. Accordingly, Table 11 below shows values of FNo., d5, d10, d13, and d17 at the wide angle end (f=3.8000), at the intermediate focal distance position (f=33.4884) between the wide angle end and the telephoto end, and at the telephoto end (f=90.8307).

TABLE 11

| f | FNo. | d5 | d10 | d13 | d17 |
|---|---|---|---|---|---|
| 3.8000 | 1.65 | 2.1989 | 36.5111 | 11.2544 | 4.6995 |
| 33.4884 | 2.17 | 30.2452 | 8.4648 | 4.5805 | 11.3734 |
| 90.8307 | 3.10 | 36.9600 | 1.7500 | 7.3276 | 8.6262 |

Moreover, in the third lens group GR3 and the fourth lens group GR4, the surface r13 of the seventh lens L7 at the image side and the surface r14 of the eight lens L8 at the object side are formed as aspherical surfaces. Table 12 shows aspherical coefficients A4, A6, A8, and A10 of the powers 4, 6, 8, 10 of the aforementioned planes r13 and r14.

TABLE 12

| Plane | A4 | A6 | A8 | A10 |
|---|---|---|---|---|
| r13 | 4.238291E−05 | 2.214130E−07 | 1.044650E−09 | −4.247090E−11 |
| r14 | −1.432060E−04 | −5.955340E−08 | −5.948130E−09 | −1.721910E−10 |

Figure 15:
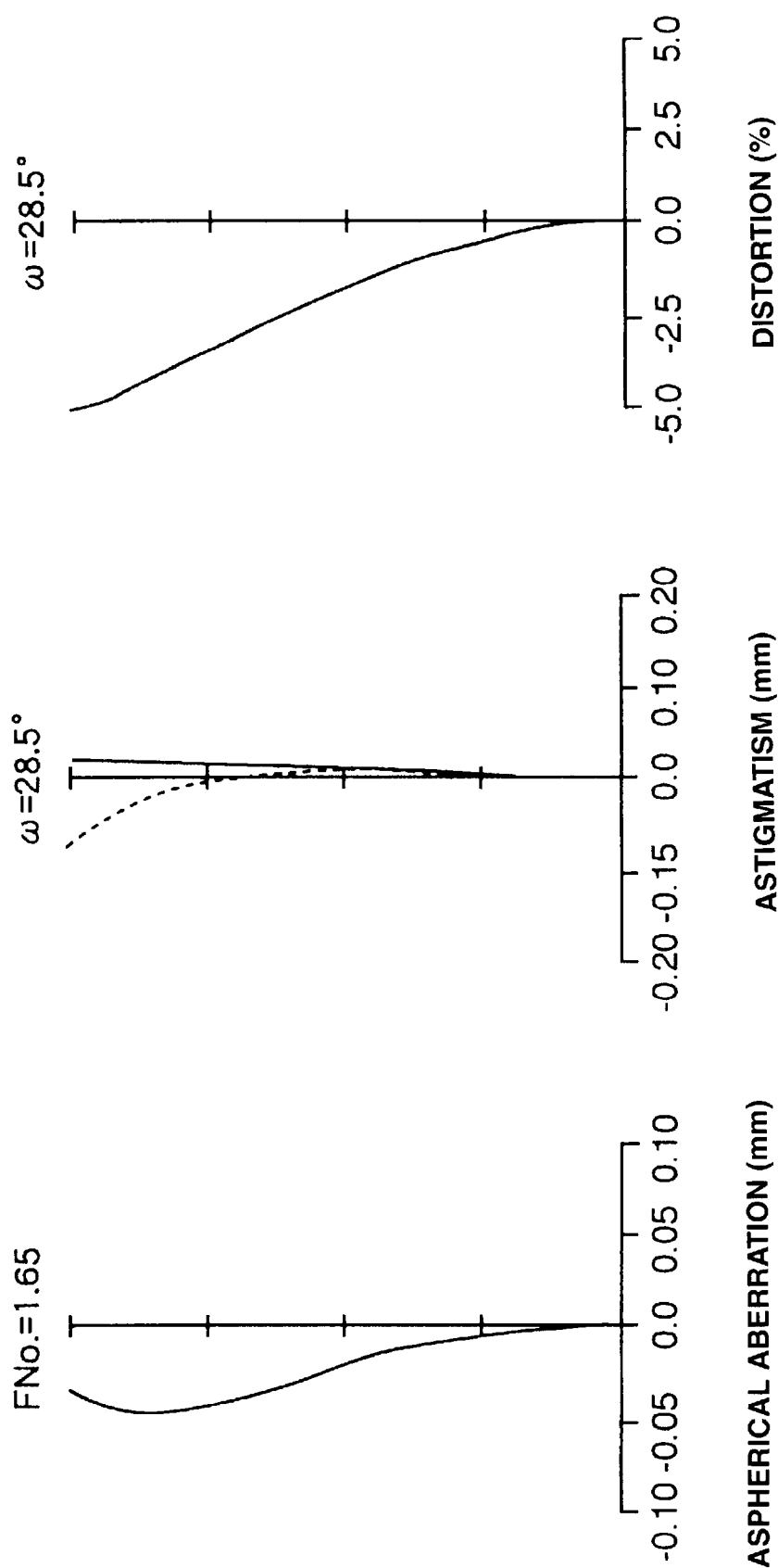
FIG. 15 shows aberrations at the wide angle end.
Figure 16:
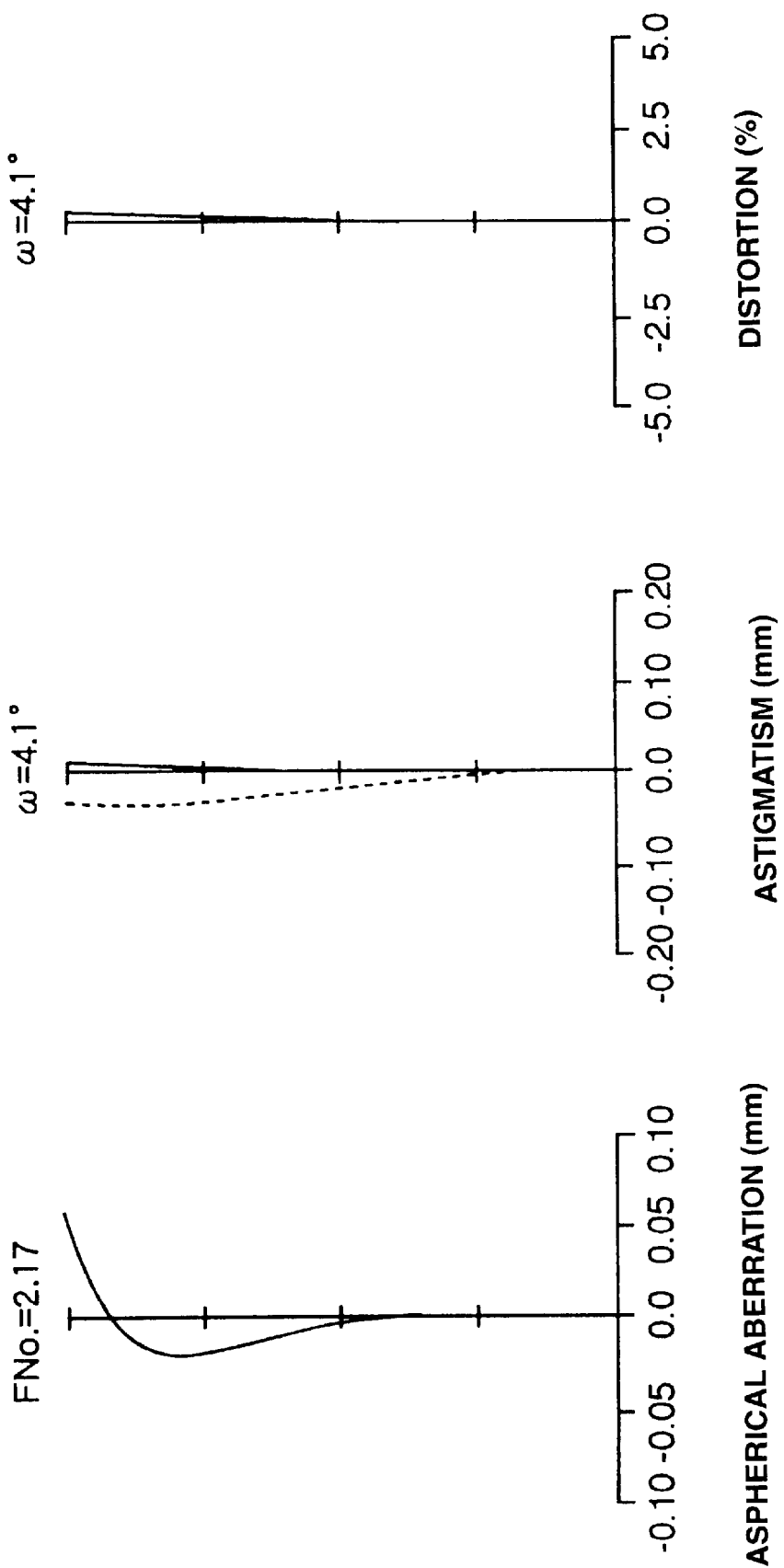
FIG. 16 shows aberrations at an intermediate focal point position between the wide angle end and the telephoto end.
Figure 17:
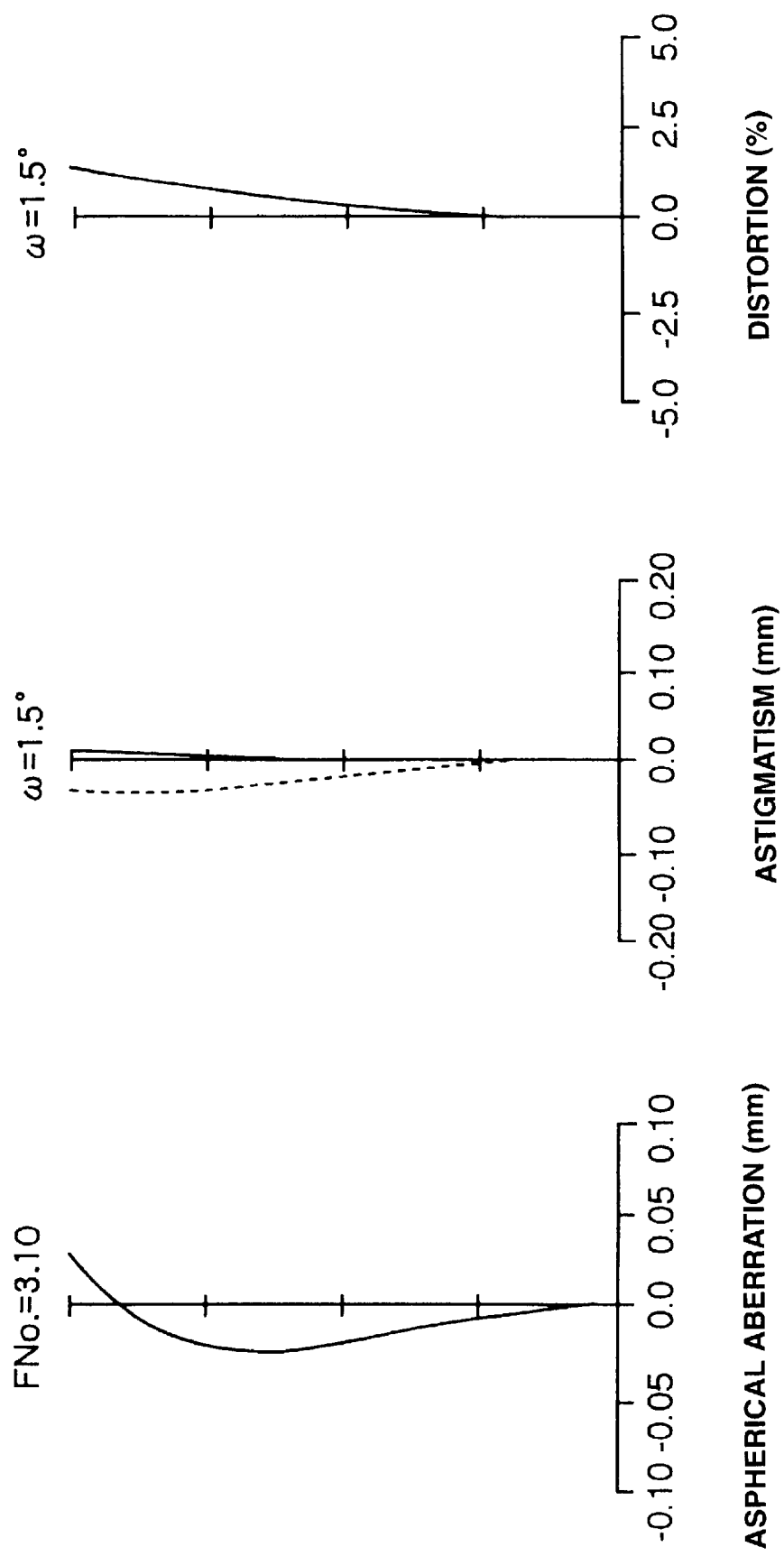
FIG. 17 shows aberrations at the telephoto end.

FIG. 15 to FIG. 17 respectively show spherical aberration, astigmatism, and distortion of the zoom lens 4 at the wide angle end, at the intermediate focal distance position between the wide angle end and the telephoto end, and at the telephoto end.

Table 13 below shows numeric values of the condition equations 4 and 5 of the zoom lens 3 and 4 shown in the aforementioned third and fourth numeric examples.

TABLE 13

| | Condition Equation 4 | Condition Equation 5 |
|---|---|---|
| Numerical Example 3 | 9.37 | 1.33 |
| Numerical Example 4 | 9.15 | 1.40 |

The zoom lens 3 and 4 in the aforementioned numeric examples 3 and 4 satisfy the condition equations 1, 4, and 5, and with a lens system of 10 lenses of six groups of the four-group zoom, it is possible to obtain a zoom lens appropriate for a video camera in which aberrations are preferably corrected with a small number of lenses and a high magnification of 25 times or above can be obtained.

Figure 18:
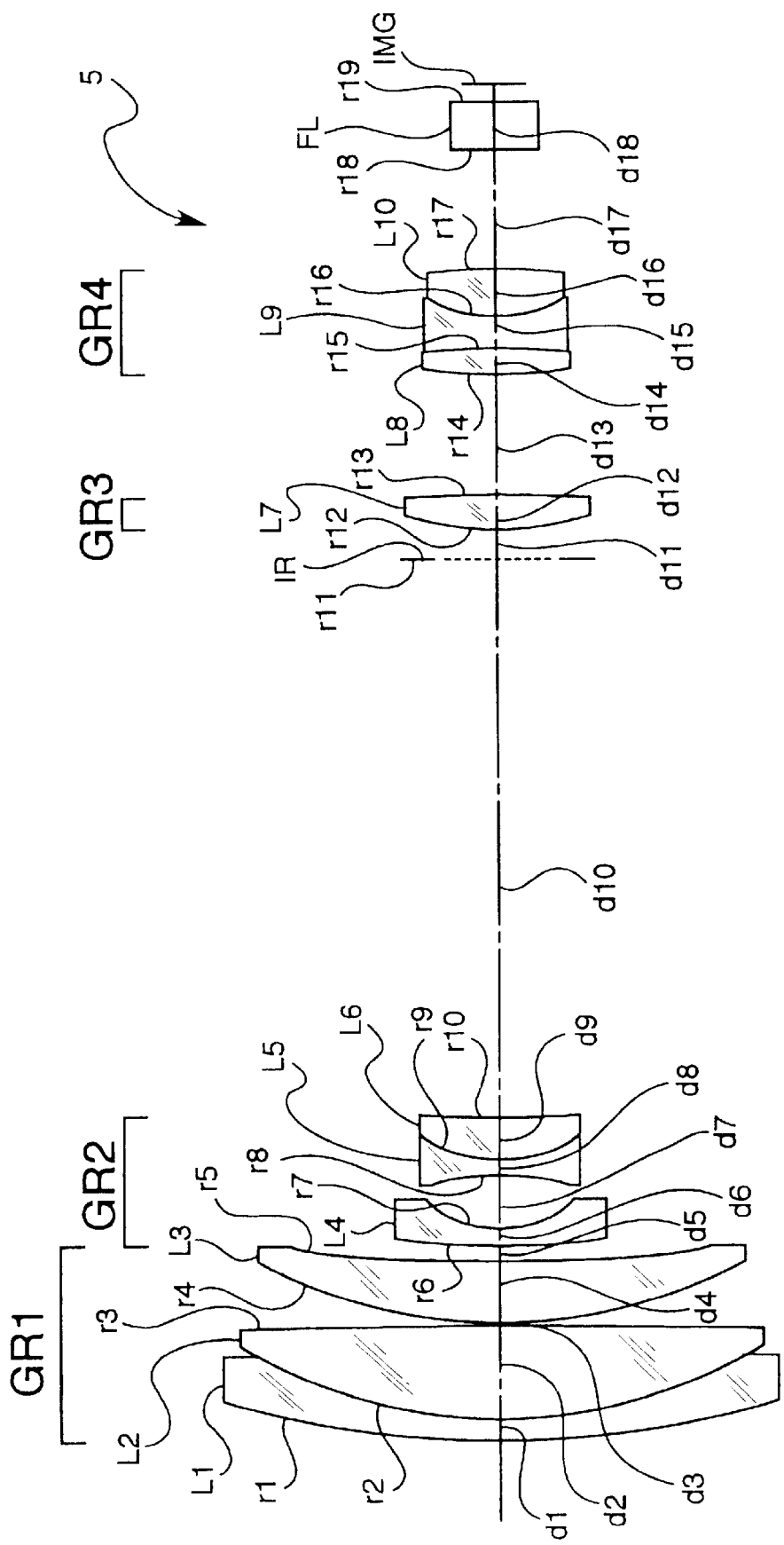
FIG. 18 together with FIG. 19 to FIG. 21 shows a fifth numerical example of the zoom lens according to the present invention.
Figure 22:
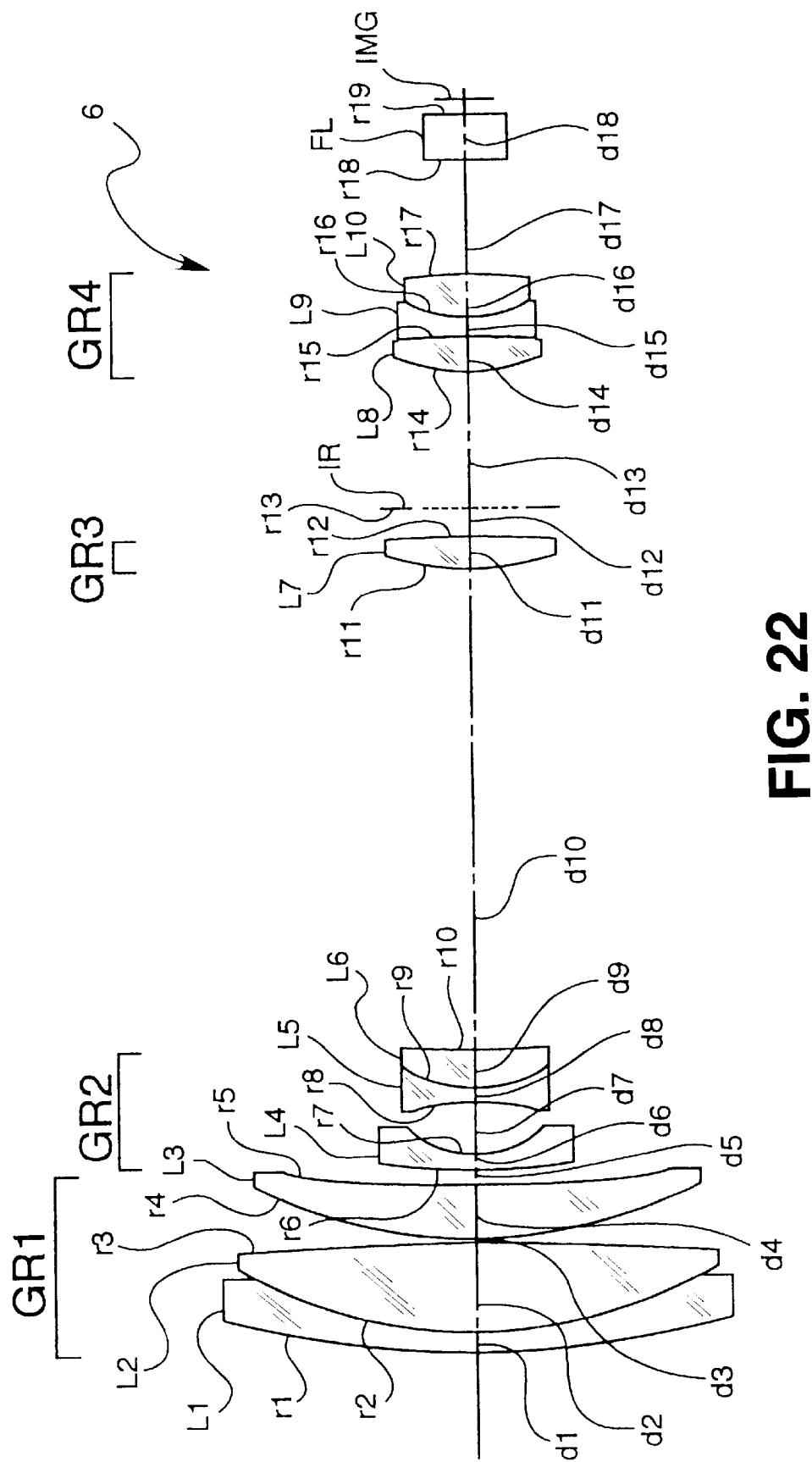
FIG. 22 together with FIG. 23 to FIG. 25 shows a sixth numerical example of the zoom lens according to the present invention.
Figure 26:
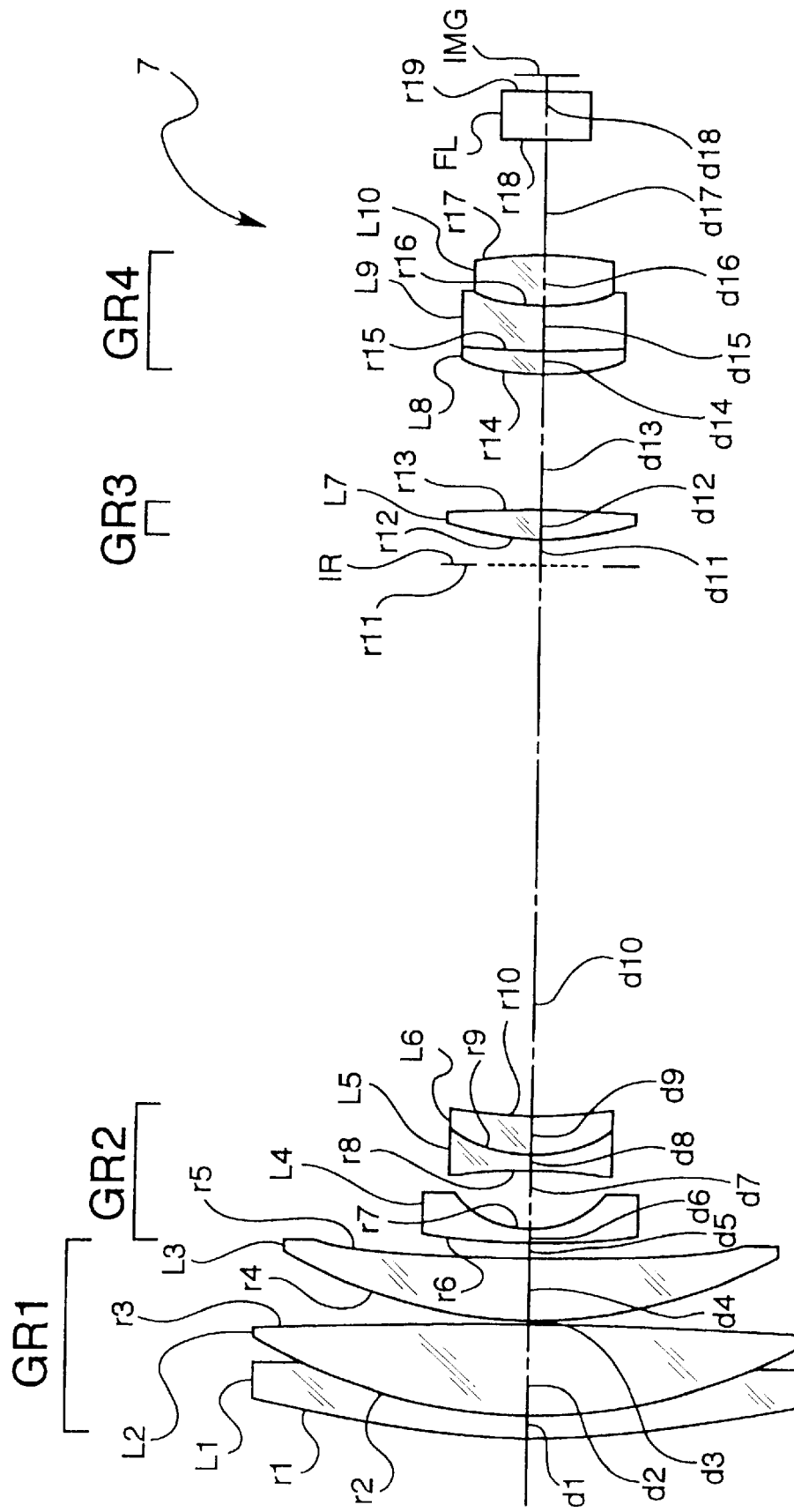
FIG. 26 together with FIG. 27 to FIG. 29 shows a seventh numerical example of the zoom lens according to the present invention.
Figure 27:
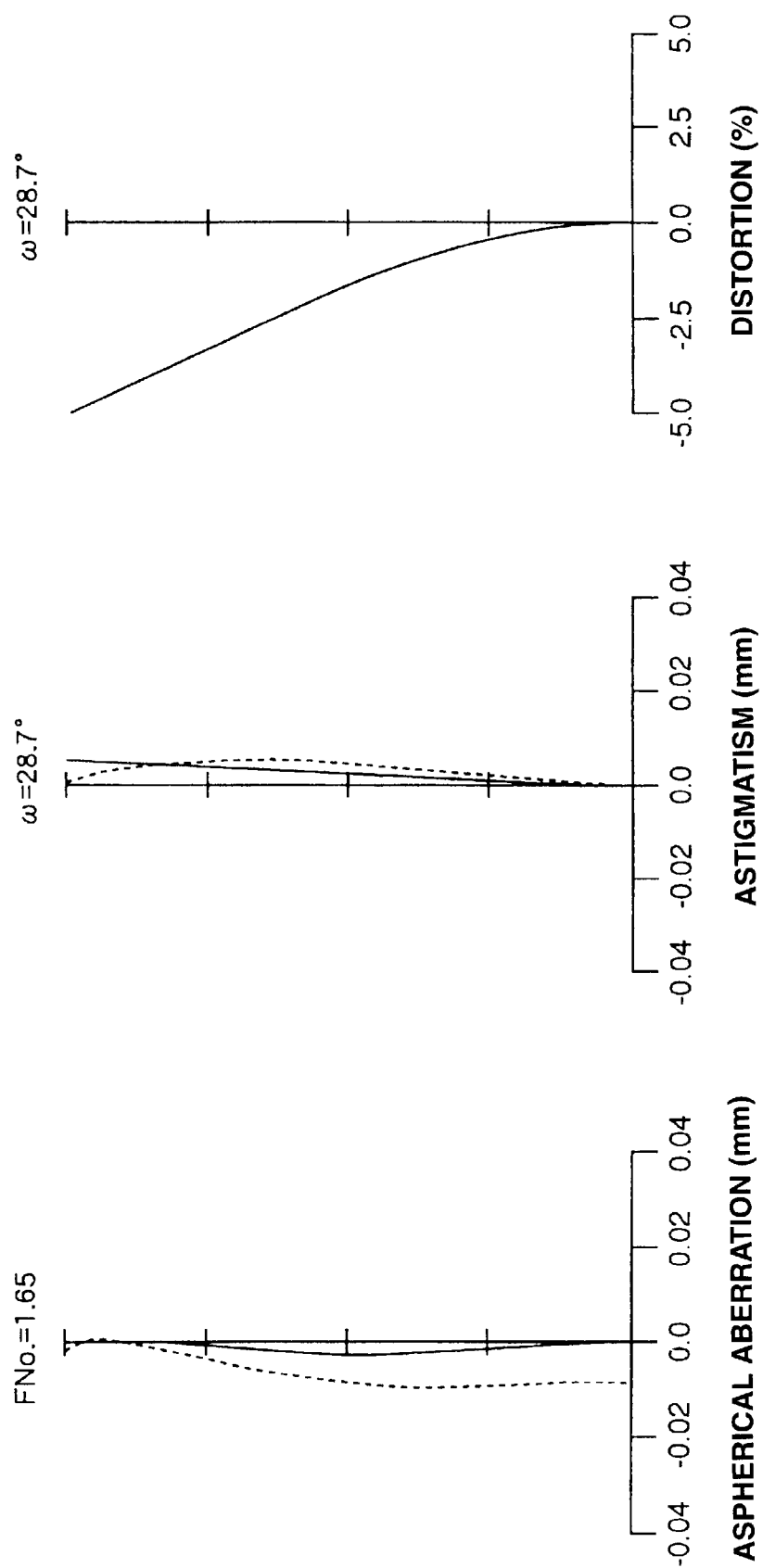
FIG. 27 shows aberrations at the wide angle end.
Figure 28:
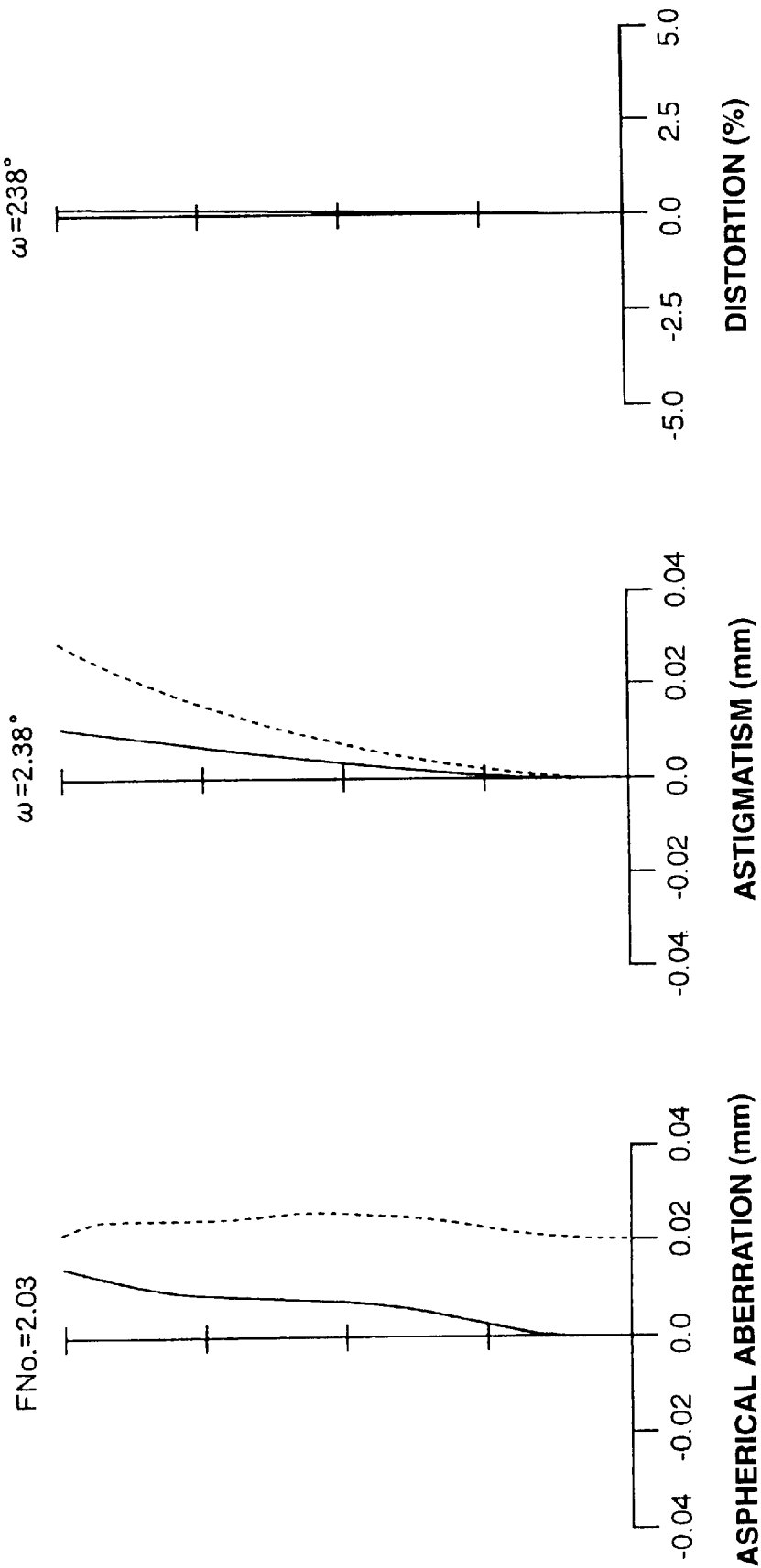
FIG. 28 shows aberrations at an intermediate focal point position between the wide angle end and the telephoto end.

The zoom lens 5, 6 and 7 in the fifth, sixth and seventh numeric examples are intended for a high magnification of 25 times or above and for preferable correction of aberrations with a small number of lenses and as shown in FIG. 18, FIG. 22, and FIG. 26, includes, viewed from an object, a first lens group GR1 having a positive refracting power and its position fixed, a second lens group GR2 having a negative refracting power and displacable mainly for magnification, a third lens group GR3 having a positive refracting power and its position fixed, and a fourth lens group GR4 displacable for focal position correction for zooming and focusing. The first lens group GR1, viewed from an object, includes a cemented lens consisting of a first lens L1 which is a concave meniscus lens having a convex surface facing the object and a second lens L2 which is a convex lens, and a third lens L3 which is a convex meniscus lens having a convex surface facing the object. The second lens group GR2, viewed from an object, includes a fourth lens L4 which is a concave meniscus lens having a convex surface facing the object and a cemented lens consisting of a fifth lens L5 which is a both-side-concave lens and a sixth lens L6 which is a convex lens. The third lens group GR3 includes a seventh lens L7 which is a convex lens having a convex surface facing the object. The fourth lens group GR4 includes, viewed from the object, a cemented lens consisting of an eighth lens L8 having a convex surface facing the object, a ninth lens L9 which is a concave lens, and a tenth lens L10 which is a convex lens.

Moreover, in the zoom lens 5, 6, and 7, the second lens group GR2 and the fourth lens group GR4 is displaced for zooming. When zooming is performed from the wide angle end to the telephoto end, the second lens group GR2 is displaced from the object side to the image side and the fourth lens group GR4 is displaced so as to maintain an image position. Focusing of the zoom lens 5, 6, and 7 is performed by displacing the fourth lens group GR4.

It should be noted that a diaphragm IR is arranged between the second lens group GR2 and the third lens group GR3, or between the third lens group GR3 and the fourth lens group GR4, and a filter FL such as a low pass filter is arranged between the fourth lens group GR4 and the image surface IMG.

Furthermore, the zoom lens 5, 6, and 7 include at least one aspherical surface in the third lens group GR3, and the surface of the fourth lens group GR4 at the object side is also aspherical, and are constituted so as to satisfy the aforementioned condition equations 1, 6, and 7.

FIG. 18 shows the zoom lens 5 in the fifth numeric example.

Table 14 below shows numeric values of the zoom lens 5.

TABLE 14

| ri | di | ni | vi |
|---|---|---|---|
| r1 = 16.7047 | d1 = 0.4212 | n1 = 1.84666 | v1 = 23.8 |
| r2 = 9.4054 | d2 = 1.7993 | n2 = 1.48749 | v2 = 70.4 |
| r3 = ∞ | d3 = 0.0818 | | |
| r4 = 9.8552 | d4 = 1.2186 | n3 = 1.77250 | v3 = 49.6 |
| r5 = 34.5954 | d5 = variable | | |

TABLE 14-continued

| ri | di | ni | vi |
|---|---|---|---|
| r6 = 13.3720 | d6 = 0.2454 | n4 = 1.83400 | v4 = 37.3 |
| r7 = 1.8320 | d7 = 1.1017 | | |
| r8 = −4.4982 | d8 = 0.2658 | n5 = 1.54814 | v5 = 45.8 |
| r9 = 2.4536 | d9 = 0.8424 | n6 = 1.84666 | v6 = 23.8 |
| r10 = 18.5122 | d10 = variable | | |
| r11 = ∞ (Diaphragm) | d11 = 0.5521 | | |
| r12 = 4.5868 | d12 = 0.6543 | n7 = 1.58313 | v7 = 59.4 |
| r13 = −40.8929 | d13 = variable | | |
| r14 = 6.2244 | d14 = 0.5234 | n8 = 1.58313 | v8 = 59.4 |
| r15 = −16.3735 | d15 = 0.6257 | n9 = 1.84666 | v9 = 23.8 |
| r16 = 2.7112 | d16 = 0.9814 | n10 = 1.72342 | v10 = 38.0 |
| r17 = −5.3161 | d17 = variable | | |
| r18 = ∞ | d18 = 0.9613 | nFL = 1.51680 | vFL = 64.2 |
| r19 = ∞ | | | |

In Table 14 above, the surface intervals d5, d10, d13, and d17 are variable for zooming and focusing. Accordingly, Table 15 below shows numerical values of the FNo., d5, d10, d13, and d17 at the wide angle end (f=1.00), at the intermediate focal distance position (f=12.48) between the wide angle end and the telephoto end, and at the telephoto end (f=24.92).

TABLE 15

| f | FNo. | d5 | d10 | d13 | d17 |
|---|---|---|---|---|---|
| 1.00 | 1.65 | 0.3108 | 11.0279 | 2.3605 | 2.3195 |
| 12.48 | 2.15 | 9.3259 | 2.0129 | 1.1198 | 3.5403 |
| 24.92 | 2.75 | 10.4145 | 0.9242 | 2.7403 | 1.9527 |

Moreover, in the third lens group GR3 and the fourth lens group GR4, the surface r12 of the seventh lens L7 at the object side and the surface r14 of the eighth lens L8 at the object side are formed as aspherical surfaces. Table 16 shows aspherical coefficients A4, A6, A8, and A10 of the powers 4, 6, 8, 10 of the aforementioned surfaces r12 and r14.

TABLE 16

| Plane | A4 | A6 | A8 | A10 |
|---|---|---|---|---|
| r12 | −1.3192E−03 | −2.5167E−04 | 3.4464E−05 | −4.0494E−06 |
| r14 | −4.6104E−03 | −3.4146E−05 | 1.6459E−04 | −5.2188E−05 |

Figure 19:
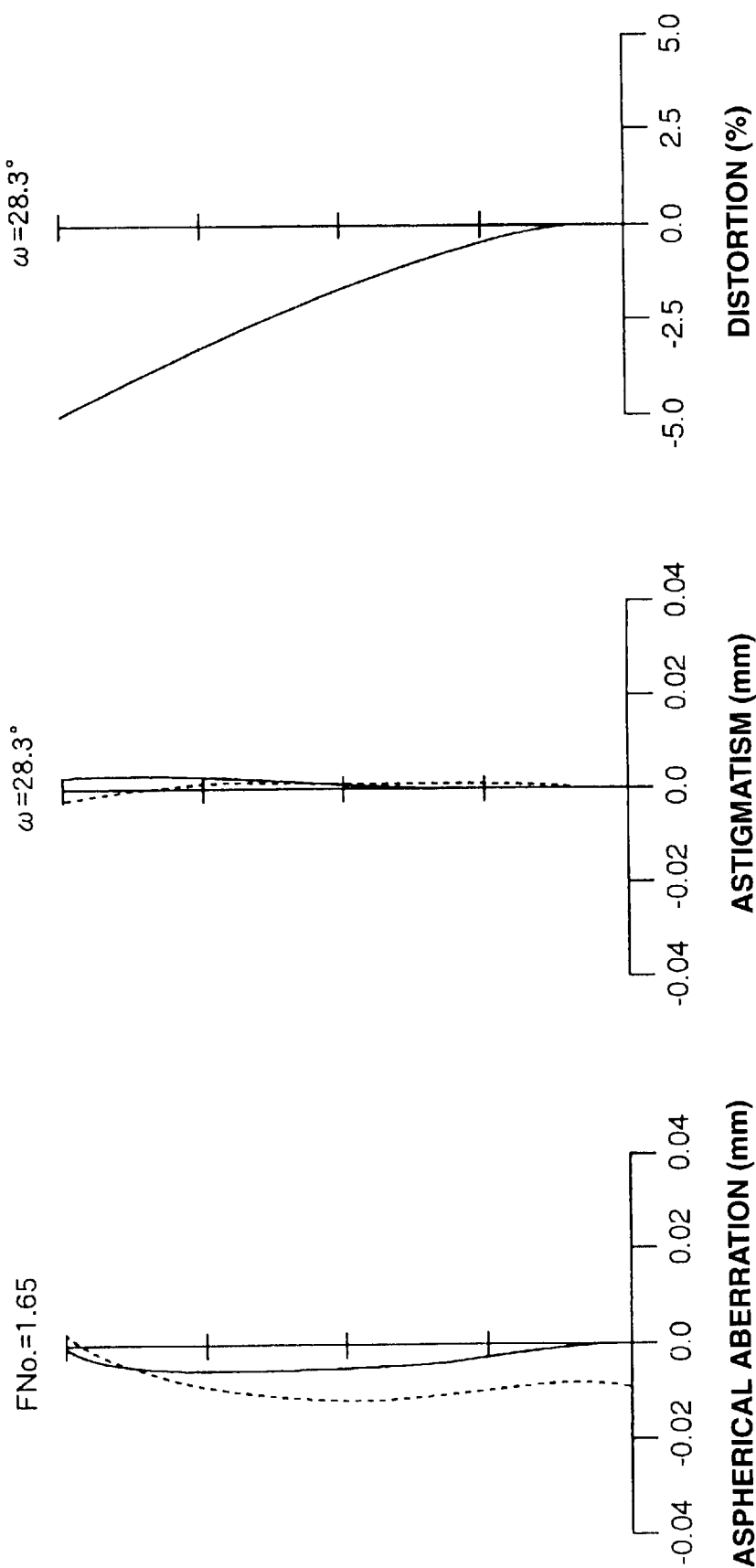
FIG. 19 shows aberrations at the wide angle end.
Figure 20:
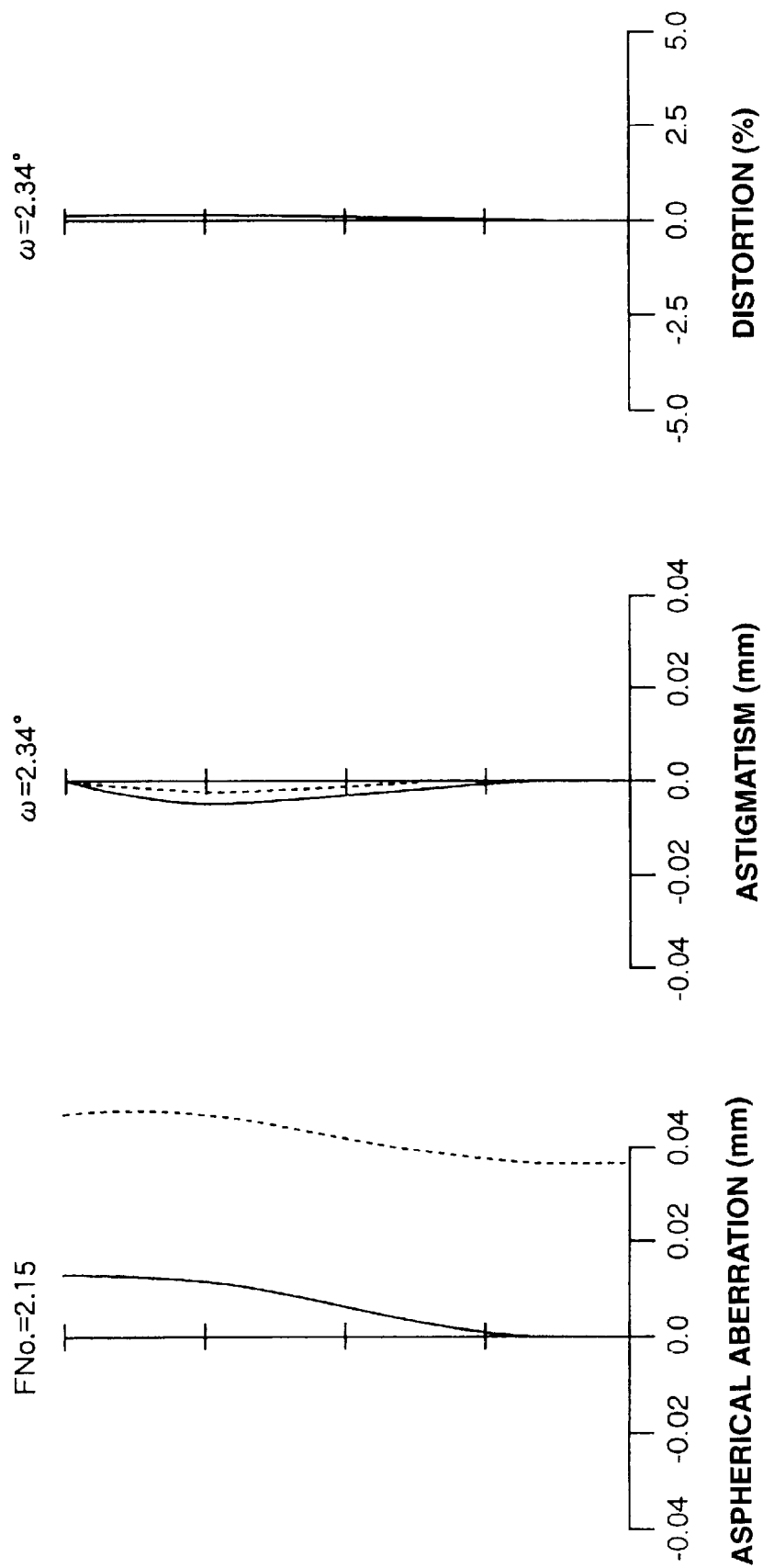
FIG. 20 shows aberrations at an intermediate focal point position between the wide angle end and the telephoto end.
Figure 21:
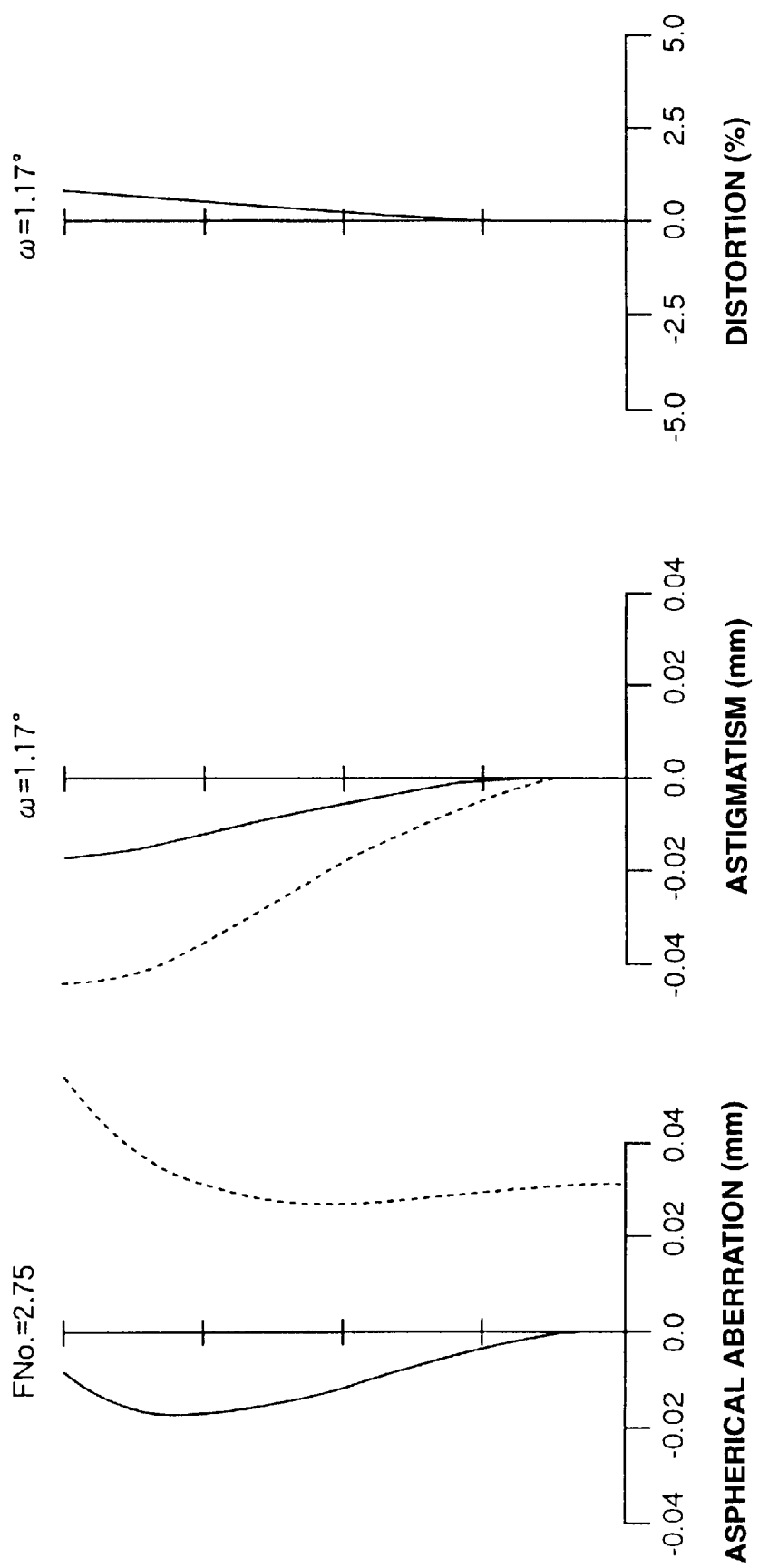
FIG. 21 shows aberrations at the telephoto end.

FIG. 19 to FIG. 21 respectively show spherical aberration, astigmatism, distortion of the zoom lens 5 at the wide angle end, at the intermediate focal distance position between the wide angle end and the telephoto end, and at the telephoto end. It should be noted that in the figure of astigmatism, the solid line shows a value on a sagital image surface and the broke line represents values on meridional image surface (the same applies in FIG. 23 to FIG. 25, and FIG. 27 to FIG. 29).

FIG. 22 shows the zoom lens 6 in the sixth numerical example.

Table 17 below shows numerical values of the zoom lens 6.

TABLE 17

| ri | di | ni | vi |
|---|---|---|---|
| r1 = 20.5891 | d1 = 0.4131 | n1 = 1.84666 | v1 = 23.8 |
| r2 = 10.2009 | d2 = 1.8002 | n2 = 1.48749 | v2 = 70.4 |
| r3 = −45.1884 | d3 = 0.0826 | | |
| r4 = 8.9170 | d4 = 1.0794 | n3 = 1.77250 | v3 = 49.6 |

TABLE 17-continued

| ri | di | ni | vi |
|---|---|---|---|
| r5 = 25.1976 | d5 = variable | | |
| r6 = 20.4571 | d6 = 0.2479 | n4 = 1.83400 | v4 = 37.3 |
| r7 = 1.8620 | d7 = 1.0558 | | |
| r8 = −4.5386 | d8 = 0.3841 | n5 = 1.51680 | v5 = 64.2 |
| r9 = 2.5039 | d9 = 0.7313 | n6 = 1.84666 | v6 = 23.8 |
| r10 = 11.4055 | d10 = variable | | |
| r11 = 5.7775 | d11 = 0.6146 | n7 = 1.58313 | v7 = 59.5 |
| r12 = −33.0510 | d12 = 0.7023 | | |
| r13 = ∞ (Diaphragm) | d13 = variable | | |
| r14 = 4.1314 | d14 = 0.6826 | n8 = 1.69350 | v8 = 53.3 |
| r15 = −11.9694 | d15 = 0.3871 | n9 = 1.84666 | v9 = 23.8 |
| r16 = 2.6654 | d16 = 0.9430 | n10 = 1.62004 | v10 = 36.4 |
| r17 = −4.5191 | d17 = variable | | |
| r18 = ∞ | d18 = 0.9672 | nFL = 1.51680 | vFL = 64.2 |
| r19 = ∞ | | | |

In Table 17 above, the surface intervals d5, d10, d13, and d17 are variable for zooming and focusing. Accordingly, Table 18 below shows numerical values of FNo., d5, d10, d13, and d17 at the wide angle end (f=1.00), at the intermediate focal distance position (f 12.45) between the wide angle end and the telephoto end, and at the telephoto end (f=24.84)

TABLE 18

| f | FNo. | d5 | d10 | d13 | d17 |
|---|---|---|---|---|---|
| 1.00 | 1.65 | 0.3137 | 9.9396 | 2.7096 | 2.2523 |
| 12.45 | 2.26 | 8.7019 | 1.5513 | 1.3949 | 3.5670 |
| 24.84 | 2.97 | 9.7988 | 0.4544 | 3.0259 | 1.9487 |

Moreover, in the third lens group GR3 and the fourth lens group GR4, the surface r12 of the seventh lens L7 at the object side and the surface r14 of the eighth lens L8 at the object side are formed as aspherical surfaces. Table 19 shows aspherical coefficients A4, A6, A8, and A10 of powers 4, 6, 8, and 10 of the aforementioned surfaces r12 and r14.

TABLE 19

| Plane | A4 | A6 | A8 | A10 |
|---|---|---|---|---|
| r12 | 1.1657E−03 | 2.0356E−04 | −4.4165E−05 | 0.0000E+00 |
| r14 | −4.1693E−03 | 4.2124E−04 | −2.9889E−04 | 5.7040E−05 |

Figure 23:
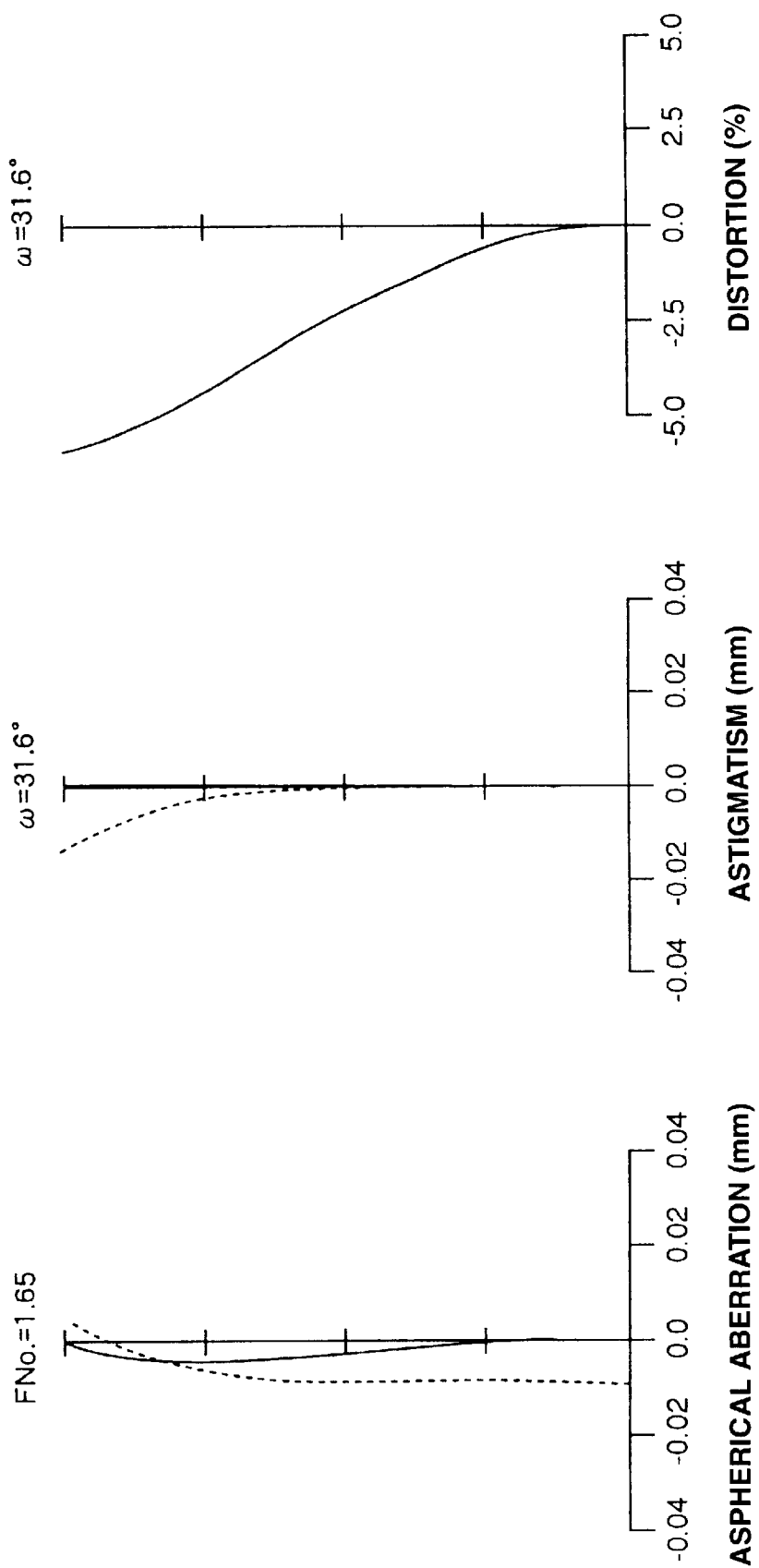
FIG. 23 shows aberrations at the wide angle end.
Figure 24:
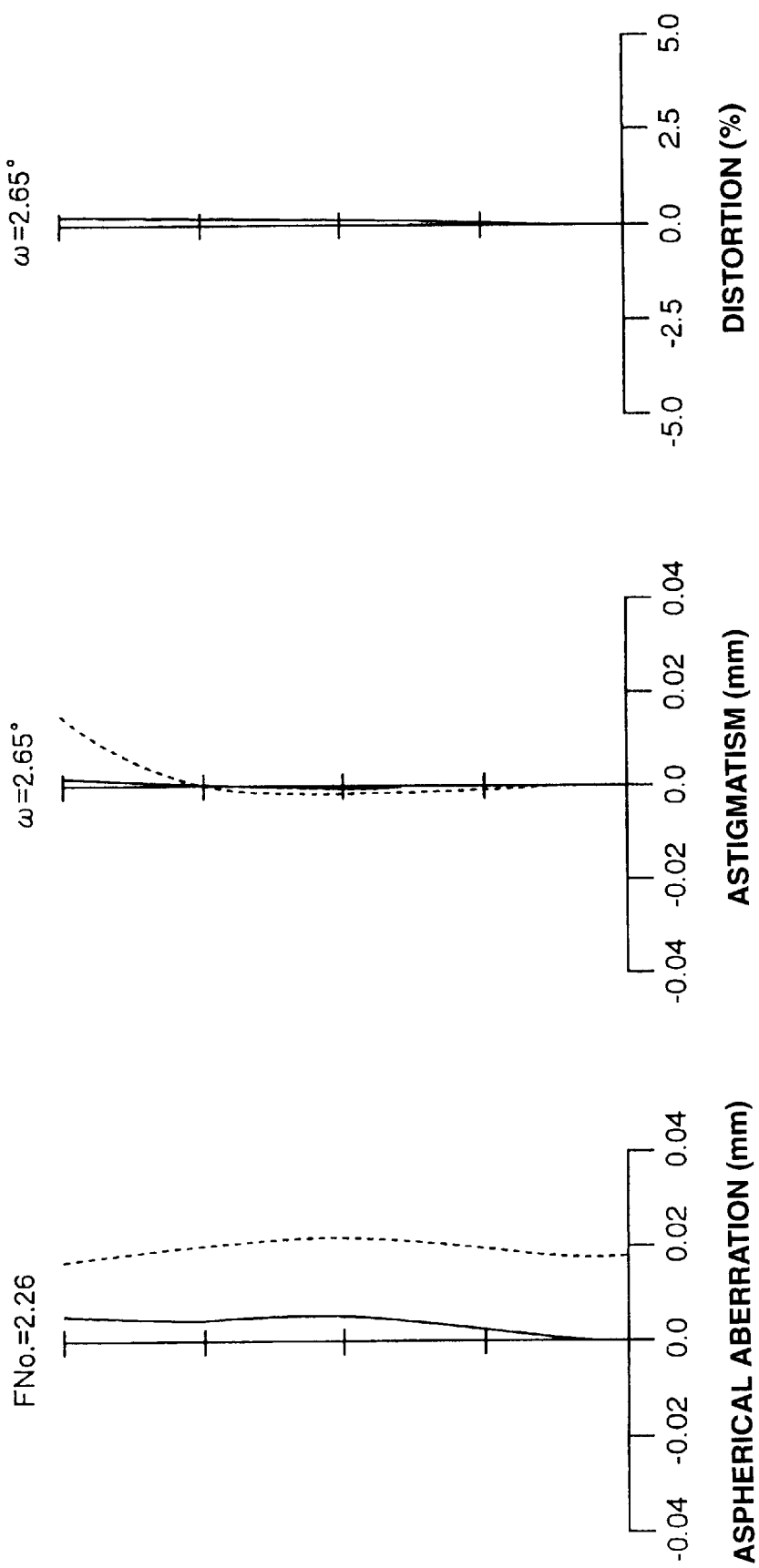
FIG. 24 shows aberrations at an intermediate focal point position between the wide angle end and the telephoto end.
Figure 25:
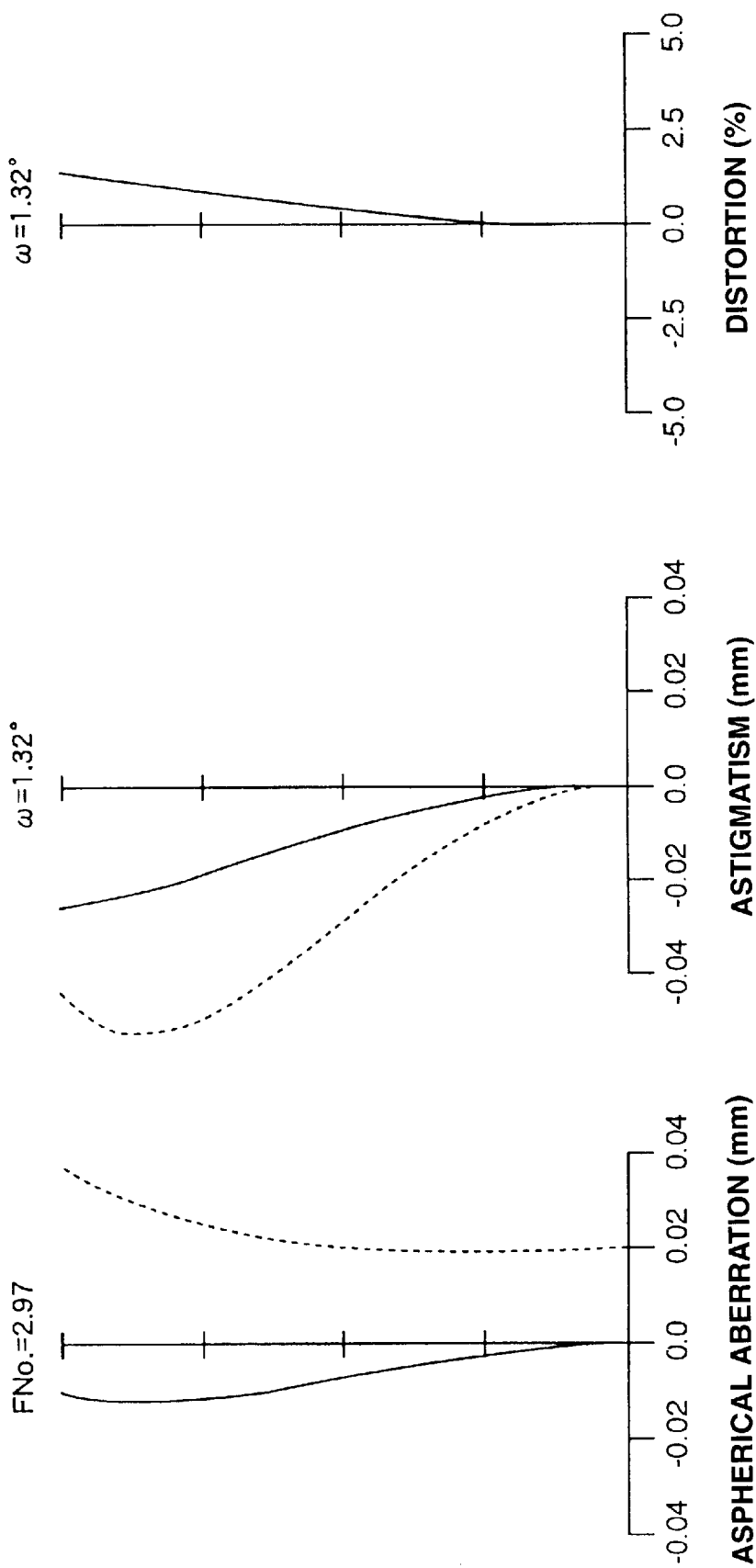
FIG. 25 shows aberrations at the telephoto end.

FIG. 23 to FIG. 25 respectively show spherical aberrations, astigmatism, and distortion at the wide angle end, at the intermediate focal distance position between the wide angle end and the telephoto end, and at the telephoto end of the zoom lens 6.

FIG. 26 shows the zoom lens 7 in the seventh numerical example.

Table 20 below shows numerical values of the zoom lens 7.

TABLE 20

| ri | di | ni | vi |
|---|---|---|---|
| r1 = 19.9159 | d1 = 0.4161 | n1 = 1.84666 | v1 = 23.8 |
| r2 = 10.2832 | d2 = 1.8435 | n2 = 1.48749 | v2 = 70.4 |
| r3 = −76.4666 | d3 = 0.0832 | | |
| r4 = 9.5273 | d4 = 1.1982 | n3 = 1.77250 | v3 = 49.6 |
| r5 = 28.8296 | d5 = variable | | |
| r6 = 19.2339 | d6 = 0.2497 | n4 = 1.83400 | v4 = 37.3 |
| r7 = 2.0061 | d7 = 1.2304 | | |

TABLE 20-continued

| ri | di | ni | vi |
|---|---|---|---|
| r8 = −6.3905 | d8 = 0.2497 | n5 = 1.51680 | v5 = 64.2 |
| r9 = 2.4675 | d9 = 0.7481 | n6 = 1.84666 | v6 = 23.8 |
| r10 = 8.2039 | d10 = variable | | |
| r11 = ∞ (Diaphragm) | d11 = 0.5409 | | |
| r12 = 5.9779 | d12 = 0.5540 | n7 = 1.58313 | v7 = 59.5 |
| r13 = −40.9226 | d13 = variable | | |
| r14 = 4.7468 | d14 = 0.5431 | n8 = 1.77250 | v8 = 49.6 |
| r15 = 77.5906 | d15 = 0.7868 | n9 = 1.84666 | v9 = 23.8 |
| r16 = 3.3962 | d16 = 1.0403 | n10 = 1.58313 | v10 = 59.5 |
| r17 = −5.7463 | d17 = variable | | |
| r18 = ∞ | d18 = 0.9782 | nFL = 1.51680 | vFL = 64.2 |
| r19 = ∞ | | | |

In Table 20 above, the surface intervals d5, d10, d13, and d17 are variable for zooming and focusing. Accordingly, Table 21 below shows numerical values of FNo., d5, d10, d13, and d17 at the wide angle end (f=1.0000), at the intermediate focal distance position (f 12.4771) between the wide angle end and the telephoto end, and at the telephoto end (f=24.9113).

TABLE 21

| f | FNo. | d5 | d10 | d13 | d17 |
|---|---|---|---|---|---|
| 1.0000 | 1.65 | 0.3162 | 11.0081 | 2.6712 | 2.2819 |
| 12.4771 | 2.03 | 9.2472 | 2.0772 | 1.5394 | 3.4015 |
| 24.9113 | 2.74 | 10.3843 | 0.9400 | 3.1133 | 1.8534 |

Moreover, in the third lens group GR3 and the fourth lens group GR4, the surface r12 of the seventh lens L7 at the object side and the surface r14 of the eighth lens L8 at the object side are formed as aspherical surfaces. Table 22 shows aspherical coefficients A4, A6, A8, and A10 of powers 4, 6, 8, and 10 of the aforementioned surfaces r12 and r14.

TABLE 22

| Plane | A4 | A6 | A8 | A10 |
|---|---|---|---|---|
| r12 | −1.4195E−03 | −2.3081E−04 | 4.8138E−05 | −1.7041E−06 |
| r14 | 6.8030E−03 | −2.6445E−03 | 1.5822E−03 | −3.6792E−04 |

Figure 29:
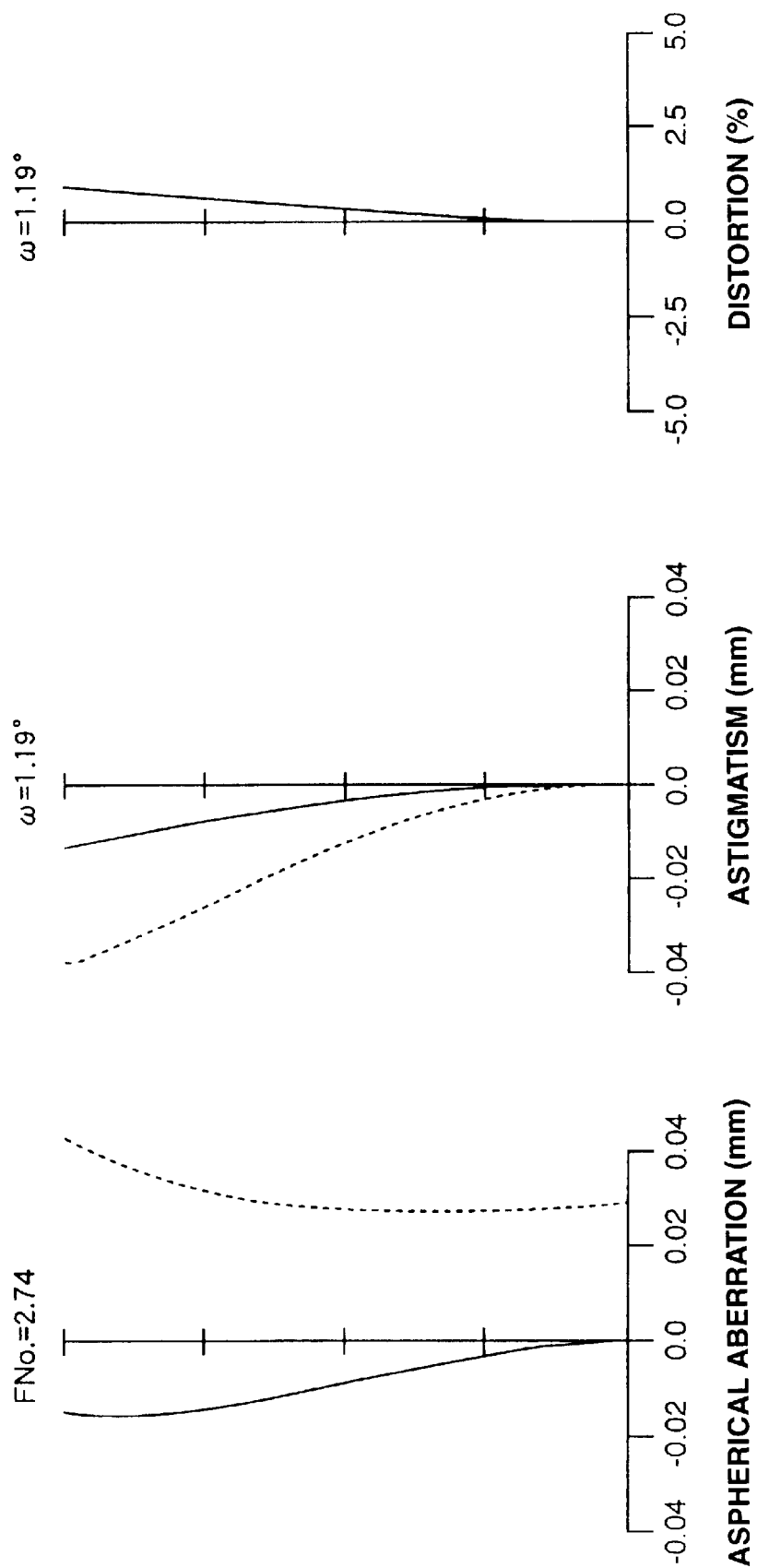
FIG. 29 shows aberrations at the telephoto end.

Fib. 27 to FIG. 29 respectively show aspherical aberration, astigmatism, and distortion of the zoom lens 7 at the wide angle end, at the intermediate focal distance position between the wide angle end and the telephoto end, and at the telephoto end.

Table 23 below shows numerical values of the condition equations 6 and 7 of the zoom lenses 5, 6, and 7 shown in the fifth numerical example, the sixth numerical example, and the seventh numerical example.

TABLE 23

| | Condition Equation 6 | Condition Equation 7 |
|---|---|---|
| Numerical Example 5 | 10.12 | 0.78 |
| Numerical Example 6 | 9.50 | 0.74 |
| Numerical Example 7 | 10.08 | 0.74 |

The zoom lenses 5, 6, and 7 in the fifth numerical example, the sixth numerical example, and the seventh numerical example satisfy the condition equations 1, 6, and 7, and with a lens system of 10 lenses of six groups of the four-group zoom, it is possible to obtain a zoom lens appropriate for a video camera in which aberrations are preferably corrected with a small number of lenses and a high magnification of 25 times or above can be obtained.

Figure 30:
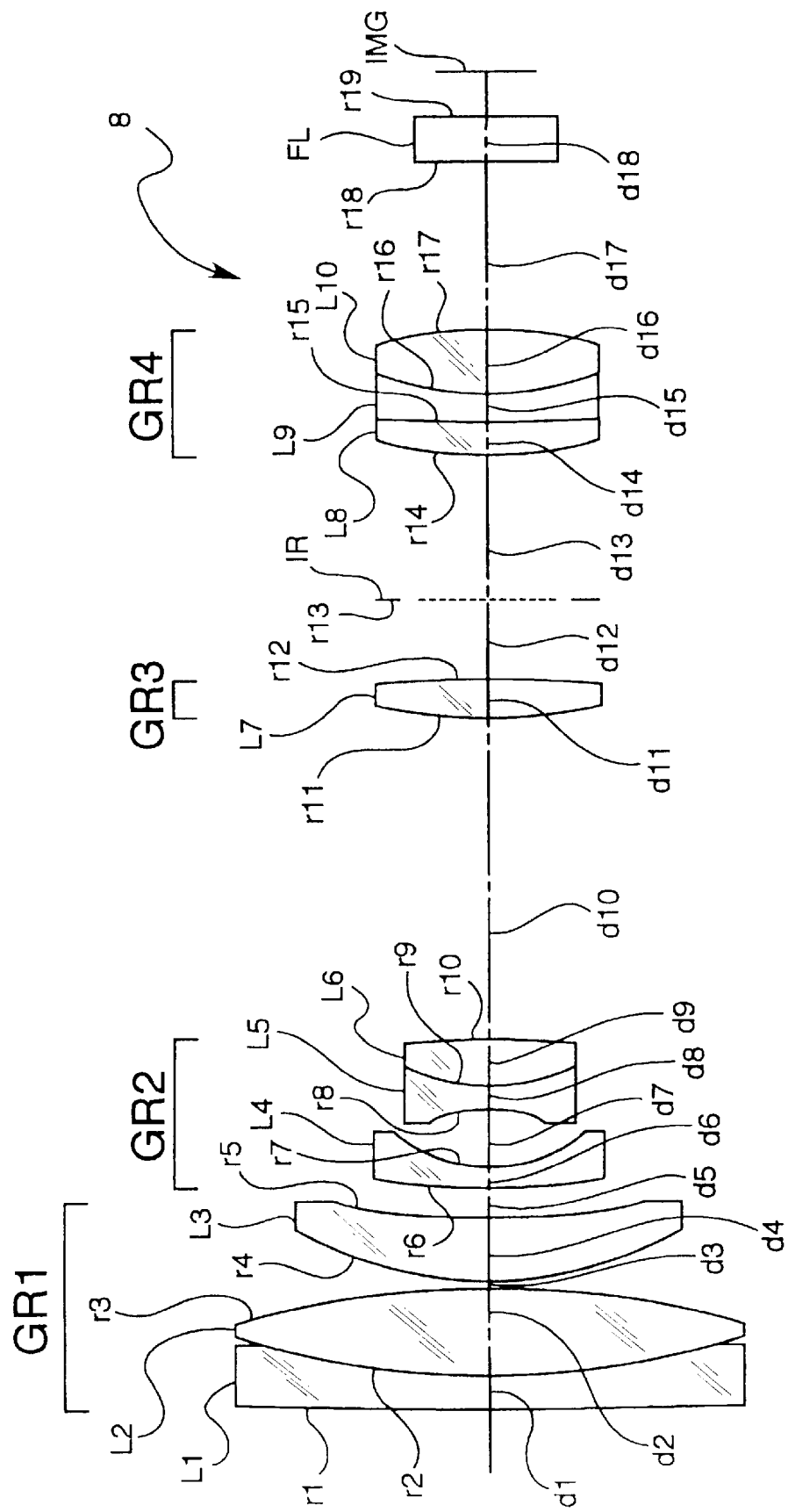
FIG. 30 together with FIG. 31 to FIG. 33 shows an eighth numerical example of the zoom lens according to the present invention.
Figure 34:
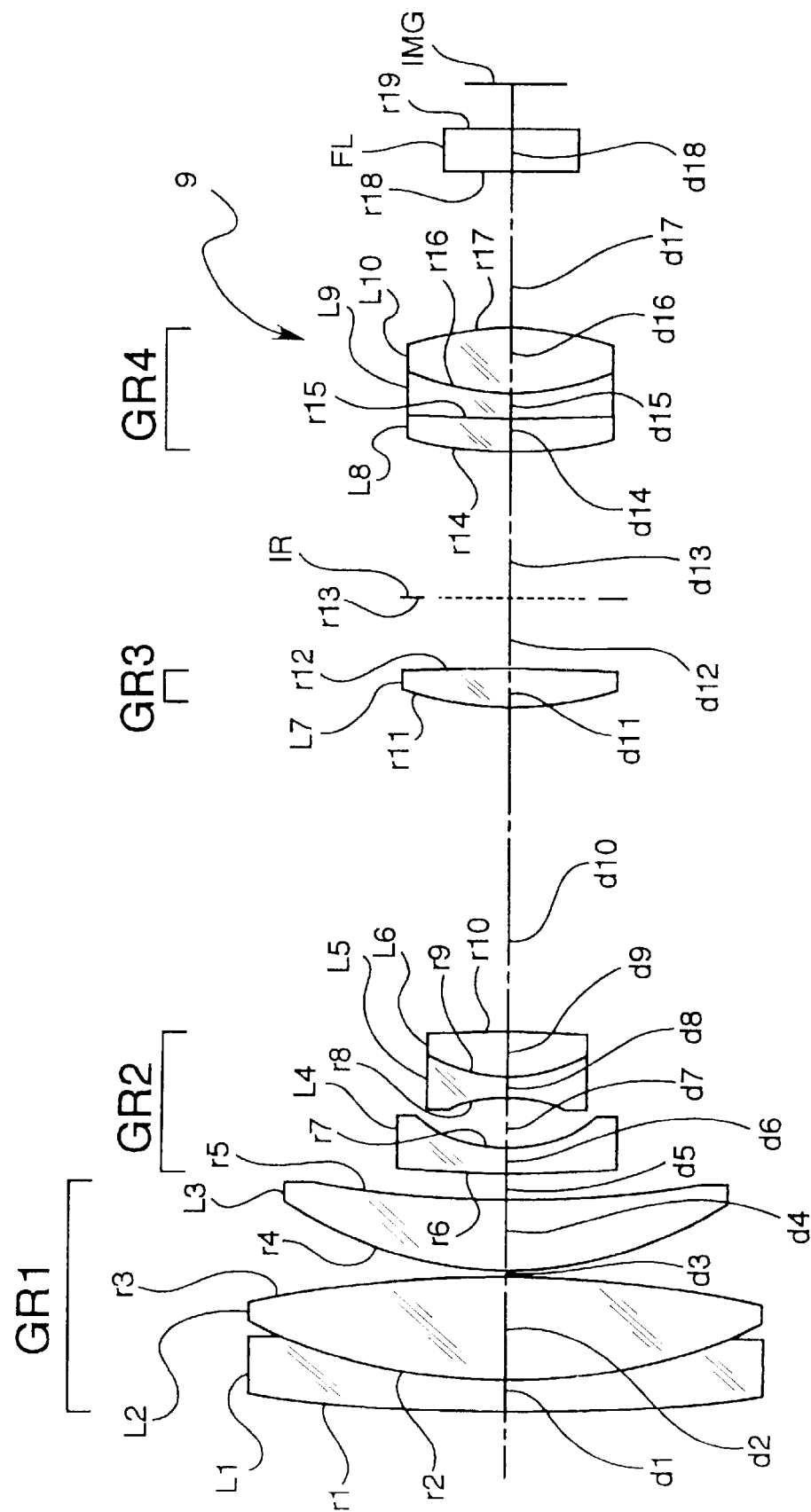
FIG. 34 together with FIG. 35 to FIG. 37 shows a ninth numerical example of the zoom lens according to the present invention.

The zoom lenses 8 and 9 in the eighth and ninth numerical examples are intended for magnification of 10 times or above and size reduction and as shown in FIG. 30 and FIG. 34, include, viewed from the object side, a first lens group GR1 having a positive refracting power and its position fixed, a second lens group GR2 having a negative refracting power and displacable mainly for magnification, a third lens group GR3 having a positive refracting power and its position fixed, and a fourth lens group GR4 having a positive refracting power and displacable for focal position correction for zooming and focusing. The first lens group GR1, viewed from the object side, includes a cemented lens consisting of a first lens L1 which is a concave meniscus lens having a convex surface facing the object and a second lens L2 which is a convex lens, and a third lens L3 which is a convex meniscus lens having a convex surface facing the object side. The second lens group GR2, viewed from the object side, includes a fourth lens L4 which is a concave meniscus lens having a convex surface facing the object side and a cemented lens consisting of a fifth lens L5 which is a both-side-concave lens and a sixth lens L6 which is a convex lens. The third lens group GR3 includes a seventh lens L7 which is a convex lens having a convex surface facing the object side. The fourth lens group GR4, viewed from the object side, includes a cemented lens consisting of an eighth lens L8 which is a convex lens having a convex surface facing the object side, a ninth lens L9 which is concave lens, and a tenth lens L10 which is a convex lens.

Moreover, in the zoom lenses 8 and 9, zooming is performed by displacing the second lens group GR2 and the fourth lens group GR4. When zooming from the wide angle end to the telephoto end, the second lens group GR2 is displaced from the object side to the image side and the fourth lens group GR4 is displaced for maintaining the image position. Focusing of the zoom lenses 8 and 9 is performed by displacing the fourth lens group GR4.

It should be noted that a diaphragm IR is arranged between the third lens group GR3 and the fourth lens group GR4, and a filter FL such as a low pass filter is arranged between the fourth lens group GR4 and the image surface IMG.

Furthermore, in the zoom lenses 8 and 9, each of the first lens group GR1 and the third lens group GR3 includes at least one aspherical surface, and the surface of the fourth lens group GR4 at the object side is also formed as an aspherical surface, and the aforementioned condition equations 1, 8, 9, and 10 are satisfied.

FIG. 30 shows the zoom lens 8 in the eighth numeric example.

Table 24 below shows numeric values of the zoom lens 8.

TABLE 24

| ri | di | ni | vi |
|---|---|---|---|
| r1 = 200.0000 | d1 = 0.8500 | n1 = 1.84666 | v1 = 23.8 |
| r2 = 20.9681 | d2 = 2.4090 | n2 = 1.58913 | v2 = 61.3 |
| r3 = −24.9611 | d3 = 0.2000 | | |
| r4 = 9.6082 | d4 = 1.7884 | n3 = 1.69350 | v3 = 53.3 |
| r5 = 27.5686 | d5 = variable | | |
| r6 = 14.8688 | d6 = 0.6000 | n4 = 1.88300 | v4 = 40.8 |
| r7 = 3.6090 | d7 = 1.5608 | | |
| r8 = −3.9025 | d8 = 0.6000 | n5 = 1.77250 | v5 = 49.6 |
| r9 = 4.2076 | d9 = 1.2300 | n6 = 1.84666 | v6 = 23.8 |
| r10 = −63.6815 | d10 = variable | | |
| r11 = 10.3199 | d11 = 1.1243 | n7 = 1.58313 | v7 = 59.5 |
| r12 = −23.9622 | d12 = 2.2000 | | |

TABLE 24-continued

| ri | di | ni | vi |
|---|---|---|---|
| r13 = ∞ (Diaphragm) | d13 = variable | | |
| r14 = 8.0900 | d14 = 1.0337 | n8 = 1.58313 | v8 = 59.5 |
| r15 = ∞ | d15 = 0.6000 | n9 = 1.84666 | v9 = 23.8 |
| r16 = 6.6961 | d16 = 1.8370 | n10 = 1.69680 | v10 = 55.5 |
| r17 = −8.5986 | d17 = variable | | |
| r18 = ∞ | d18 = 1.2000 | nFL = 1.51680 | vFL = 64.2 |
| r19 = ∞ | | | |

In Table 24 above, the surface intervals d5, d10, d13, and d17 are variable for zooming and focusing. Accordingly, Table 25 below shows numeric values of FNo., d5, d10, d13, and d17 at the wide angle point (f=2.3706), at the intermediate focal distance position (f=15.180) between the wide angle end and the telephoto end, and at the telephoto end (f=22.4075).

TABLE 25

| f | FNo. | d5 | d10 | d13 | d17 |
|---|---|---|---|---|---|
| 2.3706 | 1.70 | 0.7250 | 8.9435 | 3.9868 | 4.5312 |
| 15.1380 | 2.15 | 7.7405 | 1.9280 | 1.1666 | 7.3514 |
| 22.4075 | 2.37 | 8.7685 | 0.9000 | 1.7846 | 6.7334 |

Moreover, in the first lens group GR1, the third lens group GR3, and the fourth lens group GR4, the surface r4 of the third lens L3 at the object side, the surface r11 of the seventh lens L7 at the object side, and the surface r14 of the eighth lens L8 at the object side are formed as aspherical surfaces. Table 26 show aspherical coefficients A4, A6, A8, and A10 of powers 4, 6, 8, and 10 of the aforementioned surfaces r4, r11, and r14.

TABLE 26

| Plane | A4 | A6 | A8 | A10 |
|---|---|---|---|---|
| r4 | −1.8548E−05 | −1.9650E−07 | −1.2307E−08 | 2.6566E−10 |
| r11 | −3.1362E−04 | 2.2597E−06 | −5.3882E−06 | 4.3755E−07 |
| r14 | 4.2259E−03 | 2.8396E−05 | −2.7403E−06 | 8.2012E−08 |

Figure 31:
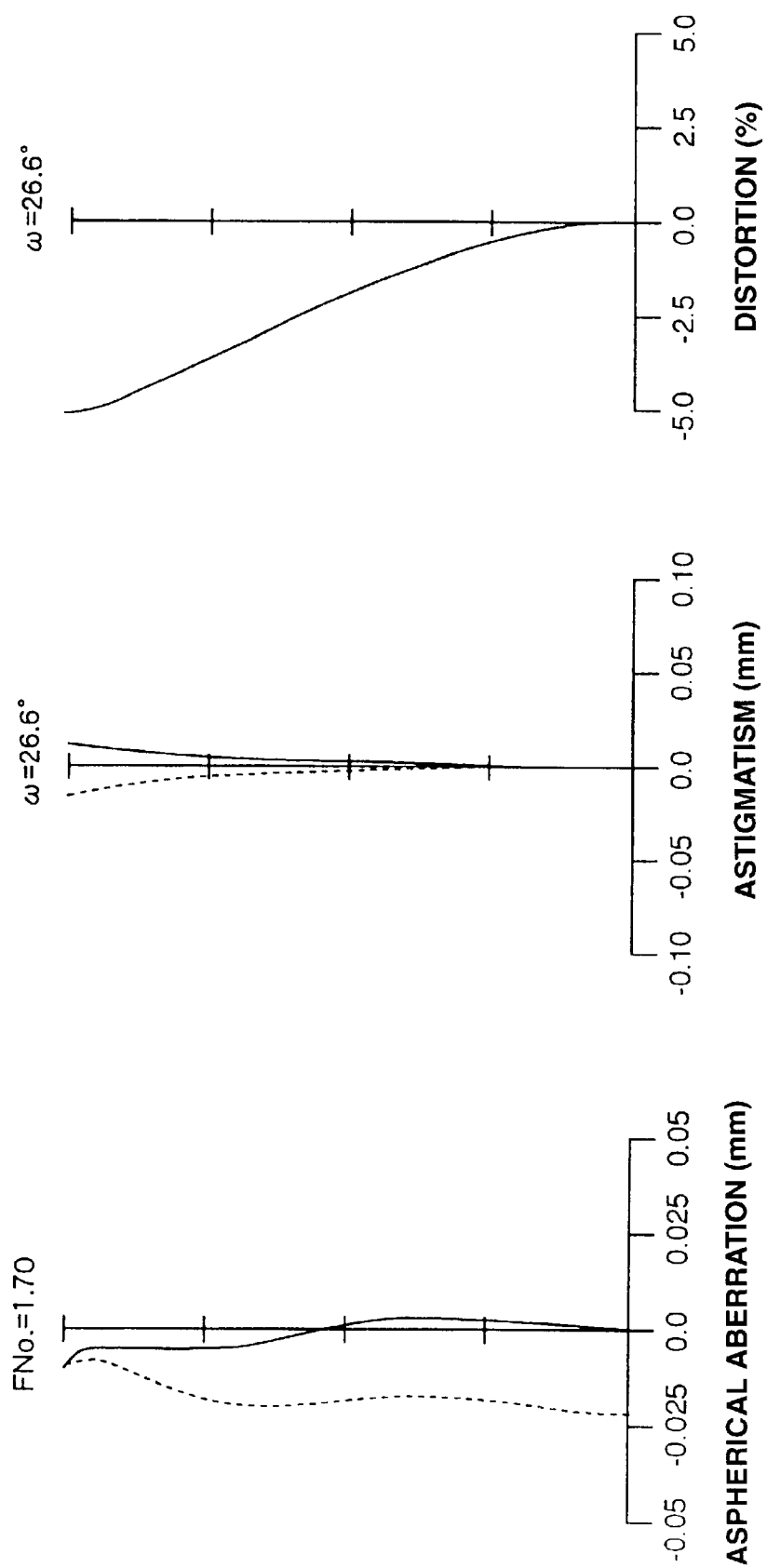
FIG. 31 shows aberrations at the wide angle end.
Figure 32:
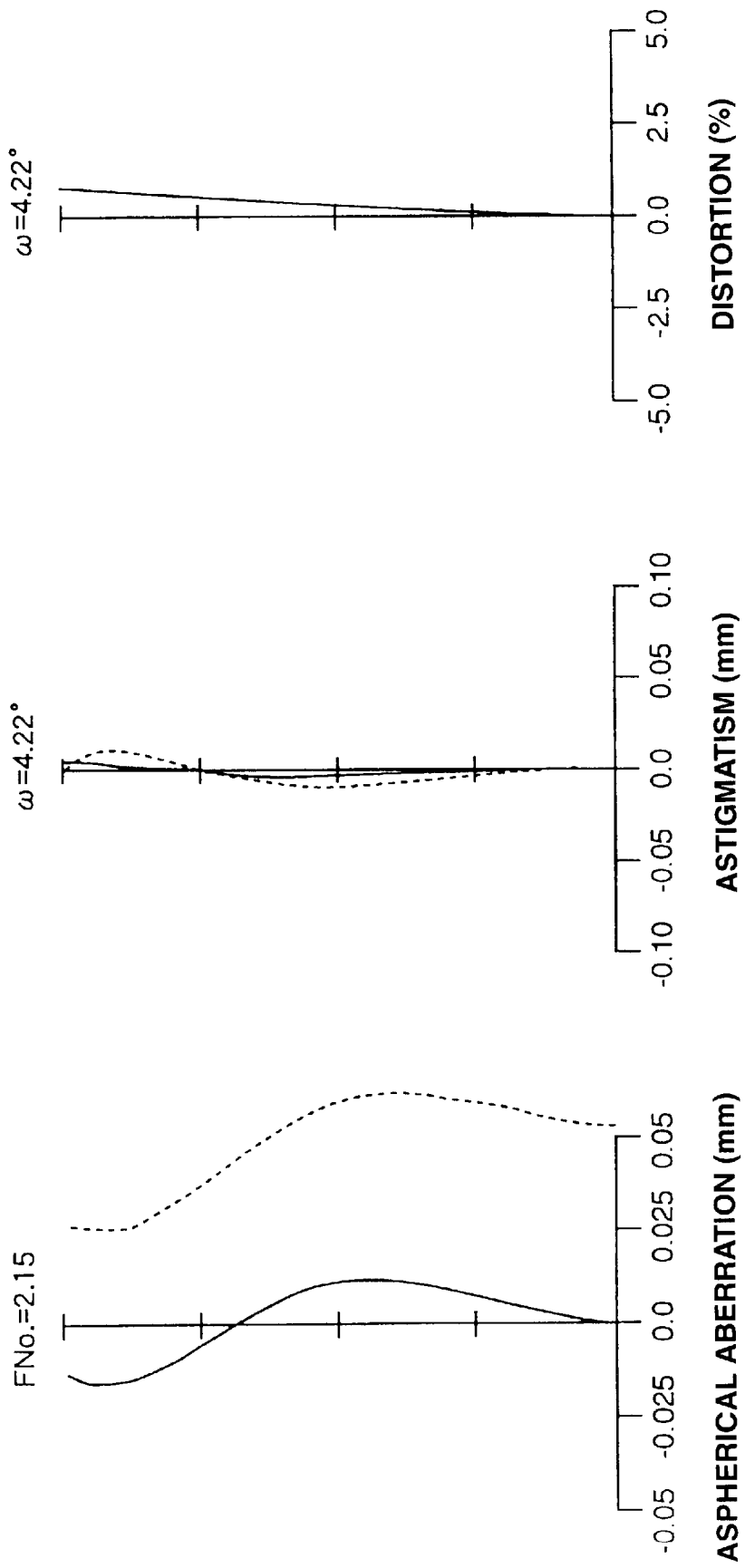
FIG. 32 shows aberrations at an intermediate focal point position between the wide angle end and the telephoto end.
Figure 33:
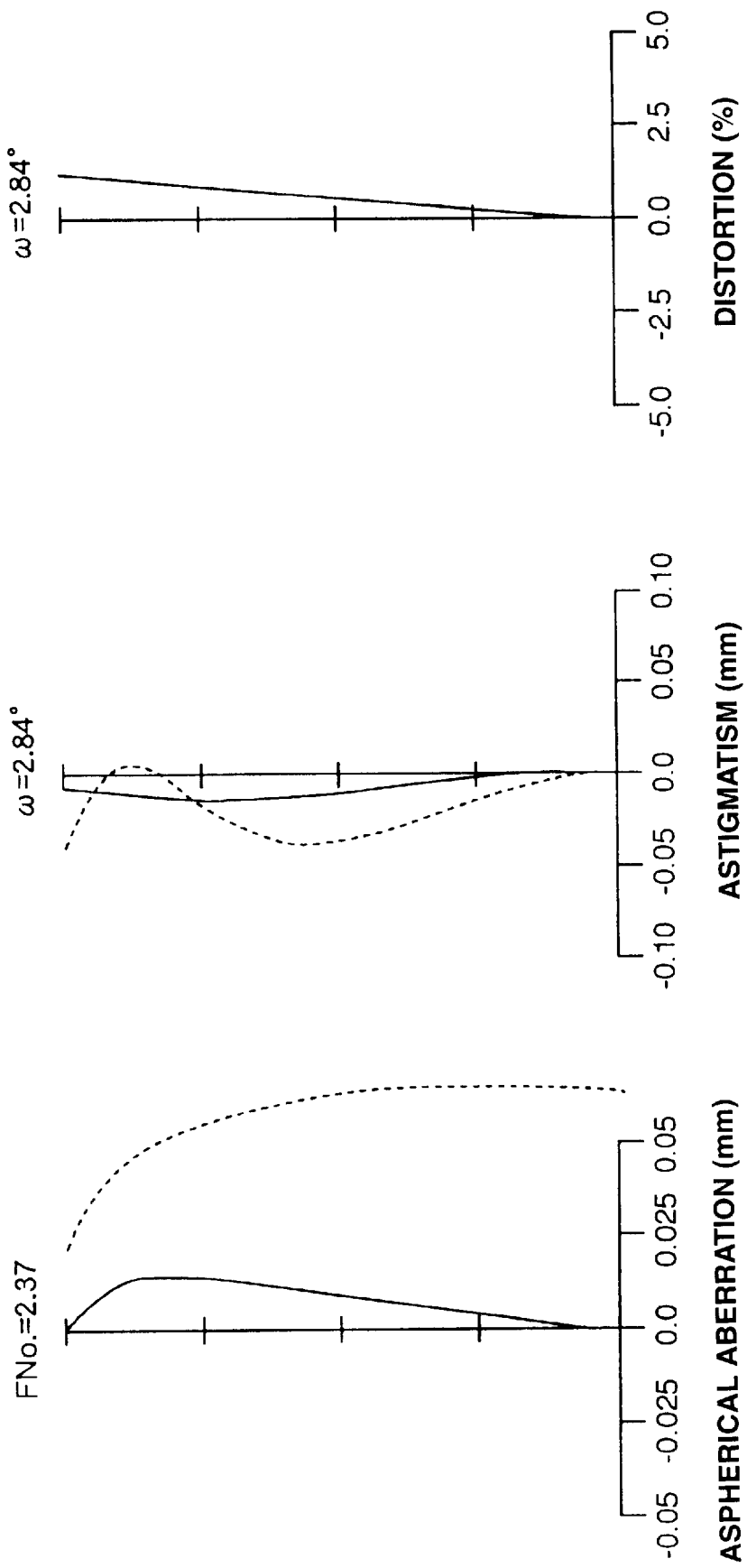
FIG. 33 shows aberrations at the telephoto end.

FIG. 31 to FIG. 33 respectively show spherical aberration, astigmatism, and distortion of the zoom lens 8 at the wide angle end, at the intermediate focal distance position between the wide angle end and the telephoto end, and at the telephoto end. It should be noted that in the figure of astigmatism, the solid line represents values on a sagital image surface and the broken line represents values on the meridional surface (the same applies to FIG. 35 to FIG. 37).

FIG. 34 shows the zoom lens 9 in the ninth numeric example.

Table 27 below shows numeric values of the zoom lens 9.

TABLE 27

| ri | di | ni | vi |
|---|---|---|---|
| r1 = 49.7268 | d1 = 0.8500 | n1 = 1.84666 | v1 = 23.8 |
| r2 = 15.6957 | d2 = 2.7439 | n2 = 1.58913 | v2 = 61.3 |
| r3 = −36.3411 | d3 = 0.2000 | | |
| r4 = 10.0642 | d4 = 1.9019 | n3 = 1.69350 | v3 = 53.3 |
| r5 = 31.4532 | d5 = variable | | |
| r6 = 46.3108 | d6 = 0.6000 | n4 = 1.83500 | v4 = 43.0 |
| r7 = 3.4990 | d7 = 1.3895 | | |
| r8 = −4.5693 | d8 = 0.6000 | n5 = 1.77250 | v5 = 49.6 |
| r9 = 4.1432 | d9 = 1.2220 | n6 = 1.84666 | v6 = 23.8 |

TABLE 27-continued

| ri | di | ni | vi |
|---|---|---|---|
| r10 = −63.7310 | d10 = variable | | |
| r11 = 8.1389 | d11 = 1.0752 | n7 = 1.58313 | v7 = 59.5 |
| r12 = −71.3500 | d12 = 2.0000 | | |
| r13 = ∞ (Diaphragm) | d13 = variable | | |
| r14 = 7.6725 | d14 = 0.9818 | n8 = 1.58313 | v8 = 59.5 |
| r15 = ∞ | d15 = 0.6000 | n9 = 1.84666 | v9 = 23.8 |
| r16 = 6.5740 | d16 = 1.7577 | n10 = 1.69680 | v10 = 55.5 |
| r17 = −8.1483 | d17 = variable | | |
| r18 = ∞ | d18 = 1.2000 | nFL = 1.51680 | vFL = 64.2 |
| r19 = ∞ | | | |

In Table 27 above, the surface intervals d5, d10, d13, and d17 are variable for zooming and focusing. Accordingly, Table 28 below shows values of FNo., d5, d10, d13, and d17 at the wide angle end (f=2.2550), at the intermediate focal distance position (f=14.6362) between the wide angle end and the telephoto end, and at the telephoto end (f=21.3154).

TABLE 28

| f | FNo. | d5 | d10 | d13 | d17 |
|---|---|---|---|---|---|
| 2.2550 | 1.70 | 0.7700 | 8.8922 | 3.9433 | 4.2589 |
| 14.6362 | 2.28 | 7.7987 | 1.8636 | 1.3145 | 6.8877 |
| 21.3154 | 2.30 | 8.7622 | 0.9000 | 1.8267 | 6.3755 |

Moreover, in the first lens group GR1, the third lens group GR3, and the fourth lens group GR4, the surface r4 of the third lens L3 at the object side, the surface r11 of the seventh lens L7 at the object side, and the surface r14 of the eighth lens L8 at the object side are formed as aspherical surfaces. Table 29 shows asphelical coefficients A4, A6, A8, and A10 of powers 4, 6, 8, and 10 of the aforementioned surfaces r4, r11, and r14.

TABLE 29

| Plane | A4 | A6 | A8 | A10 |
|---|---|---|---|---|
| r4 | −6.580E−06 | −2.063E−07 | 0.000E+00 | 0.000E+00 |
| r11 | −4.352E−04 | 1.329E−05 | −9.963E−06 | 8.832E−07 |
| r14 | −4.439E−03 | −5.343E−06 | 6.045E−06 | −7.214E−07 |

Figure 35:
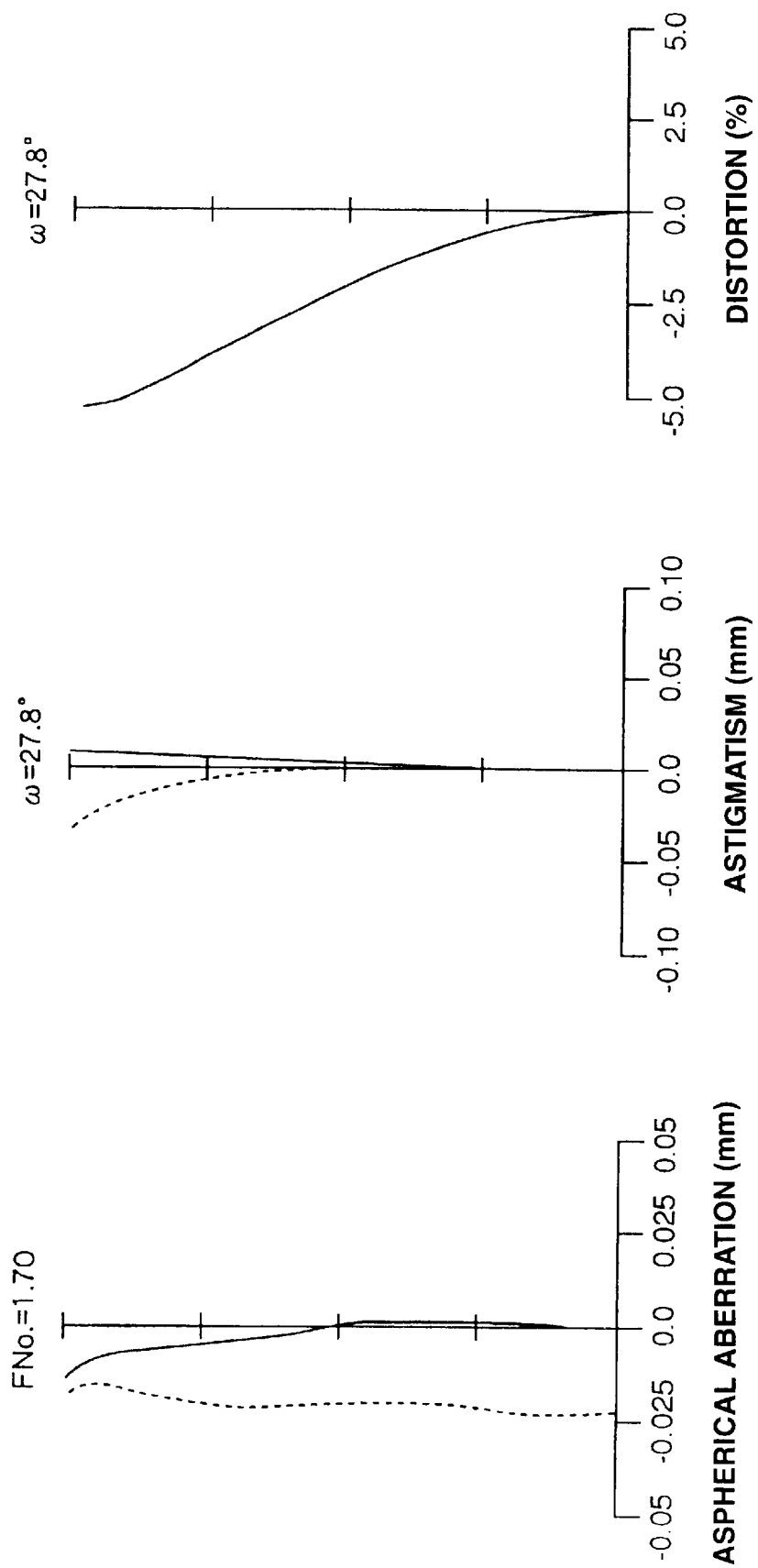
FIG. 35 shows aberrations at the wide angle end.
Figure 36:
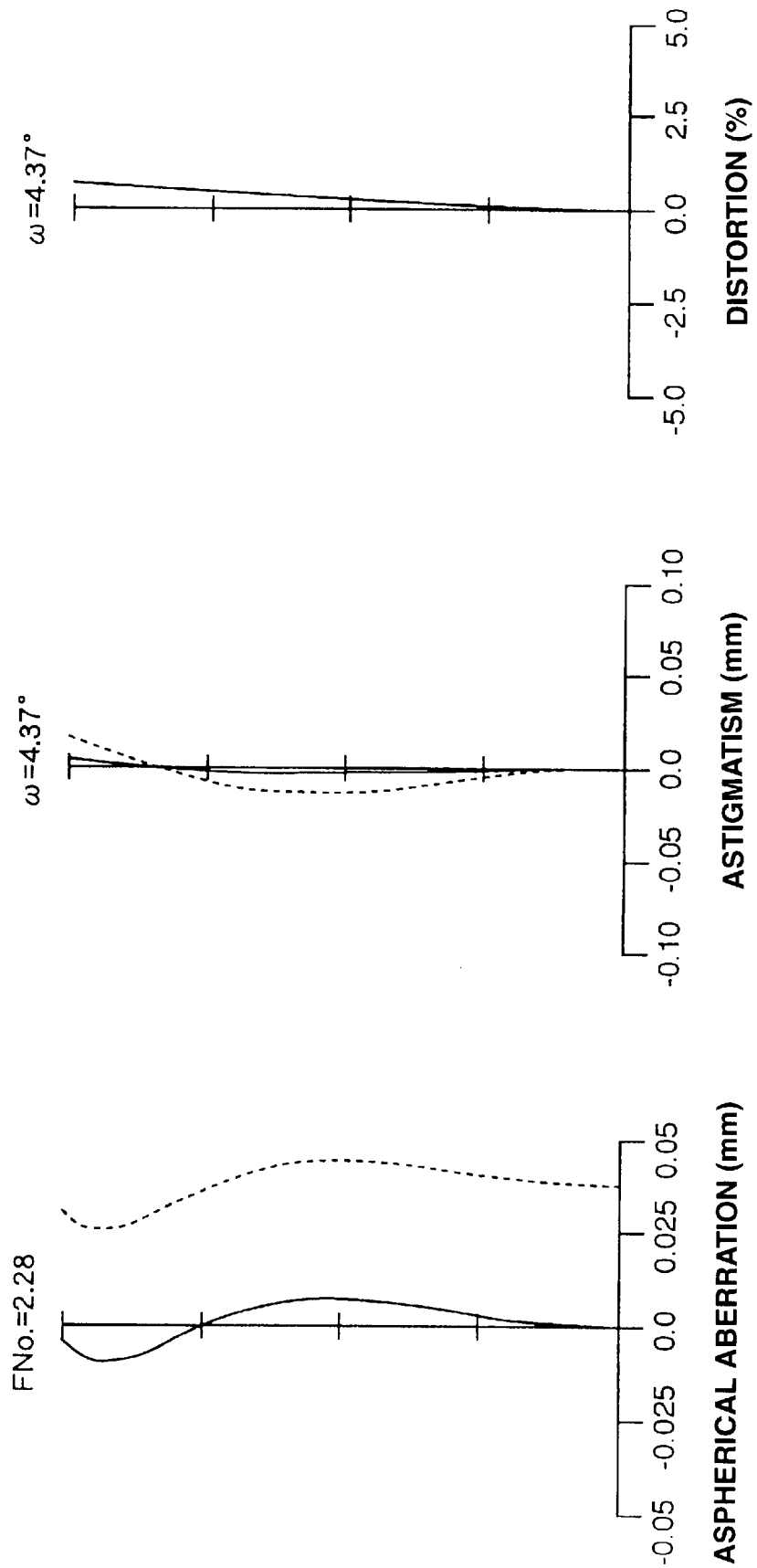
FIG. 36 shows aberrations at an intermediate focal point position between the wide angle end and the telephoto end.
Figure 37:
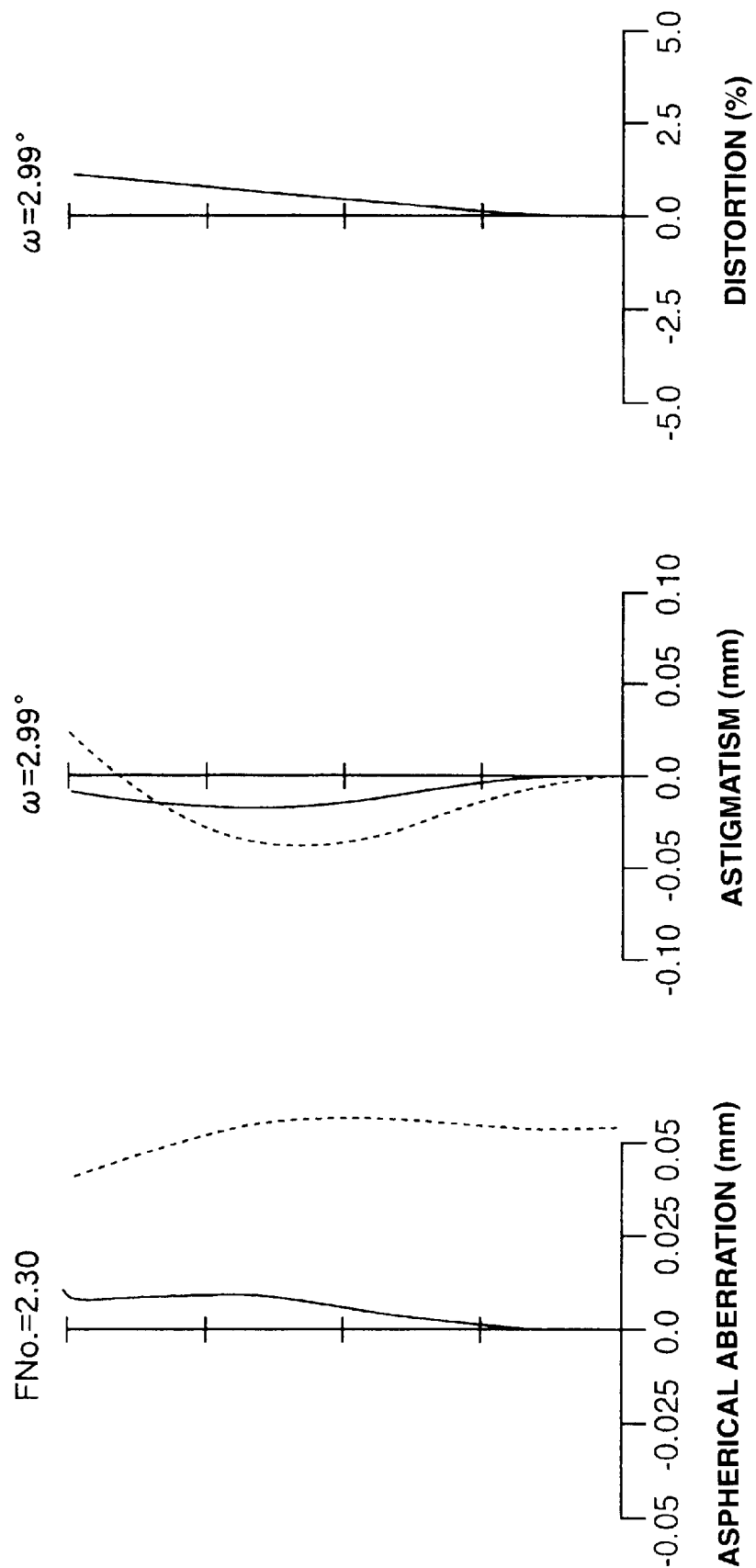
FIG. 37 shows aberrations at the telephoto end.

FIG. 35 to FIG. 37 respectively show spherical aberration, astigmatism, and distortion of the zoom lens 9 at the wide angle end, at the intermediate focal distance position between the wide angle end and the telephoto end, and at the telephoto end.

Table 30 below shows numeric values of the condition equations 9 and 10 of the zoom lenses 8 and 9 shown in the eighth and the ninth numeric examples.

TABLE 30

| | Condition Equation 9 | Condition Equation 10 |
|---|---|---|
| Numerical Example 8 | 3.39 | 1.52 |
| Numerical Example 9 | 3.54 | 1.62 |

The zoom lenses 8 and 9 in the eighth numerical example and the ninth numerical example satisfy the condition equations 1, 7, 8, and 9, and with a lens system of 10 lenses of six groups of the four-group zoom, it is possible to obtain a zoom lens appropriate for a video camera in which aberrations are preferably corrected with a small number of lenses and a high magnification of 10 times or above can be obtained.

Thus, in the zoom lens according to the present invention, the ninth lens L9 which is a concave lens serving for achromatization in the third lens group GR3 and the fourth lens group GR4 has a refracting power determined by the achromatic condition and accordingly, has a characteristic similar to that of the ninth lens L9 of the conventional example. However, in the present invention, the ninth lens L9 is sandwiched by the eight lens L8 and the tenth lens L10 which are convex lenses, so as to constitute a cemented lens. This enables to provide by far a greater degree of freedom for the curvature of the ninth lens L9. The junction surface with the tenth lens L10 which is a convex lens has a convex surface facing the object side as in the conventional example, but the its curvature can be designed more gentle than in the conventional example. This greatly improves the bending due to spherical aberration color generated from this surface.

It should be noted that specific configurations and structures of the respective components in the aforementioned embodiments are only examples of the present invention and a technical scope of the present invention is not to be limited to these examples.

As has been described above, the zoom lens according to the present invention includes a first lens group having a positive refracting power and its position fixed, a second lens group having a negative refracting power and displacable mainly for magnification, a third lens group having a positive refracting power and its position fixed, and a fourth lens group having a positive refracting power and displacable mainly for correction of the focal position for magnification and focusing. The first lens group includes, viewed from an object, a cemented lens consisting of a first lens which is a concave meniscus lens having a convex surface facing the object side and a second lens which is a convex lens, and a third lens which is a convex meniscus lens having a convex surface facing the object side. The second lens group, viewed from an object, includes a fourth lens which is a concave meniscus lens having a convex surface facing the object side, and a cemented lens consisting of a fifth lens which is a both-side-concave lens, and a sixth lens which is a convex lens. The third lens group includes a seventh lens which is a convex lens. The fourth lens group, viewed from an object, includes a cemented lens consisting of an eighth lens which is a convex lens having a convex surface facing the object side, a ninth lens which is a concave lens, and a tenth lens which is a convex lens. The third lens group includes at least one surface constituted by an aspherical surface and the fourth lens group has the surface which is at the object side is constituted by an aspherical surface. Accordingly, it is possible to freely set the curvature of the ninth lens which is a concave lens and it is possible to significantly improve the bending due to a color of the spherical aberration generated from the ninth lens.

The zoom lens according to the present invention satisfies a following condition: 1.8<n9 where n9 represents a refraction index at the d line of the ninth lens. Accordingly, it is possible to make gentle the curvature of the junction surface between the ninth lens and the convex lens, which is advantageous for suppressing and correcting aberrations.

In the zoom lens according to the present invention, a diaphragm is arranged between the third lens group and the fourth lens group, the surface of the fourth lens group at the object side is constituted by an aspherical surface, and following conditions are satisfied: 1.1<f3/f4<1.4 and 1.0<|f2/fw|<1.3 where f2 represents a focal distance of the second lens group, f3 represents a focal distance of the third lens group, f4 represents a focal distance of the fourth lens group, and fw represents a focal distance of the entire lens system at the wide angle end. Accordingly, it is possible to obtain a small-size zoom lens with magnification of about 10 times and aberrations preferably corrected.

In the zoom lens according to the present invention, the third lens group includes a seventh lens which is a convex lens having a convex surface facing the object side and following conditions are satisfied: $8.5<dz/fw<10$ and $1.2<f3/f4<1.45$ where fw represents a focal distance of the entire lens system at the wide angle end, dz represents a displacement amount of the second lens group for magnification, f3 represents a focal distance of the third lens group, and f4 represents a focal distance of the fourth lens group. Accordingly, it is possible to obtain a zoom lens with a high magnification of about 25 times, a reduced entire length, and aberrations preferably corrected.

In the zoom lens according to the present invention, the third lens group includes a seventh lens which is a convex lens having a convex surface facing the object side and following conditions are satisfied: $8.5<dz/fw<11$ and $1.8<Lz/Lf<2.2$ where fw represents a focal distance of the entire lens system at the wide angle end, dz represents a displacement amount of the second lens group for magnification, Lz represents a distance from the surface of the entire lens system at the object side, to the surface of the second lens group at the image side, at the telephoto end, and Lf represents a distance from the surface of the third lens group at the object side, to the image surface of the entire lens system. Accordingly, it is possible to obtain a zoom lens with a high magnification of about 25 times, aberrations preferably corrected, and appropriate for a pickup element of a reduced size.

In the zoom lens according to the present invention, a diaphragm is arranged between the third lens group and the fourth lens group; the third lens group includes a seventh lens which is a convex lens having a convex surface facing the object side; at least one of the surfaces constituting the first lens group is constituted by an aspherical surface, and following conditions are satisfied: $1.58<n3<1.7$, $2.5<dz/fw<5$, and $1.2<f3/f4<1.8$ where n3 represents a refraction index at the d line of the third lens, fw represents a focal distance of the entire lens system at the wide angle end, dz represents a displacement amount of the second lens group for magnification, f3 represents a focal distance of the third lens group, and f4 represents a focal distance of the fourth lens group. Accordingly, it is possible to obtain a zoom lens with a magnification of about 10 times, a reduced length of the entire system, aberrations preferably corrected, and appropriate for a pickup element of a reduced size.

What is claimed is:

1. A zoom lens comprising, viewed from an object, a first lens group having a positive refracting power and its position fixed, a second lens group having a negative refracting power and displacable mainly for magnification, a third lens group having a positive refracting power and its position fixed, and a fourth lens group having a positive refracting power and displacable mainly for correction of the focal position for magnification and focusing, wherein the first lens group includes, viewed from an object, a cemented lens consisting of a first lens which is a concave meniscus lens having a convex surface facing the object side and a second lens which is a convex lens, and a third lens which is a convex meniscus lens having a convex surface facing the object side;

the second lens group, viewed from an object, includes a fourth lens which is a concave meniscus lens having a convex surface facing the object side, and a cemented lens consisting of a fifth lens which is a both-side-concave lens and a sixth lens which is a convex lens;

the third lens group includes a seventh lens which is a convex lens; and the fourth lens group, viewed from an object, includes a cemented lens consisting of an eighth lens which is a convex lens having a convex surface facing the object side, a ninth lens which is a concave lens, and a tenth lens which is a convex lens, and wherein the third lens group includes at least one surface constituted by an aspherical plane and in the fourth lens group, at least the surface which is at the object side is constituted by an aspherical surface.

2. A zoom lens as claimed in claim 1, the zoom lens satisfying $1.8<n9$ where n9 represents a refraction index at the d line of the ninth lens.

3. A zoom lens as claimed in claim 1, wherein a diaphragm is arranged between the third lens group and the fourth lens group, the surface of the fourth lens group at the object side is constituted by an aspherical surface, and following conditions are satisfied:

$1.1<f3/f4<1.4$ $1.0<|f2/fw|<1.3$ where f2 represents a focal distance of the second lens group, f3 represents a focal distance of the third lens group, f4 represents a focal distance of the fourth lens group, and fw represents a focal distance of the entire lens system at the wide angle end.

4. A zoom lens as claimed in claim 1, wherein the third lens group includes a seventh lens which is a convex lens having a convex surface facing the object side and following conditions are satisfied:

$8.5<dz/fw<10$ $1.2<f3/f4<1.45$ where fw represents a focal distance of the entire lens system at the wide angle end, dz represents a displacement amount of the second lens group for magnification, f3 represents a focal distance of the third lens group, and f4 represents a focal distance of the fourth lens group.

5. A zoom lens as claimed in claim 1, wherein the third lens group includes a seventh lens which is a convex lens having a convex surface facing the object side and following conditions are satisfied:

$8.5<dz/fw<11$ $1.8<Lz/Lf<2.2$ where fw represents a focal distance of the entire lens system at the wide angle end, dz represents a displacement amount of the second lens group for magnification, Lz represents a distance from the surface of the entire lens system at the object side, to the surface of the second lens group at the image side, at the telephoto end, and Lf represents a distance from the surface of the third lens group at the object side, to the image surface of the entire lens system.

6. A zoom lens as claimed in claim 1, wherein a diaphragm is arranged between the third lens group and the fourth lens group;

the third lens group includes a seventh lens which is a convex lens having a convex surface facing the object side;

at least one of the surface constituting the first lens group is constituted by an aspherical surface, and following conditions are satisfied:

1.58<n3<1.7
2.5<dz/fw<5
1.2<f3/f4<1.8 where n3 represents a refraction index at the d line of the third lens, fw represents a focal distance of the entire lens system at the wide angle end, dz represents a displacement amount of the second lens group for magnification, f3 represents a focal distance of the third lens group, and f4 represents a focal distance of the fourth lens group.

* * * * *